United States Patent
Kang et al.

(10) Patent No.: US 11,570,008 B2
(45) Date of Patent: Jan. 31, 2023

(54) PSEUDONYM CREDENTIAL CONFIGURATION METHOD AND APPARATUS

(71) Applicant: Huawei International Pte. Ltd., Singapore (SG)

(72) Inventors: Xin Kang, Singapore (SG); Yanjiang Yang, Singapore (SG); Haiguang Wang, Singapore (SG); Zhongding Lei, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 24 days.

(21) Appl. No.: 17/129,428

(22) Filed: Dec. 21, 2020

(65) Prior Publication Data

US 2021/0111906 A1 Apr. 15, 2021

Related U.S. Application Data

(63) Continuation of application No. PCT/SG2018/050305, filed on Jun. 22, 2018.

(51) Int. Cl.
*H04L 9/40* (2022.01)
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/0847* (2013.01); *H04L 9/0861* (2013.01); *H04L 9/3236* (2013.01)

(58) Field of Classification Search
CPC ... H04L 9/3265; H04L 9/0825; H04L 9/0847; H04L 9/0861; H04L 9/3236; H04L 63/0407; H04L 2209/42; H04W 4/40
See application file for complete search history.

(56) References Cited

U.S. PATENT DOCUMENTS

| | | | | |
|---|---|---|---|---|
| 10,154,061 | B1 * | 12/2018 | Schetina | ............. H04L 63/0471 |
| 2004/0249817 | A1 * | 12/2004 | Liu | ..................... H04L 63/0435 |
| | | | | 707/999.009 |
| 2011/0202767 | A1 | 8/2011 | Hui et al. | |

FOREIGN PATENT DOCUMENTS

| | | |
|---|---|---|
| CN | 107396285 A | 11/2017 |
| WO | 2018016713 A2 | 1/2018 |

OTHER PUBLICATIONS

Petit et al., "Pseudonym Schemes in Vehicular Networks: A Survey", 2014, pp. 228-255 (Year: 2014).*

(Continued)

*Primary Examiner* — Thaddeus J Plecha
(74) *Attorney, Agent, or Firm* — Leydig, Voit & Mayer, Ltd.

(57) ABSTRACT

A pseudonym credential configuration method and apparatus are provided. The method includes: receiving an identifier of a terminal device and information about N to-be-requested pseudonym credentials from the terminal device, sending N second request messages to a pseudonym credential generation server, and storing a tag of each second request message in association with the identifier of the terminal device in the registration server, so that the registration server can obtain, based on the tag, the identifier that is of the terminal device and that is associated with the tag; and generating N pseudonym credentials. The pseudonym credential generated in this application may enable a behavior investigation server to learn of a real identity of the terminal device.

16 Claims, 19 Drawing Sheets

(56) References Cited

OTHER PUBLICATIONS

Au et al., "Consumer-Centric and Privacy-preserving Identity Management for Distributed e-Health Systems," Proceedings of the 41st Hawaii International Conference on System Sciences—2008, total 10 pages (2008).

Whyte et al.,"A Security Credential Management System for V2V Communications," 2013 IEEE Vehicular Networking Conference, total 8 pages (2013).

* cited by examiner

PSEUDONYM CREDENTIAL CONFIGURATION METHOD AND APPARATUS

CROSS-REFERENCE TO RELATED APPLICATIONS

This application is a continuation of International Application No. PCT/SG2018/050305, filed on Jun. 22, 2018, the disclosure of which is hereby incorporated by reference in its entirety.

TECHNICAL FIELD

Embodiments of this application relate to Internet of Vehicles technologies, and in particular, to a pseudonym credential configuration method and apparatus.

BACKGROUND

The Internet of Vehicles means that information may be exchanged between vehicles, between a vehicle and a pedestrian, or between a vehicle and a roadside device by using a network communications technology. The Internet of Vehicles usually implements interaction by broadcasting a message on a specified radio channel.

In the Internet of Vehicles, in an information transmission method, when an Internet of Vehicles (Vehicle to Everything, V2X) device sends a message to another V2X device, to ensure integrity and reliability of transmitted data, the V2X device at a transmit end adds, to the sent message, the transmitted data, a signature of the transmitted data using a private key, and a certificate issued by an enrollment certificate authority (ECA for short) to the V2X device at the transmit end. The private key herein is a private key corresponding to a public key in the certificate. The V2X device at a receive end verifies whether the received certificate is issued by the ECA, and verifies the received signature by using the public key in the certificate. This method may be referred to as a certificate-based information transmission method. In another information transmission method, when a V2X device sends a message to another V2X device, to ensure integrity and reliability of transmitted data, the V2X device at a transmit end adds, to the sent message, a signature signed on the transmitted data by using a private key. The private key herein is a private key corresponding to a real identifier of the V2X device at the transmit end, and the real identifier of the V2X device is a public key. The V2X device at a receive end verifies the received signature by using the public key-real identifier. This method may be referred to as an identity-based information transmission method. The foregoing two methods can help a V2X information system: (1) determine that the message received by the V2X device at the receive end is from a legitimate sending device; and (2) ensure that the message is not modified during transmission. This ensures security of V2X communication. However, if the V2X device always uses the same certificate or identity, the V2X device is easily tracked by a hacker, resulting in a risk of privacy infringement.

To avoid the foregoing case, a pseudonym certificate (Pseudo Certificates) or a pseudonym identity is usually used for privacy protection. A pseudonym certificate is usually issued by a pseudonym certificate authority (Pseudo Certificate Authority, PCA for short). Usually, a plurality of pseudonym certificates are issued to one V2X device, and the pseudonym certificates are used for communication between V2X devices. A V2X device has a plurality of pseudonym certificates, and a pseudonym certificate is replaced at a specified interval. This can effectively prevent tracking and protect privacy security. Similarly, a pseudonym identity is usually issued by a key generation center (KGC for short) or a private key generator (PKG for short). Usually, a plurality of pseudonym identities are usually issued to one V2X device, and the pseudonym identities are used for communication between V2X devices. A V2X device has a plurality of pseudonym identities, and a pseudonym identity is replaced at a specified interval. This can also effectively prevent tracking and protect privacy security.

However, if a V2X device has an improper behavior, a real identity of the V2X device cannot be identified by using the foregoing method.

SUMMARY

This application provides a pseudonym credential configuration method and apparatus, to quickly identify a real identity of a terminal device when the terminal device has an improper behavior during communication.

According to a first aspect, an embodiment of this application provides a pseudonym credential configuration method, applied to a pseudonym credential configuration system. The pseudonym credential configuration system includes a plurality of terminal devices, a registration server, and a pseudonym credential generation server.

The registration server receives a first request message from the first terminal device. The first request message includes an identifier of the first terminal device and information about N to-be-requested pseudonym credentials. The first terminal device is any one of the plurality of terminal devices, and N is a positive integer.

The registration server sends N second request messages to the pseudonym credential generation server. The second request message includes a first tag of the corresponding second request message and information about one to-be-requested pseudonym credential.

The registration server stores a first tag of each second request message in association with the identifier of the first terminal device in the registration server, so that the registration server can obtain, based on the first tag, the identifier that is of the first terminal device and that is associated with the first tag.

The pseudonym credential generation server generates N pseudonym credentials. Each pseudonym credential includes the first tag of the corresponding second request message and at least a part of the information that is about the to-be-requested pseudonym credential and that is included in the corresponding second request message.

The pseudonym credential generation server sends the N pseudonym credentials to the registration server.

The registration server sends the N pseudonym credentials to the first terminal device.

In this solution, the generated pseudonym credential includes the tag of the second request message, and the tag of the second request message and a real identifier of the terminal device are stored in association with each other in the registration server. In this way, when the terminal device has an improper behavior, the registration server can obtain the real identifier of the terminal device based on the tag in the pseudonym credential, and can quickly determine a real identity of the terminal device based on the pseudonym credential used by the terminal device during communication, thereby ensuring security of communication between terminal devices.

In addition, the first request message includes the identifier of the terminal device, and the second request message does not include the identifier of the terminal device, so that the pseudonym credential generation server does not learn of a terminal device to which a generated pseudonym certificate belongs, but the registration server learns of the terminal device to which the pseudonym certificate belongs, the pseudonym credential generation server sends the generated pseudonym credential to the terminal device by using the pseudonym credential generation server, thereby improving confidentiality of the generated pseudonym credential.

In a possible design, before the registration server sends the N second request messages to the pseudonym credential generation server, the method further includes:

The registration server determines a type of the first request message. The type is a pseudonym certificate request message or a pseudonym identity request message.

If the type is a pseudonym certificate request message, that the registration server sends N second request messages to the pseudonym credential generation server includes: The registration server sends the N second request messages to a pseudonym certificate generation server.

If the type is a pseudonym identity request message, that the registration server sends N second request messages to a pseudonym credential generation server includes: The registration server sends the N second request messages to a pseudonym identity generation server.

In this solution, the registration server may determine whether the type of the first request message is a pseudonym certificate request message or a pseudonym identity request message, and both the pseudonym certificate generation server and the pseudonym identity generation server are disposed and are communicatively connected to the registration server. In this way, the pseudonym credential configuration system can generate a pseudonym certificate for the terminal device, and can also generate a pseudonym identity for the terminal device.

In a possible design, in order to quickly revoke the pseudonym credential of the terminal device having the improper behavior, the pseudonym credential configuration system is further provided with a first linkage value server and a second linkage value server. The method further includes:

The registration server sends a third request message to the first linkage value server, and sends a fourth request message to the second linkage value server. The third request message includes indication information instructing the first linkage value server to generate N first pre-linkage values. The fourth request message includes indication information instructing the second linkage value server to generate N second pre-linkage values.

The first linkage value server generates N first pre-linkage values, and sends the N first pre-linkage values to the registration server.

The second linkage value server generates N second pre-linkage values, and sends the N second pre-linkage values to the registration server.

In this case, each second request message further includes one first pre-linkage value and one second pre-linkage value. Each pseudonym credential further includes one linkage value. The linkage value is obtained by the pseudonym credential generation server based on the first pre-linkage value and the second pre-linkage value included in the corresponding second request message.

Further, the third request message further includes a first hash value. The first hash value is a hash value corresponding to an identifier of the first terminal and a first random number. The fourth request message further includes a second hash value. The second hash value is a hash value corresponding to the identifier of the first terminal and a second random number. The method further includes:

The registration server stores both the first hash value and the second hash value in association with the identifier of the first terminal, so that the registration server can obtain the first hash value and the second hash value based on the identifier of the first terminal.

Optionally, that the first linkage value server generates N first pre-linkage values includes: The first linkage value server generates N first seed values, and generates N first pre-linkage values based on the N first seed values. The N first seed values include one first native seed value.

That the second linkage value server generates N second pre-linkage values includes: The second linkage value server generates N second pre-linkage values based on the fourth request message. The N second seed values include one second native seed value.

The method further includes:

The first linkage value server stores a first target value in association with the first hash value, so that the first linkage value server can obtain the first target value based on the first hash value. The first target value is one of a first native seed value, N first seed values, and N first pre-linkage values.

The second linkage value server stores a second target value in association with the second hash value, so that the second linkage value server can obtain the second target value based on the second hash value. The second target value is one of a second native seed value, N second seed values, and N second pre-linkage values.

In this solution, the generated pseudonym credential not only includes the tag of the second request message, but also includes the linkage value. Because the registration server stores the first hash value of the identifier of the terminal device and the first random number in association with the identifier of the terminal device, and stores the second hash value of the identifier of the terminal device and the second random number in association with the identifier ID1 of the terminal device, the registration server can obtain the first hash value and the second hash value based on the identifier ID1 of the terminal device. In addition, the first hash value and the second hash value are stored in linkage with a native seed value or a seed value or a pre-linkage value related to a linkage value in the generated pseudonym certificate, so that linkage values in all pseudonym certificates of the terminal device can be obtained, and all the pseudonym certificates of the terminal device can be quickly revoked based on the obtained linkage values.

In this solution, two linkage value servers are set, and the linkage value can be obtained only based on the first pre-linkage value generated by the first linkage value server and the second pre-linkage value generated by the second linkage value server, so that it can be ensured that the linkage value written into the pseudonym certificate is learned of by only the pseudonym certificate generation server, thereby further ensuring security of the pseudonym certificate.

In a possible design, the pseudonym credential configuration system further includes a behavior investigation server. The method further includes:

The behavior investigation server receives a report message from a second terminal device. The report message includes a first pseudonym credential of a third terminal device. Both the second terminal device and the third terminal device are any one of the plurality of terminal devices.

The behavior investigation server sends the first pseudonym credential to the pseudonym credential generation server.

The pseudonym credential generation server obtains a second tag included in the first pseudonym credential, and sends the second tag to the behavior investigation server.

The behavior investigation server sends the second tag to the registration server.

The registration server obtains an identifier that is of the third terminal device and that is associated with the second tag, and sends the identifier of the third terminal device to the behavior investigation server.

In this solution, the behavior investigation server may be disposed to monitor a behavior of a terminal device, and interact with the registration server and the pseudonym credential server, so that a real identity of a terminal device having an improper behavior can be quickly identified.

In a possible design, the registration server obtains a third hash value and a fourth hash value that are associated with the identifier of the third terminal device, and sends the third hash value and the fourth hash value to the behavior investigation server. The third hash value is a hash value corresponding to the identifier of the third terminal and a third random number. The fourth hash value is a hash value corresponding to the identifier of the third terminal and a fourth random number.

The behavior investigation server sends the third hash value to the first linkage value server, and sends the fourth hash value to the second linkage value server.

The first linkage value server obtains a third target value set associated with the third hash value, where the third target value includes one of a third native seed value, N third seed values, and N third pre-linkage values; and sends the third target value set to the behavior investigation server.

The second linkage value server obtains a fourth target value set associated with the fourth hash value, where the fourth target value set includes one of a fourth native seed value, N fourth seed values, and N fourth pre-linkage values, and sends the fourth target value set to the behavior investigation server.

The behavior investigation server generates N linkage values based on the third target value set and the fourth target value set.

For each linkage value, the behavior investigation server revokes a pseudonym credential that includes the linkage value.

In this solution, the behavior investigation server may be disposed to monitor a behavior of a terminal device, and interact with the registration server and the pseudonym credential server, so that a pseudonym credential of a terminal device having an improper behavior can be quickly revoked.

According to a second aspect, an embodiment of this application provides a pseudonym credential configuration method, including:

A registration server receives a first request message from a terminal device. The first request message includes an identifier of the terminal device and information about N to-be-requested pseudonym credentials, and N is a positive integer.

The registration server sends N second request messages to a pseudonym credential generation server. The second request message is used to instruct the pseudonym credential generation server to generate a pseudonym credential. The pseudonym credential includes a tag of the corresponding second request message and at least a part of information about one to-be-requested pseudonym credential included in the corresponding second request message.

The registration server stores a tag of each second request message in association with the identifier of the terminal device in the registration server, so that the registration server can obtain, based on the tag, the identifier that is of the first terminal device and that is associated with the tag.

The registration server receives N pseudonym credentials from the pseudonym credential generation server, and sends the N pseudonym credentials to the terminal device.

In a possible design, before the registration server sends the N second request messages to the pseudonym credential generation server, the method further includes:

The registration server determines a type of the first request message. The type is a pseudonym certificate request message or a pseudonym identity request message.

If the type is a pseudonym certificate request message, that the registration server sends N second request messages to a pseudonym credential generation server includes: The registration server sends the N second request messages to a pseudonym certificate generation server.

If the type is a pseudonym identity request message, that the registration server sends N second request messages to a pseudonym credential generation server includes: The registration server sends the N second request messages to a pseudonym identity generation server.

In a possible design, the first request message further includes first indication information indicating a type of the first request message.

That the registration server determines a type of the first request message includes:

The registration server determines the type of the first request message based on the first indication information.

In a possible design, before the registration server sends the N second request messages to the pseudonym credential generation server, the method further includes:

The registration server sends a third request message to the first linkage value server, and sends a fourth request message to the second linkage value server. The third request message includes indication information instructing the first linkage value server to generate N first pre-linkage values. The fourth request message includes indication information instructing the second linkage value server to generate N second pre-linkage values.

The registration server receives N first pre-linkage values from the first linkage value server, and receives N second pre-linkage values from the second linkage value server.

In this case, each pseudonym credential further includes a linkage value, and the linkage value is obtained by the pseudonym credential generation server based on a first pre-linkage value and a second pre-linkage value included in a corresponding second request message.

In a possible design, the third request message further includes a first hash value. The first hash value is a hash value corresponding to the identifier of the terminal device and a first random number. The fourth request message further includes a second hash value. The second hash value is a hash value corresponding to the identifier of the terminal device and a second random number. The method further includes:

The registration server stores the identifier of the terminal device in association with the first hash value and the second hash value, so that the registration server can obtain the first hash value and the second hash value based on the identifier of the terminal device.

In a possible design, the first pre-linkage value is a linkage value encrypted by using a public key of the pseudonym credential generation server, and the second pre-linkage value is a linkage value encrypted by using the public key of the pseudonym credential generation server.

In this solution, the first pre-linkage value and the second pre-linkage value are encrypted, so that confidentiality of a finally generated linkage value is improved.

In a possible design, the information about the to-be-requested pseudonym credential is information obtained after actual information of the to-be-requested pseudonym credential is encrypted by using a public key of the pseudonym credential generation server.

In this case, the at least a part of the information about the to-be-requested pseudonym credential that is included in the pseudonym credential is at least a part of the actual information of the to-be-requested pseudonym credential.

If the pseudonym credential is a pseudonym certificate, the at least a part of the actual information of the to-be-requested pseudonym credential includes a pseudonym certificate public key.

If the pseudonym credential is a pseudonym identity, the at least a part of the actual information of the to-be-requested pseudonym credential includes a pseudonym identifier.

In this solution, because the information about the to-be-requested pseudonym credential is information obtained by encrypting the actual information of the to-be-requested pseudonym credential by using the public key of the pseudonym credential generation server, the registration server cannot learn of content of the pseudonym credential, and can learn of only a terminal device to which the pseudonym credential belongs, thereby ensuring confidentiality of the generated pseudonym credential.

In a possible design, if the pseudonym credential is a pseudonym identity, the method further includes:

The registration server receives, from the pseudonym credential generation server, N pseudonym private keys corresponding to N pseudonym identifiers in N pseudonym identities.

In a possible design, the method further includes:

The registration server receives a target tag from a behavior investigation server.

The registration server determines a target identifier associated with the target tag. The target identifier is used to indicate a target terminal device.

In a possible design, after the registration server receives the target tag from the behavior investigation server, the method further includes:

sending a first target hash value and a second target hash value that are associated with the target identifier to the behavior investigation server. The first target hash value is a hash value corresponding to the target identifier and a third random number. The second target hash value is a hash value corresponding to the target identifier and a fourth random number.

According to a third aspect, an embodiment of this application provides a pseudonym credential configuration method, including:

A pseudonym credential generation server receives a request message from a registration server. The request message includes a tag of the request message and information about a to-be-requested pseudonym credential of a terminal device. The tag of the request message and an identifier of the terminal device are stored in association with each other in the registration server, so that the registration server can obtain, based on the tag, the identifier that is of the terminal device and that is associated with the tag.

The pseudonym credential generation server generates a pseudonym credential. The pseudonym credential includes the tag and at least a part of the information about the to-be-requested pseudonym credential.

The pseudonym credential generation server sends the pseudonym credential to the registration server.

In a possible design, the information about the to-be-requested pseudonym credential is information obtained after actual information of the to-be-requested pseudonym credential is encrypted by using a public key of the pseudonym credential generation server.

That the pseudonym credential generation server generates a pseudonym credential includes:

The pseudonym credential generation server decrypts the information about the to-be-requested pseudonym credential by using a private key of the pseudonym credential generation server, to obtain the actual information of the to-be-requested pseudonym credential.

The pseudonym credential generation server generates the pseudonym credential based on the tag and at least a part of the actual information of the to-be-requested pseudonym credential.

In a possible design, the request message further includes a first pre-linkage value and a second pre-linkage value that are encrypted by using a public key of the pseudonym credential generation server.

That the pseudonym credential generation server generates a pseudonym credential further includes:

The pseudonym credential generation server decrypts, by using a private key of the pseudonym credential generation server, the first pre-linkage value and the second pre-linkage value that are encrypted by using the public key of the pseudonym credential generation server, to obtain the first pre-linkage value and the second pre-linkage value.

The pseudonym credential generation server performs an exclusive OR operation on the first pre-linkage value and the second pre-linkage value to obtain a linkage value.

In this case, that the pseudonym credential generation server generates the pseudonym credential based on the tag and at least a part of the actual information of the to-be-requested pseudonym credential includes:

The pseudonym credential generation server generates the pseudonym credential based on the tag, the at least a part of the actual information of the to-be-requested pseudonym credential, and the linkage value.

In a possible design, that the pseudonym credential generation server generates the pseudonym credential based on the tag, the at least a part of the actual information of the to-be-requested pseudonym credential, and the linkage value includes:

The pseudonym credential generation server encrypts the tag by using a symmetric key of the pseudonym credential generation server, to obtain an encrypted tag.

The pseudonym credential generation server generates the pseudonym credential based on the encrypted tag, the at least a part of the actual information of the to-be-requested pseudonym credential, and the linkage value.

In this solution, the tag is encrypted by using the symmetric key of the pseudonym credential generation server to obtain the encrypted tag, so that the terminal device cannot learn of the tag, thereby preventing the terminal device from tampering.

In a possible design, if the pseudonym credential is a pseudonym certificate, the actual information of the to-be-requested pseudonym credential includes a pseudonym certificate public key, and the pseudonym credential generation server is a pseudonym certificate generation server.

That the pseudonym credential generation server generates the pseudonym credential based on the encrypted tag, the at least a part of the actual information of the pseudonym credential, and the linkage value includes:

The pseudonym certificate generation server generates the pseudonym certificate based on the encrypted tag, the pseudonym certificate public key, and the linkage value.

In a possible design, if the pseudonym credential is a pseudonym identity, the actual information of the to-be-requested pseudonym credential includes a pseudonym identifier, and the pseudonym credential generation server is a pseudonym identity generation server.

That the pseudonym credential generation server generates the pseudonym credential based on the encrypted tag, the at least a part of the actual information of the to-be-requested pseudonym credential, and the linkage value includes:

The pseudonym identity generation server generates the pseudonym identity based on the encrypted tag, the pseudonym identifier, and the linkage value.

In a possible design, the actual information of the to-be-requested pseudonym credential further includes a temporary public key. The method further includes:

The pseudonym certificate generation server encrypts the pseudonym certificate by using the temporary public key, to obtain an encrypted pseudonym certificate.

That the pseudonym credential generation server sends the pseudonym certificate to the registration server includes:

The pseudonym certificate generation server sends the encrypted pseudonym certificate to the registration server.

In this solution, the pseudonym certificate is encrypted by using the temporary public key to obtain the encrypted pseudonym certificate, so that the registration server cannot learn of content of the pseudonym certificate, and can learn of only a terminal device to which the pseudonym certificate belongs, thereby ensuring confidentiality of the generated pseudonym certificate.

In a possible design, the actual information of the to-be-requested pseudonym credential further includes a temporary public key. The method further includes:

The pseudonym identity generation server encrypts the pseudonym identity by using the temporary public key, to obtain an encrypted pseudonym identity.

That the pseudonym credential generation server sends the pseudonym identity to the registration server includes:

The pseudonym identity generation server sends the encrypted pseudonym identity to the registration server.

In this solution, the pseudonym identity is encrypted by using the temporary public key to obtain the encrypted pseudonym identity, so that the registration server cannot learn of content of the pseudonym identity, and can learn of only a terminal device to which the pseudonym identity belongs, thereby ensuring confidentiality of the generated pseudonym identity.

In a possible design, the method further includes:

The pseudonym identity generation server generates a pseudonym private key corresponding to the pseudonym identifier.

The pseudonym identity generation server encrypts the pseudonym private key by using the temporary public key, to obtain an encrypted pseudonym private key.

The pseudonym identity generation server sends the encrypted pseudonym private key to the registration server.

In a possible design, the pseudonym credential generation server receives a target pseudonym credential sent by a behavior investigation server.

The pseudonym credential generation server obtains a target tag in the target pseudonym credential.

The pseudonym credential generation server sends the target tag to the behavior investigation server.

According to a fourth aspect, an embodiment of this application provides a pseudonym credential configuration method, including:

A behavior investigation server receives a report message from a first terminal device. The report message includes a pseudonym credential of a second terminal device.

The behavior investigation server sends the pseudonym credential to a pseudonym credential generation server, so that the pseudonym credential generation server obtains a target tag included in the pseudonym credential. The target tag is a tag corresponding to a request message sent by a registration server to the pseudonym credential generation server. The request message instructs the pseudonym credential generation server to generate the pseudonym credential.

The behavior investigation server receives the target tag from the pseudonym credential generation server.

The behavior investigation server sends the target tag to the registration server, so that the registration server obtains an identifier that is of the second terminal device and that is associated with the target tag.

In a possible design, the method further includes:

receiving, from the registration server, a first target hash value corresponding to the identifier of the second terminal device and a first random number, and a second target hash value corresponding to the identifier of the second terminal device and a second random number.

The behavior investigation server sends the first target hash value to a first linkage value server, and sends the second target hash value to a second linkage value server.

The behavior investigation server receives a first target value set associated with the first target hash value from the first linkage value server, and receives a second target value set associated with a target hash value from the second linkage value server. The first target value set includes one of N first seed values, a first native seed value, and N first pre-linkage values. The second target value set includes one of N second seed values, a second native seed value, and N second pre-linkage values.

The behavior investigation server generates N linkage values based on the first target value set and the second target value set.

For each linkage value, the behavior investigation server revokes a pseudonym credential that includes the linkage value.

In a possible design, the first target value set includes a first native seed value, and the second target value set includes a second native seed value.

In this case, that the behavior investigation server generates N linkage values based on the first target value set and the second target value set includes:

The behavior investigation server generates N−1 first seed values based on the first native seed value, and generates N first pre-linkage values based on the first native seed value and the N−1 first seed values.

The behavior investigation server generates N−1 second seed values based on the second native seed value, and generates N second pre-linkage values based on the second native seed value and the N−1 second seed values.

For each of N groups of pre-linkage values, the behavior investigation server performs an exclusive OR operation on a first pre-linkage value and a second pre-linkage value that are included in the group to obtain a linkage value. Each group of pre-linkage values includes one first pre-linkage value and one second pre-linkage value.

In a possible design, the first target value set includes N first pre-linkage values, and the second target value set includes N second pre-linkage values.

In this case, that the behavior investigation server generates N linkage values based on the first target value set and the second target value set includes:

For each of N groups of pre-linkage values, the behavior investigation server performs an exclusive OR operation on a first pre-linkage value and a second pre-linkage value in the group to obtain a linkage value.

In a possible design, the first target value set includes N first seed values, and the second target value set includes N second seed values.

In this case, that the behavior investigation server generates N linkage values based on the first target value set and the second target value set includes:

The behavior investigation server generates N first pre-linkage values based on the N first seed values.

The behavior investigation server generates N second pre-linkage values based on the N second seed values.

For each of N groups of pre-linkage values, the behavior investigation server performs an exclusive OR operation on a first pre-linkage value and a second pre-linkage value that are included in the group to obtain a linkage value. Each group of pre-linkage values includes one first pre-linkage value and one second pre-linkage value.

According to a fifth aspect, an embodiment of this application provides a pseudonym credential configuration method, including:

A linkage value server receives a request message from the registration server. The request message includes indication information instructing the linkage value server to generate N pre-linkage values.

The linkage value server generates N pre-linkage values.

The linkage value server sends a feedback message to the registration server. The feedback message includes the N pre-linkage values.

In a possible design, that the linkage value server generates N pre-linkage values includes:

The linkage value server generates N seed values. The N seed values include one native seed value.

The linkage value server generates the N pre-linkage values based on the N seed values.

In a possible design, the request message further includes a hash value, and the hash value is a hash value corresponding to an identifier of a terminal device that requests a pseudonym credential and a random number. The method further includes:

The linkage value server stores a first target value set in association with the hash value, so that the linkage value server can obtain the first target value based on the hash value. The first target value set is one of the native seed value, the N pre-linkage values, and the N seed values.

In a possible design, the $i^{th}$ seed value is a hash value of an $(i-1)^{th}$ seed value, i=2, 3, ..., N, and the native seed value is a first seed value.

In a possible design, the $m^{th}$ pre-linkage value is a part of the $m^{th}$ seed value.

Alternatively, the $m^{th}$ pre-linkage value is a hash value of the $m^{th}$ seed value.

m=1, 2, ..., N.

In a possible design, the linkage value server receives a target hash value from a behavior investigation server. The target hash value is a hash value corresponding to a target identifier of a target terminal device and a target random number.

The linkage value server obtains a second target value set associated with the target hash value. The second target value set includes one of N seed values, a native seed value, and N pre-linkage values.

The linkage value server sends the second target value set to the behavior investigation server.

According to a sixth aspect, an embodiment of this application provides a pseudonym credential configuration system. The pseudonym credential configuration system includes a plurality of terminal devices, a registration server, and a pseudonym credential generation server.

The registration server is configured to receive a first request message from the first terminal device. The first request message includes an identifier of the first terminal device and information about N to-be-requested pseudonym credentials. The first terminal device is any one of the plurality of terminal devices, and N is a positive integer.

The registration server is further configured to send N second request messages to the pseudonym credential generation server. The second request message includes a first tag of the corresponding second request message and information about one to-be-requested pseudonym credential.

The registration server is configured to store a first tag of each second request message in association with the identifier of the first terminal device in the registration server, so that the registration server can obtain, based on the first tag, the identifier that is of the first terminal device and that is associated with the first tag.

The pseudonym credential generation server is configured to generate N pseudonym credentials. Each pseudonym credential includes the first tag of the corresponding second request message and at least a part of the information that is about the to-be-requested pseudonym credential and that is included in the corresponding second request message.

The pseudonym credential generation server is further configured to send the N pseudonym credentials to the registration server.

The registration server is further configured to send the N pseudonym credentials to the first terminal device.

In a possible design, the pseudonym credential configuration system further includes a first linkage value server and a second linkage value server.

The registration server is further configured to send a third request message to the first linkage value server, and send a fourth request message to the second linkage value server. The third request message includes indication information instructing the first linkage value server to generate N first pre-linkage values. The fourth request message includes indication information instructing the second linkage value server to generate N second pre-linkage values.

The first linkage value server is configured to generate N first pre-linkage values, and send the N first pre-linkage values to the registration server.

The second linkage value server is configured to generate N second pre-linkage values, and send the N second pre-linkage values to the registration server.

In this case, each second request message further includes one first pre-linkage value and one second pre-linkage value. Each pseudonym credential further includes one linkage value. The linkage value is obtained by the pseudonym credential generation server based on a first pre-linkage value and a second pre-linkage value included in a corresponding second request message.

In a possible design, the registration server is further configured to determine a type of the first request message before the registration server sends the N second request messages to the pseudonym credential generation server. The type is a pseudonym certificate request message or a pseudonym identity request message.

If the type is a pseudonym certificate request message, the registration server is specifically configured to send the N second request messages to a pseudonym certificate generation server.

If the type is a pseudonym identity request message, the registration server is specifically configured to send the N second request messages to a pseudonym identity generation server.

In a possible design, the third request message further includes a first hash value. The first hash value is a hash value corresponding to an identifier of the first terminal and a first random number. The fourth request message further includes a second hash value. The second hash value is a hash value corresponding to the identifier of the first terminal and a second random number. The method further includes:

The registration server is further configured to store both the first hash value and the second hash value in association with the identifier of the first terminal, so that the registration server can obtain the first hash value and the second hash value based on the identifier of the first terminal.

The first linkage value server is specifically configured to generate N first seed values, and generate N first pre-linkage values based on the N first seed values. The N first seed values include one first native seed value.

The second linkage value server is specifically configured to generate N second pre-linkage values based on the fourth request message. The N second seed values include one second native seed value.

The first linkage value server is further configured to store the first target value in association with the first hash value, so that the first linkage value server can obtain the first target value based on the first hash value. The first target value is one of a first native seed value, N first seed values, and N first pre-linkage values.

The second linkage value server is further configured to store the second target value in association with the second hash value, so that the second linkage value server can obtain the second target value based on the second hash value. The second target value is one of a second native seed value, N second seed values, and N second pre-linkage values.

In a possible design, the pseudonym credential configuration system further includes a behavior investigation server.

The behavior investigation server is configured to receive a report message from a second terminal device. The report message includes a first pseudonym credential of a third terminal device. Both the second terminal device and the third terminal device are any one of the plurality of terminal devices.

The behavior investigation server is further configured to send the first pseudonym credential to the pseudonym credential generation server.

The pseudonym credential generation server is further configured to obtain a second tag included in the first pseudonym credential, and send the second tag to the behavior investigation server.

The behavior investigation server is further configured to send the second tag to the registration server.

The registration server is further configured to obtain an identifier that is of the third terminal device and that is associated with the second tag, and send the identifier of the third terminal device to the behavior investigation server.

In a possible design, the registration server is further configured to obtain a third hash value and a fourth hash value that are associated with the identifier of the third terminal device, and send the third hash value and the fourth hash value to the behavior investigation server. The third hash value is a hash value corresponding to the identifier of the third terminal and a third random number. The fourth hash value is a hash value corresponding to the identifier of the third terminal and a fourth random number.

The behavior investigation server is further configured to send the third hash value to the first linkage value server, and send the fourth hash value to the second linkage value server.

The first linkage value server is further configured to obtain a third target value set associated with the third hash value, where the third target value includes one of a third native seed value, N third seed values, and N third pre-linkage values; and send the third target value set to the behavior investigation server.

The second linkage value server is further configured to obtain a fourth target value set associated with the fourth hash value, where the fourth target value set includes one of a fourth native seed value, N fourth seed values, and N fourth pre-linkage values; and send the fourth target value set to the behavior investigation server.

The behavior investigation server is further configured to generate N linkage values based on the third target value set and the fourth target value set.

For each linkage value, the behavior investigation server is further configured to revoke a pseudonym credential that includes the linkage value.

According to a seventh aspect, an embodiment of this application provides a pseudonym credential configuration apparatus, including:

a receiving module, configured to receive a first request message from a terminal device, where the first request message includes an identifier of the terminal device and information about N to-be-requested pseudonym credentials, and N is a positive integer;

a sending module, configured to send N second request messages to a pseudonym credential generation server, where the second request message is used to instruct the pseudonym credential generation server to generate a pseudonym credential, and the pseudonym credential includes a tag of the corresponding second request message and at least a part of information about one to-be-requested pseudonym credential included in the corresponding second request message; and a storage module, configured to store a tag of each second request message in association with the identifier of the terminal device in the registration server, so that the registration server can obtain, based on the tag, the identifier that is of the first terminal device and that is associated with the tag.

The receiving module is further configured to receive N pseudonym credentials from the pseudonym credential generation server, and send the N pseudonym credentials to the terminal device.

In a possible design, the pseudonym credential configuration apparatus further includes a determining module. The determining module is configured to determine a type of the first request message before the sending module sends the N second request messages to the pseudonym credential generation server. The type is a pseudonym certificate request message or a pseudonym identity request message.

If the type is a pseudonym certificate request message, the sending module sends the N second request messages to a pseudonym certificate generation server.

If the type is a pseudonym identity request message, the sending module sends the N second request messages to the pseudonym identity generation server.

In a possible design, the sending module is further configured to:

before sending the N second request messages to the pseudonym credential generation server, send a third request message to a first linkage value server, and send a fourth request message to a second linkage value server. The third request message includes indication information instructing the first linkage value server to generate N first pre-linkage values. The fourth request message includes indication information instructing the second linkage value server to generate N second pre-linkage values.

The receiving module is further configured to receive the N first pre-linkage values from the first linkage value server, and receive the N second pre-linkage values from the second linkage value server.

In this case, each pseudonym credential further includes a linkage value. The linkage value is obtained by the pseudonym credential generation server based on a first pre-linkage value and a second pre-linkage value included in a corresponding second request message.

In a possible design, the third request message further includes a first hash value. The first hash value is a hash value corresponding to the identifier of the terminal device and a first random number. The fourth request message further includes a second hash value. The second hash value is a hash value corresponding to the identifier of the terminal device and a second random number. The pseudonym credential configuration apparatus further includes:

the storage module, configured to store the identifier of the terminal device in association with the first hash value and the second hash value, so that the registration server can obtain the first hash value and the second hash value based on the identifier of the terminal device.

In a possible design, the pseudonym credential configuration apparatus further includes the determining module.

The receiving module is configured to receive a target tag from a behavior investigation server.

The determining module is configured to determine a target identifier associated with the target tag. The target identifier is used to indicate a target terminal device.

The sending module is further configured to send a first target hash value and a second target hash value that are associated with the target identifier to the behavior investigation server. The first target hash value is a hash value corresponding to the target identifier and a third random number. The second target hash value is a hash value corresponding to the target identifier and a fourth random number.

According to an eighth aspect, an embodiment of this application provides a computer readable storage medium. The computer readable storage medium stores a computer program. When the computer program is executed by a processor, the method in any one of the second aspect or the possible designs of the second aspect is performed.

According to a ninth aspect, an embodiment of this application provides a registration server, including a processor and a memory.

The memory is configured to store a program.

The processor is configured to execute the program stored in the memory. When the program is executed, the processor is configured to perform the method in any one of the second aspect or the possible designs of the second aspect.

According to a tenth aspect, an embodiment of this application provides a computer readable storage medium. The computer readable storage medium stores a computer program. When the computer program is executed by a processor, the method in any one of the third aspect or the possible designs of the third aspect is performed.

According to an eleventh aspect, an embodiment of this application provides a pseudonym credential generation server, including a processor and a memory.

The memory is configured to store a program.

The processor is configured to execute the program stored in the memory. When the program is executed, the processor is configured to perform the method in any one of the third aspect or the possible designs of the third aspect.

According to a twelfth aspect, an embodiment of this application provides a computer readable storage medium. The computer readable storage medium stores a computer program. When the computer program is executed by a processor, the method in any one of the fourth aspect or the possible designs of the fourth aspect is performed.

According to a thirteenth aspect, an embodiment of this application provides a behavior investigation server, including a processor and a memory.

The memory is configured to store a program.

The processor is configured to execute the program stored in the memory. When the program is executed, the processor is configured to perform the method in any one of the fourth aspect or the possible designs of the fourth aspect.

According to a fourteenth aspect, an embodiment of this application provides a computer readable storage medium. The computer readable storage medium stores a computer program. When the computer program is executed by a processor, the method in any one of the fifth aspect or the possible designs of the fifth aspect is performed.

According to a fifteenth aspect, an embodiment of this application provides a linkage value server, including a processor and a memory.

The memory is configured to store a program.

The processor is configured to execute the program stored in the memory. When the program is executed, the processor is configured to perform the method in any one of the fifth aspect or the possible designs of the fifth aspect.

In this application, the generated pseudonym certificate includes a tag of the second request message and a linkage value. When the terminal device has an improper behavior, the real identifier of the terminal device can be quickly identified based on the tag of the second request message. In addition, the registration server stores the first hash value of the identifier of the terminal device and the first random number in association with the identifier of the terminal device, and stores the second hash value of the identifier of the terminal device and the second random number in association with the identifier of the terminal device. Therefore, the registration server can obtain the first hash value and the second hash value based on the identifier of the terminal device. In addition, the first hash value and the second hash value are stored in linkage with the native seed value or the seed value or the pre-linkage value related to the linkage value in the generated pseudonym certificate, so that the linkage values in all the pseudonym certificates of the terminal device can be obtained, and all the pseudonym certificates of the terminal device can be quickly revoked based on the obtained linkage values.

DESCRIPTION OF EMBODIMENTS

Figure 1:
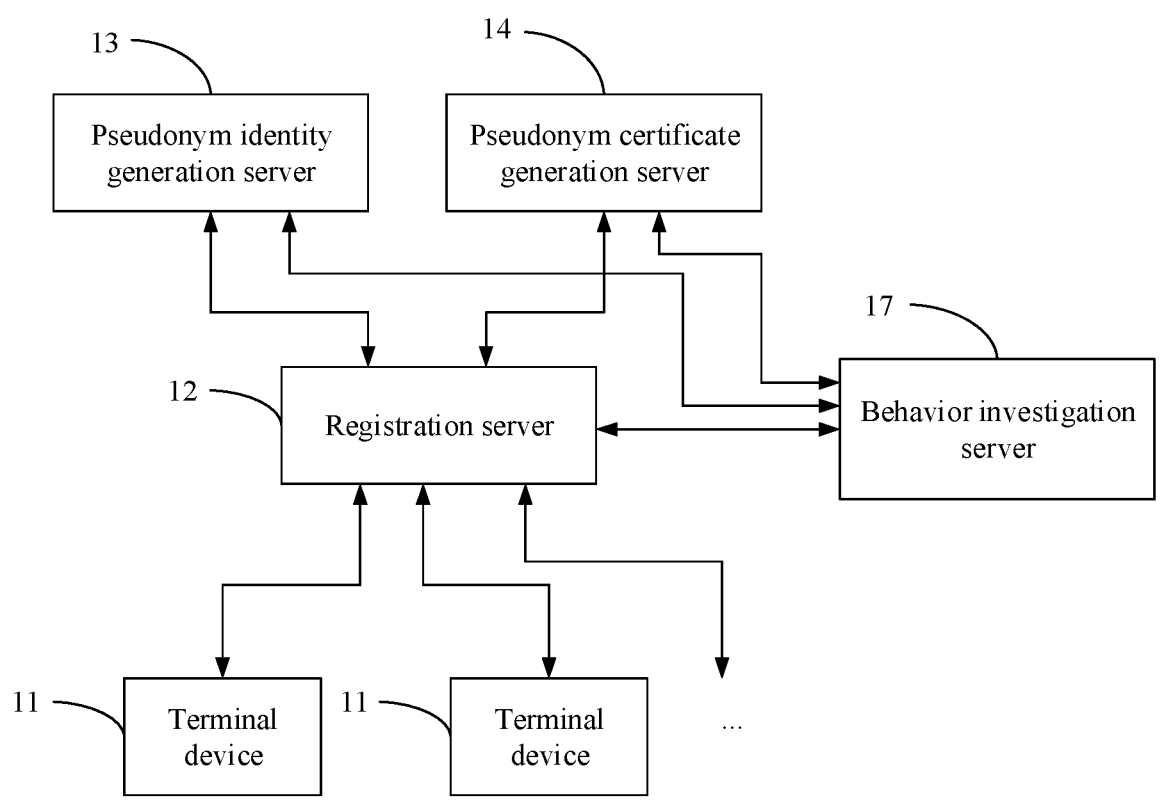
FIG. 1 is a first diagram of a system architecture according to an embodiment of this application.

Related terms used in the embodiments of this application are first explained.

Asymmetric cryptography: Asymmetric cryptography is a cryptographic algorithm. Such a cryptographic method requires a pair of keys: one is a private key and the other is a public key. The two keys are mathematically related. Information obtained by using an encryption key in a pair of keys can be decrypted only by using a decryption key in the pair of keys. If one key in a pair of keys is known, the other key cannot be calculated. Therefore, if one key of a pair of keys is disclosed, confidentiality of the other key is not affected.

Common public key encryption algorithms include an RSA (Rivest-Shamir-Adleman) algorithm, an ElGamal algorithm, a knapsack algorithm, a Rabin algorithm (a special case of the RSA), and the elliptic curve cryptography (ECC for short). A most widely used algorithm is the RSA algorithm. The RSA algorithm is a well-known public key encryption algorithm.

Key pair: A key par includes a private key and a public key, and belongs to an asymmetric cryptography technology. The private key is held by an owner of the key pair and cannot be disclosed. The public key is released by the owner of the key pair to others.

Text digest: A hash value obtained by usually using SHA1, SHA2, and other algorithms after hash calculation is performed on text is a text digest.

Signature: A ciphertext obtained by a data transmit end by encrypting a digest of a transmission text by using a private key is referred to as a signature of the transmission text.

Signature verification: A data receive end receives the transmission text, but needs to check whether the transmission text is content sent by the data transmit end and whether the transmission text is tampered with during transmission. Therefore, the data receive end decrypts the signature of the transmission text by using a held public key, to obtain the digest of the transmission text; then calculates the digest of the received transmission text by using a hash algorithm that is the same as that used by the transmit end to obtain the digest; and compares the calculated digest with the decrypted digest. If the two digests are identical, it indicates that the transmission text is not tampered with.

ECA certificate: An ECA certificate is a certificate issued by an enrollment certificate authority (ECA for short), and may include a terminal device identifier (unique and real identifier), a public key, an ECA certificate expiration time, and an ECA certificate signature. A process of obtaining the ECA certificate signature is as follows: A hash value corresponding to information in the certificate other than the signature is obtained. The hash value is encrypted by using a private key of the ECA certificate, to obtain the signature.

Pseudonym credential: A pseudonym credential may be a pseudonym certificate or a pseudonym identity.

A pseudonym certificate (pseudo certificates) may also be referred to as a pseudo certificate and is a certificate issued by a pseudonym certificate authority (Pseudo Certificate Authority) instead of the ECA. A terminal device applies for a plurality of pseudonym certificates from the pseudonym certificate authority, and replaces a pseudonym certificate at a specified interval. This can effectively prevent the terminal device from being easily tracked by a hacker due to use of a same certificate issued by the ECA during communication, thereby preventing privacy from being infringed. The pseudonym certificate may include a public key, a certificate expiration time, and a certificate signature. The public key in the pseudonym certificate is different from that in the ECA certificate.

For a pseudonym identity: Before a pseudonym identity is described, an identity-based cryptography (IBC for short) is first described. The IBC includes an identity-based signature (Identity Based Cryptography, IBS for short) and identity-based encryption (IBE for short). Each terminal device has an own public-private key pair. A public key in the public-private key pair is a real identifier of the terminal device, for example, may be a meaningful character string such as an email address or a telephone number. A private key in the public-private key pair is generated by a private key generator (PKG for short) or a key generation center (KGC for short) based on the public key in the public-private key pair and a master private key of the key generation center.

A pseudo identity may also be referred to as a pseudonym identity, is also generated by a PKG or a KGC, and is not a real identity of the terminal device. The pseudonym identity may include a pseudonym identifier of the terminal device, and the pseudonym identifier is equivalent to the public key in the public-private key pair.

A function of the pseudonym identity in a communications system is the same as a function of the pseudonym certificate in the communications system. A difference lies in that the terminal device no longer carries the certificate in a sent message, but uses the pseudonym identity in the sent message.

FIG. 1 is a first diagram of a system architecture according to an embodiment of this application. Referring to FIG. 1, the system architecture includes at least one terminal device 11, a registration server 12, a pseudonym identity generation server 13, a pseudonym certificate generation server 14, and a behavior investigation server 17.

The terminal device 11 may be a V2X device. The registration server 12 may be a registration authority (RA for short) server. The pseudonym identity generation server 13 is a KGC or PKG server. The pseudonym certificate generation server 14 is a PCA server. The pseudonym identity generation server 13 and the pseudonym certificate generation server 14 may be referred to as pseudonym credential generation servers.

FIG. 1 shows only an example of the system architecture designed in this application. There may be a plurality of registration servers 12, a plurality of pseudonym identity generation servers 13, a plurality of pseudonym certificate generation servers 14, and a plurality of behavior investigation servers 17.

Figure 2:
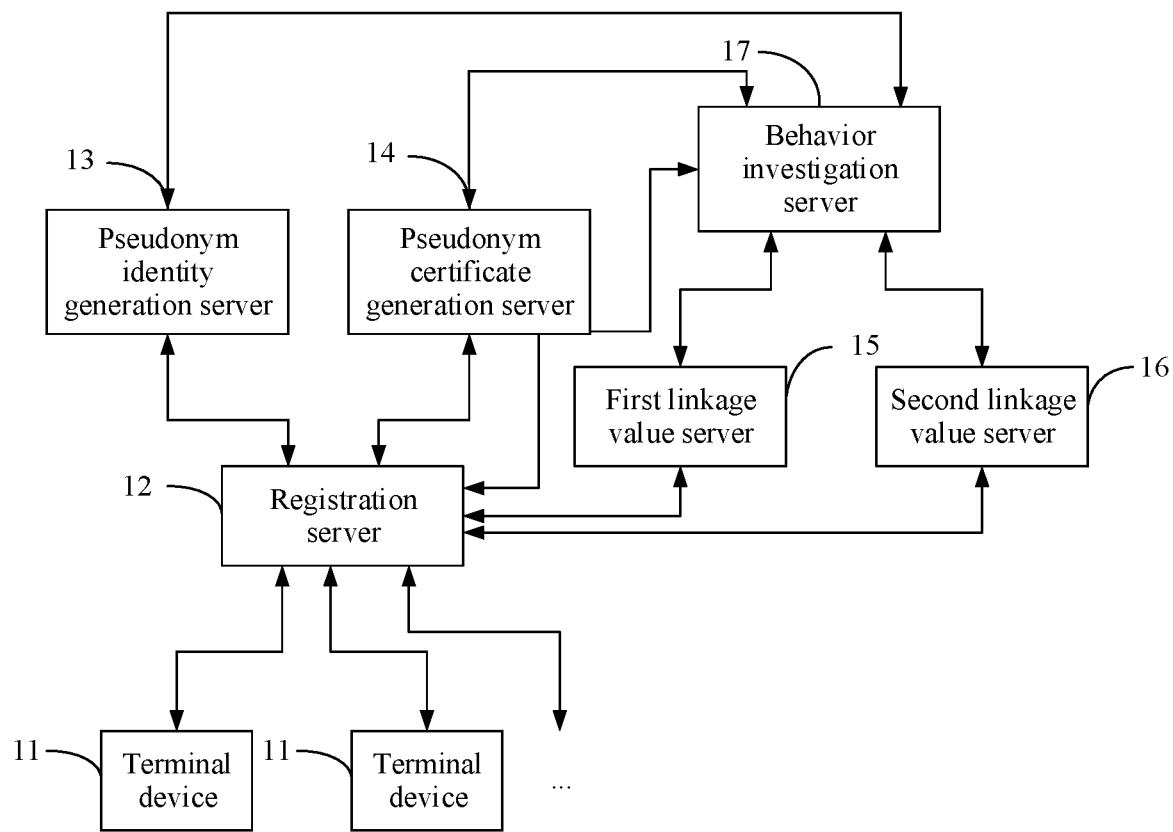
FIG. 2 is a second diagram of a system architecture according to an embodiment of this application.

FIG. 2 is a second diagram of a system architecture according to an embodiment of this application. Referring to FIG. 1, the system architecture includes at least one terminal device 11, a registration server 12, a pseudonym identity generation server 13, a pseudonym certificate generation server 14, a first linkage value server 15, a second linkage value server 16, and a behavior investigation server 17.

The terminal device 11 may be a V2X device. The registration server 12 may be a registration authority (RA for short) server. The pseudonym identity generation server 13 is a KGC or PKG server. The pseudonym certificate generation server 14 is a PCA server. The first linkage value server 15 a first linkage value authority (LA for short) server. The second linkage value server 16 is a second LA server.

The pseudonym identity generation server 13 and the pseudonym certificate generation server 14 may be referred to as pseudonym credential generation servers.

FIG. 2 shows only an example of the system architecture designed in this application. There may be a plurality of registration servers 12, a plurality of pseudonym identity generation servers 13, a plurality of pseudonym certificate generation servers 14, a plurality of first linkage value servers 15, a plurality of second linkage value servers 16, and a plurality of behavior investigation servers 17.

Figure 3:
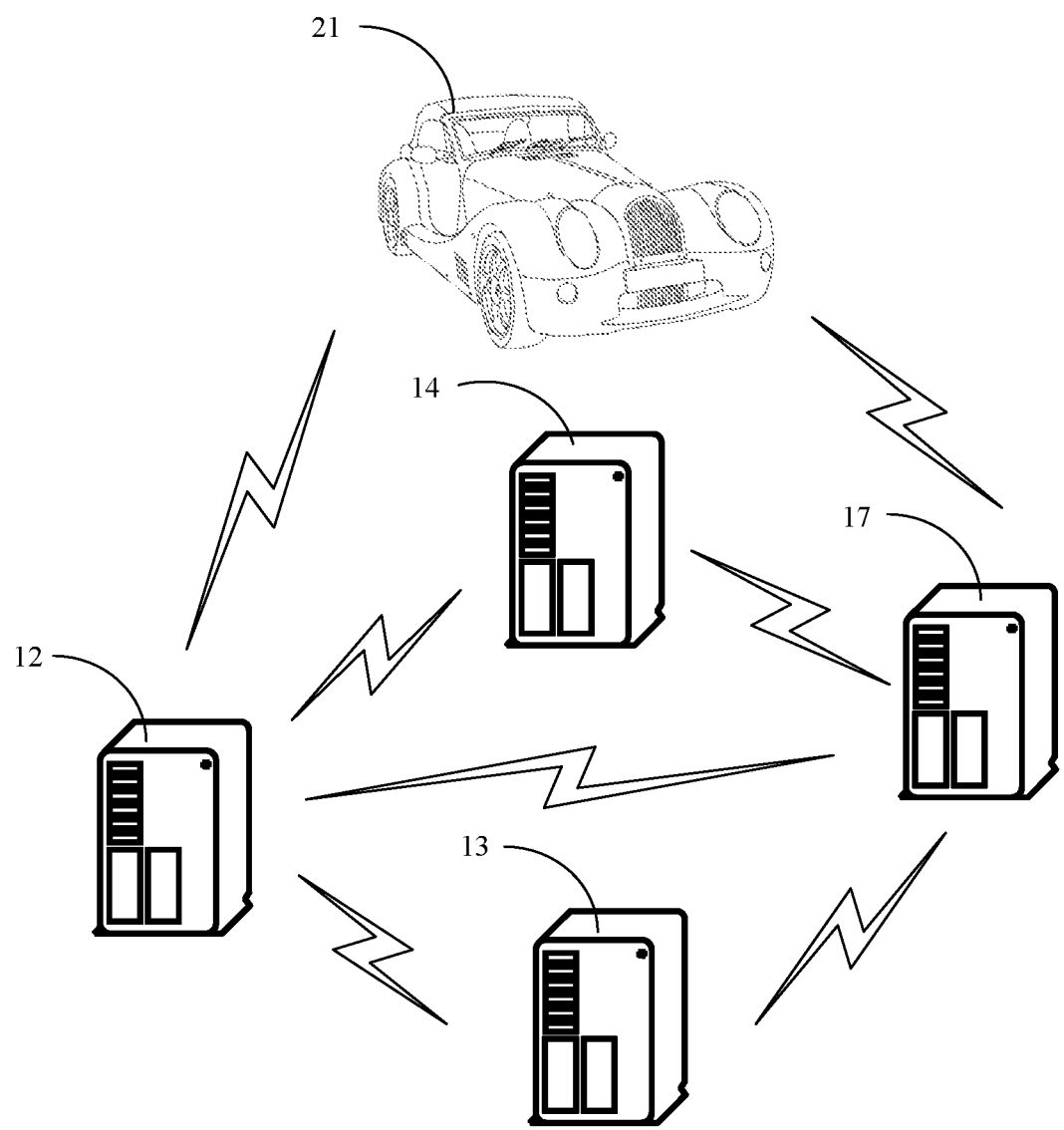
FIG. 3 is a schematic diagram of an application scenario based on the system architecture shown in FIG. 1.

FIG. 3 is a schematic diagram of an application scenario based on the system architecture shown in FIG. 1. Referring to FIG. 3, in an Internet of Vehicles, to ensure security of communication between a vehicle 21 and another vehicle, the vehicle 21 needs to obtain a plurality of pseudonym credentials (pseudonym certificates or pseudonym identities). In this case, the vehicle 21 sends a first request message to the registration server 12. The first request message includes an identifier of the vehicle 21 and information about N to-be-requested pseudonym credentials. The registration server 12 determines whether the first request message is a pseudonym certificate request message or a pseudonym identity request message; and if the first request message is a pseudonym certificate request message, sends N second request messages to the pseudonym certificate generation server 14; or if the first request message is a pseudonym identity request message, sends N second request messages to the pseudonym identity generation server 13. Each second request message includes a tag of the corresponding second request message, and information about one to-be-requested pseudonym credential in the information about the N to-be-requested pseudonym credentials. The pseudonym credential generation server (the pseudonym certificate generation server 14 or the pseudonym identity generation server 13) generates N pseudonym credentials based on the N second request messages. Each pseudonym credential includes the tag of the corresponding second request message. The pseudonym credential generation server sends the N pseudonym credentials to the registration server 12. The registration server 12 sends the N pseudonym credentials to the vehicle 21.

Further, after receiving a pseudonym credential that is of another vehicle and that is sent by any vehicle in the vehicle network, the behavior investigation server 17 sends the pseudonym credential to the registration server 12. Because an identifier of a vehicle and a tag of a second request message are stored in association with each other in the registration server 12, the registration server 12 may obtain an identifier of the another vehicle based on the tag included in the pseudonym credential, to determine a real identity of the another vehicle.

Figure 4:
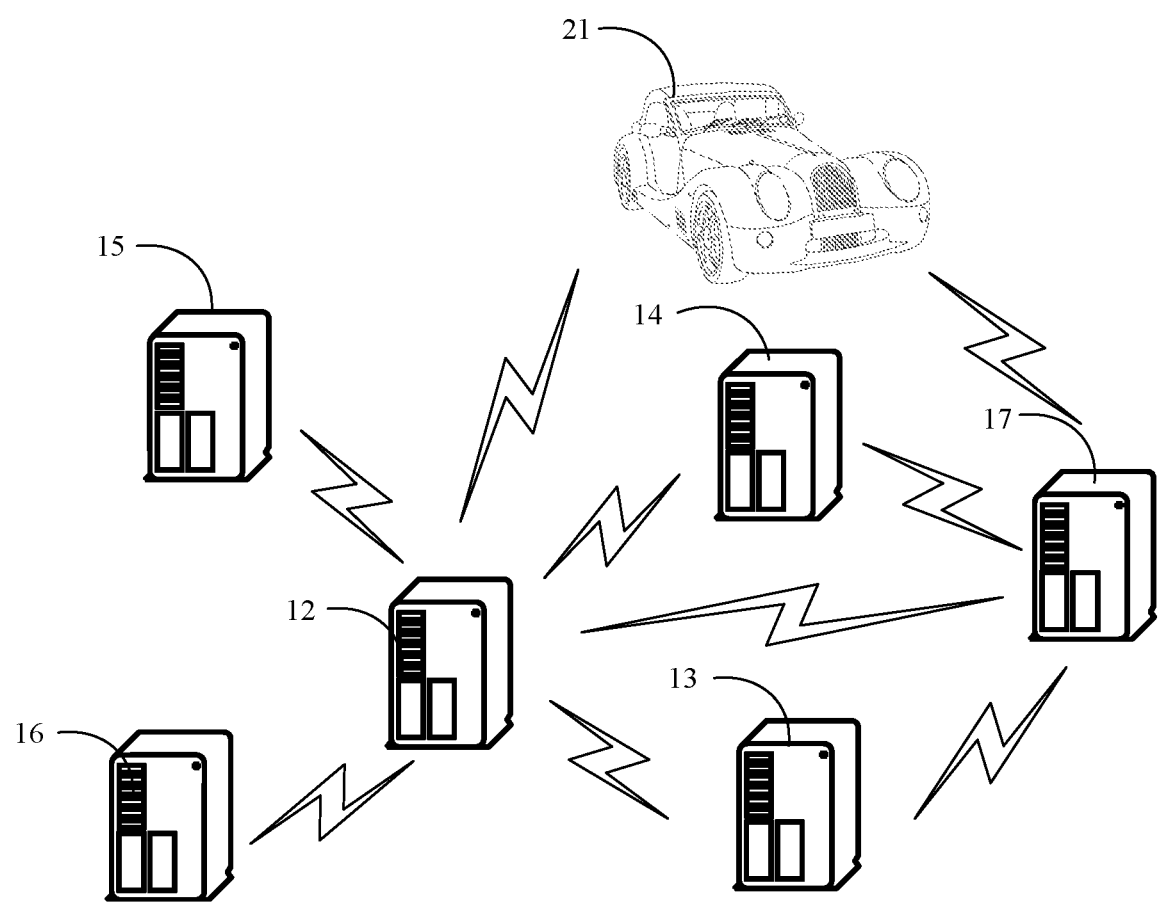
FIG. 4 is a schematic diagram of an application scenario based on the system architecture shown in FIG. 2.

FIG. 4 is a schematic diagram of an application scenario based on the system architecture shown in FIG. 2. Referring to FIG. 4, an Internet of Vehicles includes a plurality of vehicles 21. To ensure security of communication between each vehicle 21 and another vehicle, the vehicle 21 needs to obtain a plurality of pseudonym credentials (a pseudonym certificate or a pseudonym identity). In this case, the vehicle 21 sends a first request message to the registration server 12. The first request message includes an identifier of the vehicle 21 and information about N to-be-requested pseudonym credentials. The registration server 12 sends, to the first linkage value server 15, a message for requesting to generate N first pre-linkage values, and sends, to the second linkage value server 16, a message for requesting to generate N second pre-linkage values. The first linkage value server 15 generates N first pre-linkage values, and sends the N first pre-linkage values to the registration server 12. The second linkage value server 16 generates N second pre-linkage values, and sends the N second pre-linkage values to the registration server 12. The registration server 12 determines whether the first request message is a pseudonym certificate request message or a pseudonym identity request message, and if the first request message is a pseudonym certificate request message, sends N second request messages to the pseudonym certificate generation server 14; or if the first request message is a pseudonym identity request message, sends N second request messages to the pseudonym identity generation server 13. Each second request message includes a tag of the corresponding second request message, information about one to-be-requested pseudonym credential in the information about the N to-be-requested pseudonym credential information, one first pre-linkage value, and one second pre-linkage value. The pseudonym credential generation server (the pseudonym certificate generation server 14 or the pseudonym identity generation server 13) generates N pseudonym credentials (pseudonym certificates or pseudonym identities) based on the N second request messages. Each pseudonym credential includes the tag of the corresponding second request message and one linkage value (obtained based on a first pre-linkage value and a second pre-linkage value that are included in the corresponding second request message). The pseudonym credential generation server sends the N pseudonym credentials to the registration server 12. The registration server 12 sends the N pseudonym credentials to the vehicle 21.

Further, after receiving a pseudonym credential that is of another vehicle and that is sent by any vehicle in the vehicle network, the behavior investigation server 17 sends the pseudonym credential to the registration server 12. Because an identifier of a vehicle and a tag of a second request message are stored in association with each other in the registration server 12, the registration server 12 may obtain an identifier of the another vehicle based on the tag included in the pseudonym credential, to determine a real identity of the another vehicle. The registration server 12 sends first information related to the identifier of the another vehicle to the first linkage value server 15, so that the first linkage value server 15 obtains a first target value stored in linkage with the first information, and sends the first target value to the behavior investigation server 17. The registration server 12 sends second information related to the identifier of the another vehicle to the second linkage value server 15, so that the second linkage value server 15 obtains a second target value stored in linkage with the second information, and sends the second target value to the behavior investigation server 17. The behavior investigation server 17 obtains N linkage values based on the first target value and the second target value, and the behavior investigation server 17 revokes N pseudonym credentials including the linkage values in the N linkage values, that is, revokes N pseudonym credentials of the another vehicle.

For clarity in FIG. 4, communication connections between the behavior investigation server 17 and the second linkage value server 15 and between the behavior investigation server 17 and the second linkage value server 16 are not shown.

First, an example in which the pseudonym credential is a pseudonym certificate is used to describe a pseudonym credential configuration method provided in the embodiments of this application.

Figure 5:
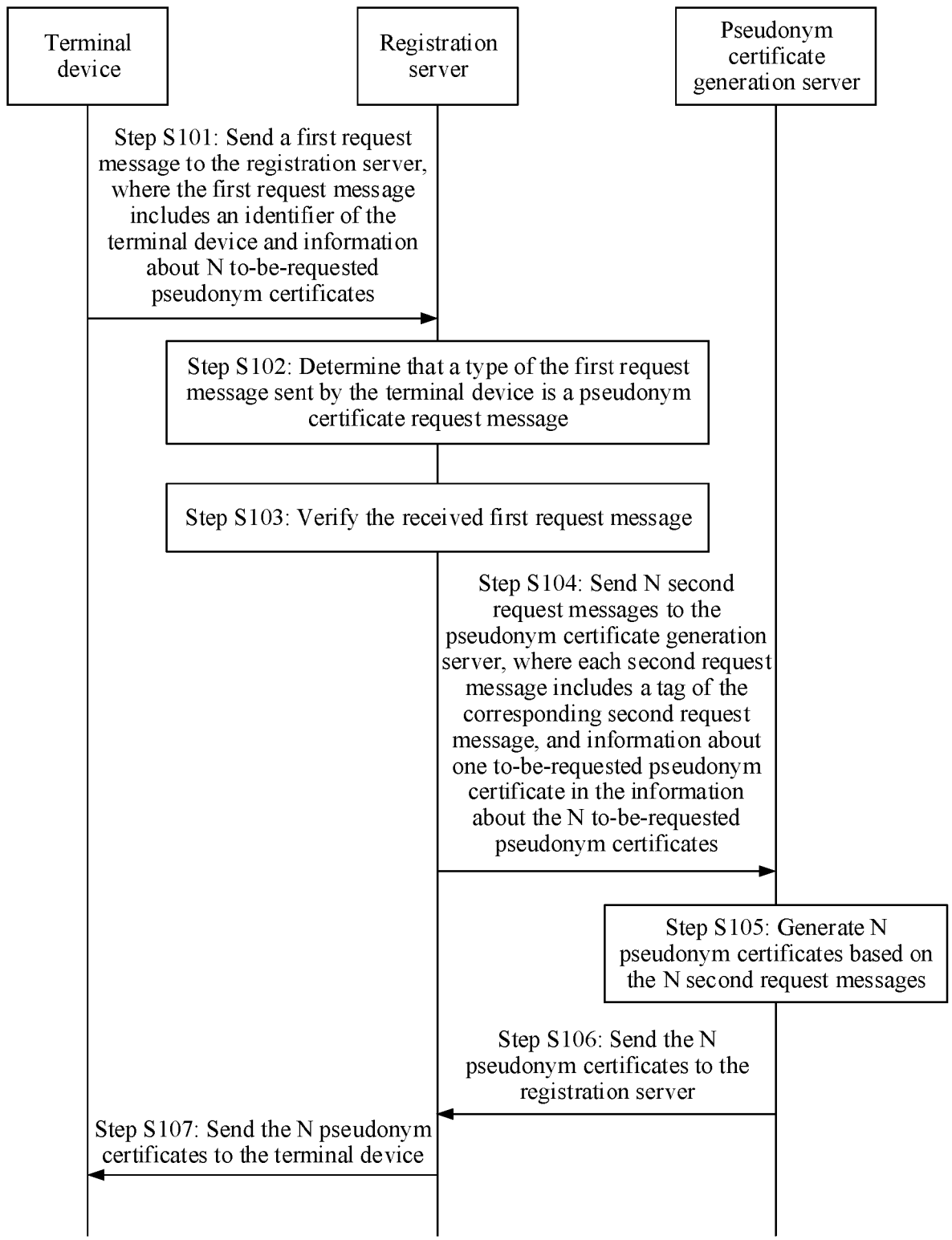
FIG. 5 is a first signaling interaction diagram of a pseudonym credential configuration method according to an embodiment of this application.

FIG. 5 is a first signaling interaction diagram of a pseudonym credential configuration method according to an embodiment of this application. Referring to FIG. 5, the method in this embodiment includes the following steps.

Step S101: A terminal device sends a first request message to a registration server, where the first request message includes an identifier of the terminal device and information about N to-be-requested pseudonym certificates.

Specifically, in this embodiment, the terminal device may be a V2X device, and the registration server is an RA server.

When the terminal device needs to apply for a pseudonym certificate, the terminal device sends a first request message to the registration server. The first request message includes an identifier ID1 of the terminal device and information about N to-be-requested pseudonym certificates. The identifier ID1 herein is a real identifier of the terminal device.

Specifically, information about a to-be-requested pseudonym certificate may include a temporary public key and a public key that needs to be written into the pseudonym certificate. If the terminal device needs to apply for 20 pseudonym certificates, the first request message includes information about 20 to-be-requested pseudonym certificates. In this case, information about a first to-be-requested pseudonym certificate may include a temporary public key 1 and a public key 1 that needs to be written into a pseudonym certificate 1; information about a second to-be-requested pseudonym certificate may include a temporary public key 2 and a public key 2 that needs to be written into a pseudonym certificate 2; information about a third to-be-requested pseudonym certificate may include a temporary public key 3 and a public key 3 that needs to be written into a pseudonym certificate 3; and so on. Information about a twentieth to-be-requested pseudonym certificate may include a temporary public key 20 and a public key 20 needs to be written into a pseudonym certificate 20.

To ensure that the registration server does not learn of each temporary public key and each public key that needs to be written into the pseudonym certificate, the information that is about each to-be-requested pseudonym credential and that is carried in the first request message may be information obtained after "the temporary public key and the public key that needs to be written into the pseudonym certificate" are encrypted by using a public key corresponding to a pseudonym certificate generation server. In this case, information about N to-be-requested pseudonym credentials may be represented as En(C1_VPK(0), C1_EPK(0), PCA_PK), En(C1_VPK(1), C1_EPK(1), PCA_PK), . . . , En(C1_VPK (i), C1_EPK(i), PCA_PK), . . . , and En(C1_VPK(N−1), C1_EPK(N−1), PCA_PK). C1_VPK(i) indicates a public key that needs to be written into an $(i+1)^{th}$ pseudonym certificate. C1_EPK(i) indicates an $(i+1)^{th}$ temporary public key. PCA_PK indicates the public key corresponding to the pseudonym certificate generation server. En(C1_VPK(i), C1_EPK(i), PCA_PK) indicates information obtained after "the public key that needs to be written into the $(i+1)^{th}$ pseudonym certificate and the $(i+1)^{th}$ temporary public key" are encrypted by using the public key PCA_PK corresponding to the pseudonym certificate generation server. i=0, 1, . . . , N−1.

The pseudonym certificate generation server is a PCA server.

The identifier ID1 of the terminal device, En(C1_VPK(0), C1_EPK(0), PCA_PK), En(C1_VPK(1), C1_EPK(1), PCA_PK), . . . , En(C1_VPK(i), C1_EPK(i), PCA_PK), . . . , and En(C1_VPK (N−1), C1_EPK (N−1), PCA_PK) may be referred to as a transmission text. To ensure confidentiality in a transmission process, the transmission text needs to be signed, that is, hash calculation needs to be performed on "ID1, En(C1_VPK(0), C1_EPK (0), PCA_PK), En(C1_VPK(1), C1_EPK(1), PCA_PK), . . . , En(C1_VPK(i), C1_EPK(i), PCA_PK), . . . , and En(C1_VPK(N−1), C1_EPK(N−1), PCA_PK)", to obtain a digest of the transmission text. Then, the digest of the transmission text is encrypted by using a private key (C1_ESK) corresponding to an ECA certificate of the terminal device, to obtain a signature of the transmission text.

Therefore, the first request message may include the identifier ID1 of the terminal device, En(C1_VPK(0), C1_EPK(0), PCA_PK), En(C1_VPK(1), C1_EPK(1), PCA_PK), . . . , En(C1_VPK(i), C1_EPK(i), PCA_PK), . . . , and En(C1_VPK(N−1), C1_EPK(N−1), PCA_PK), the signature of the transmission text, and the ECA certificate.

The ECA certificate described above may include the identifier ID1 of the terminal device, a public key corresponding to the ECA certificate, an ECA certificate expiration time, and a signature of the ECA certificate.

Step S102: The registration server determines that a type of the first request message sent by the terminal device is a pseudonym certificate request message.

Specifically, a method for determining, by the registration server, the type of the first request message sent by the terminal device may be implemented by using the following two implementations, but not limited to the following two implementations.

In an implementable implementation, if a received first request message carries an ECA certificate, the registration server determines that a type of the first request message is a pseudonym certificate request message; or if a received first request message carries no ECA certificate, the registration server determines that a type of the first request message is a pseudonym identity request message. For example, in step S101, when the terminal device sends a first request message used to request a pseudonym certificate to the registration server, if the first request message carries an ECA certificate, the registration server determines that the type of the first request message sent by the terminal device is a pseudonym certificate request message.

In another implementable implementation, the first request message further includes indication information, and the indication information indicates a type of the first request message. The registration server determines the type of the first request message based on the indication information. For example, if the indication information is a first identifier, it is determined that the type of the first request message is a pseudonym certificate request message; or if the indication information is a second identifier, it is determined that the type of the first request message is a pseudonym identity request message. For example, in step S101, if the terminal device requests a pseudonym certificate, the first request message carries the first identifier.

Step S103: The registration server verifies the received first request message.

After determining that the type of the first request message sent by the terminal device is a pseudonym certificate request message, the registration server decrypts a signature of a transmission text in the first request message by using a public key included in an ECA certificate in the first request message, to obtain a digest 1 of the transmission text. A hash algorithm used when the terminal device obtains the signature of the transmission text is used to obtain a digest 2 of the transmission text included in the first request message. If the digest 1 of the transmission text is the same as the digest 2 of the transmission text, it indicates that the first request message received by the registration server is the first request message sent by the terminal device and is not tampered with, that is, the first request message is successfully verified.

Step S204: After the first request message is successfully verified, the registration server sends N second request messages to the pseudonym certificate generation server, where each second request message includes a tag of the corresponding second request message, and information about one to-be-requested pseudonym certificate in the information about the N to-be-requested pseudonym certificates.

Specifically, a first form of the second request message is as follows: An $i^{th}$ second request message may be represented as m=(C1_VPK(i−1), C1_EPK(i−1), Code(m)$_{i-1}$), where Code(m)$_{i-1}$ is a tag of the $i^{th}$ second request message, and i=0, 2, ..., N−1.

It may be understood that information that is about each to-be-requested pseudonym credential and that is carried in the first request message corresponding to the second request message in this form is "a temporary public key and a public key that needs to be written into a pseudonym certificate" that are not encrypted by using the public key corresponding to the pseudonym certificate generation server.

A second form of the second request message is as follows: An $i^{th}$ second request message may be represented as m=En(C1_VPK(i−1), C1_EPK(i−1), Code(m)$_{i-1}$), where Code(m)$_{i-1}$ is a tag of the $i^{th}$ second request message, and i=0, 2, ..., N−1.

It may be understood that information that is about each to-be-requested pseudonym credential and that is carried in the first request message corresponding to the second request message in this form is information obtained after "a temporary public key and a public key that needs to be written into a pseudonym certificate" are encrypted by using the public key corresponding to the pseudonym certificate generation server.

When the second request message is in the foregoing second form, it can be ensured that the registration server does not learn of the public key that needs to be written into the pseudonym certificate or the temporary public key, thereby ensuring confidentiality of the pseudonym certificate.

Code(m)$_{i-1}$ may be a randomly generated code, or may be a hash value obtained based on "En(C1_VPK(i−1), C1_EPK(i−1), PCA_PK)".

The tag of each second request message and the identifier of the terminal device are stored in association with each other in the registration server, or the tag of the second request message, the second request message, and the identifier of the terminal device are stored in association with each other in the registration server, so that the registration server can obtain, based on the tag of the second request message, the identifier that is of the terminal device and that is associated with the tag of the second request message.

It may be understood that, in step S104, if the type of the first request message is a pseudonym certificate request message, the registration server sends the N second request messages to the pseudonym certificate generation server; or if the type of the first request message is a pseudonym identity request message, the registration server sends the N second request messages to the pseudonym identity generation server. Based on the system architecture in the embodiments of this application, in the method in this embodiment of this application, both a pseudonym identity and the pseudonym certificate can be generated.

Step S105: The pseudonym certificate generation server generates N pseudonym certificates based on the N second request messages.

Specifically, because the second request message does not include the identifier of the terminal device, the pseudonym certificate generation server does not learn of a terminal device to which the pseudonym certificate belongs, but learns of content of the pseudonym certificate. As described above, if the first request message includes En(C1_VPK(0), C1_EPK(0), PCA_PK), En(C1_VPK(1), C1_EPK(1), PCA_PK), . . . , En(C1_VPK(i), C1_EPK(i), PCA_PK), . . . , and En(C1_VPK(N−1), C1_EPK(N−1), PCA_PK), it can be ensured that the registration server does not learn of content of the pseudonym certificate, but learns of an owner of the pseudonym certificate. In this way, confidentiality of the generated pseudonym certificate can be ensured, and the pseudonym certificate is not easily stolen by a single device.

If the information about the to-be-requested pseudonym certificate in the second request message is information obtained after actual information of the to-be-requested pseudonym certificate is encrypted by using the public key of the pseudonym certificate generation server, that is, the $i^{th}$ second request message may be represented as m=((En(C1_VPK(i−1), C1_EPK(i−1), PCA_PK)), Code(m)i−1), that the pseudonym certificate generation server generates a pseudonym certificate based on the second request message includes:

The pseudonym certificate generation server decrypts the information about the to-be-requested pseudonym certificate by using a private key of the pseudonym certificate generation server, to obtain actual information of the to-be-requested certificate.

The pseudonym certificate generation server generates the pseudonym certificate based on the tag of the second request message and at least a part of the actual information of the to-be-requested pseudonym credential.

Alternatively, that the pseudonym certificate generation server generates a pseudonym certificate based on the second request message includes:

The pseudonym certificate generation server decrypts the information about the to-be-requested pseudonym certificate by using a private key of the pseudonym certificate generation server, to obtain actual information of the to-be-requested certificate.

The pseudonym certificate generation server encrypts the tag of the second request message by using a symmetric key of the pseudonym certificate generation server, to obtain an encrypted tag.

The pseudonym certificate generation server generates the pseudonym certificate based on the encrypted tag and at least a part of the actual information of the to-be-requested pseudonym certificate.

Specifically, if the $i^{th}$ second request message may be represented as m=(En(C1_VPK(i−1), C1_EPK(i−1), PCA_PK), Code$(m)_{i-1}$), the pseudonym certificate generation server decrypts En(C1_VPK(i−1), C1_EPK(i−1), PCA_PK) by using a private key corresponding to PCA_PK (that is, a private key of the pseudonym certificate generation server), to obtain C1_VPK(i−1) and C1_EPK(i−1) (C1_VPK(i−1) and C1_EPK(i−1) are the actual information of the to-be-requested pseudonym certificate), and writes C1_VPK(i−1) into an $i^{th}$ pseudonym certificate, that is, C1_VPK(i−1) is a public key included in the $i^{th}$ generated pseudonym certificate.

The pseudonym certificate generation server encrypts Code$(m)_{i-1}$ by using a symmetric key (which may be a symmetric key of PCA) corresponding to the pseudonym certificate generation server, to obtain encrypted Code$(m)_{i-1}$, and writes the encrypted Code(m)i−1 into the $i^{th}$ pseudonym certificate.

The pseudonym certificate generation server may further write an expiration time of the $i^{th}$ pseudonym certificate into the pseudonym certificate.

The pseudonym certificate generation server may perform a hash operation based on C1_VPK(i−1), the encrypted Code$(m)_{i-1}$, and the expiration time of the $i^{th}$ pseudonym certificate, to obtain a hash value, and encrypt the hash value by using the private key of the pseudonym certificate generation server, obtain a signature of the pseudonym certificate. Therefore, the $i^{th}$ pseudonym certificate may include C1_VPK(i−1), the encrypted Code$(m)_{i-1}$, the expiration time of the $i^{th}$ pseudonym certificate, and the signature of the pseudonym certificate.

After obtaining the $i^{th}$ pseudonym certificate, the pseudonym certificate generation server may encrypt the $i^{th}$ pseudonym certificate by using decrypted C1_EPK(i−1) (an $i^{th}$ temporary public key), to obtain an $i^{th}$ encrypted pseudonym certificate.

Encrypting each generated pseudonym certificate can ensure that in a subsequent step, after the pseudonym certificate generation server sends the N pseudonym certificates to the registration server, the registration server does not learn of content included in the pseudonym certificates.

In conclusion, the pseudonym certificate generation server generates one pseudonym certificate based on each second request message, or generates N encrypted pseudonym certificates of the terminal device based on the N second request messages.

Step S106: The pseudonym certificate generation server sends the N pseudonym certificates to the registration server.

It may be understood that, if the pseudonym certificate generation server encrypts the generated pseudonym certificate by using the temporary public key, the pseudonym certificate generation server sends the N encrypted pseudonym certificates to the registration server.

Step S107: The registration server sends the N pseudonym certificates to the terminal device.

It may be understood that if the registration server receives N encrypted pseudonym certificates, the registration server sends the N encrypted pseudonym certificates to the terminal device.

Because the pseudonym certificate generation server encrypts the generated pseudonym certificate by using the temporary public key carried in the first request message sent by the terminal device to the registration server, and the terminal device stores a private key corresponding to the temporary public key, after receiving the N pseudonym certificates, the terminal device decrypts the N encrypted pseudonym certificates by using the private key corresponding to the temporary public key, to obtain the N pseudonym certificates.

In addition, the terminal device or the pseudonym certificate generation server further generates a private key corresponding to the public key in the pseudonym certificate. If there are N pseudonym certificates, N corresponding private keys are generated. If the private key corresponding to the public key in the pseudonym certificate is generated by the pseudonym certificate generation server, the pseudonym certificate generation server sends the private key corresponding to the public key in the pseudonym certificate to the terminal device.

In the foregoing process, the terminal device obtains the N pseudonym certificates. Subsequently, the terminal device can perform communication by using the N pseudonym certificates. For example, when the $i^{th}$ pseudonym certificate is used for communication, a transmit end signs to-be-transmitted information by using a private key corresponding to the public key in the $i^{th}$ pseudonym certificate, and carries the $i^{th}$ pseudonym certificate. A receive end verifies the received information by using the public key in the $i^{th}$ pseudonym certificate, to ensure communication security.

In this embodiment, the generated pseudonym certificate includes the tag of the second request message, and the tag of the second request message and the real identifier of the terminal device are stored in association with each other in the registration server. In this way, when the terminal device has an improper behavior, the registration server can obtain the real identifier of the terminal device based on the tag in the pseudonym certificate, so that a real identity of the terminal device can be quickly determined based on the pseudonym certificate.

Figure 6A:
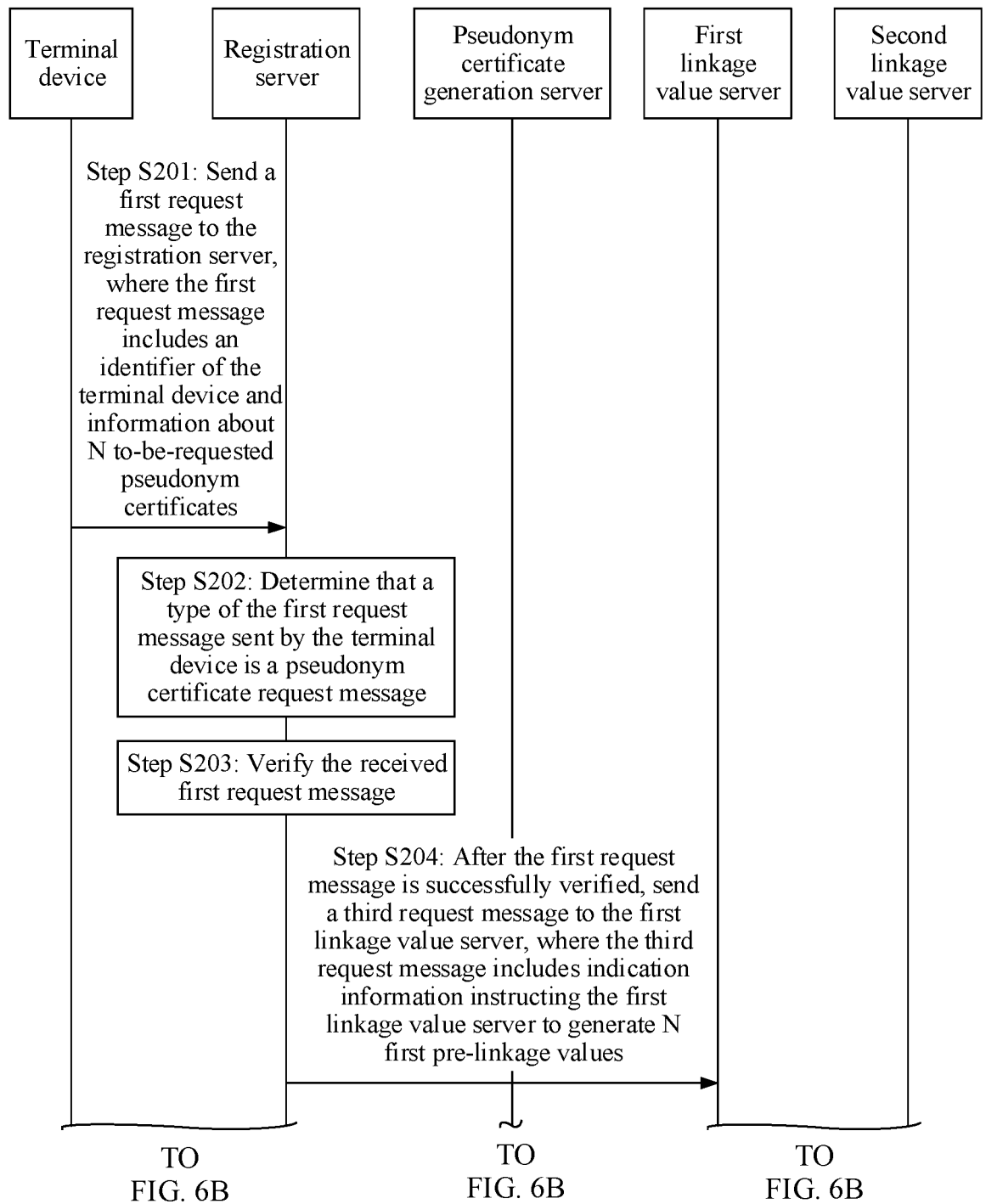
FIG. 6A, FIG. 6B and FIG. 6C are a second signaling interaction diagram of a pseudonym credential configuration method according to an embodiment of this application.
Figure 6B:
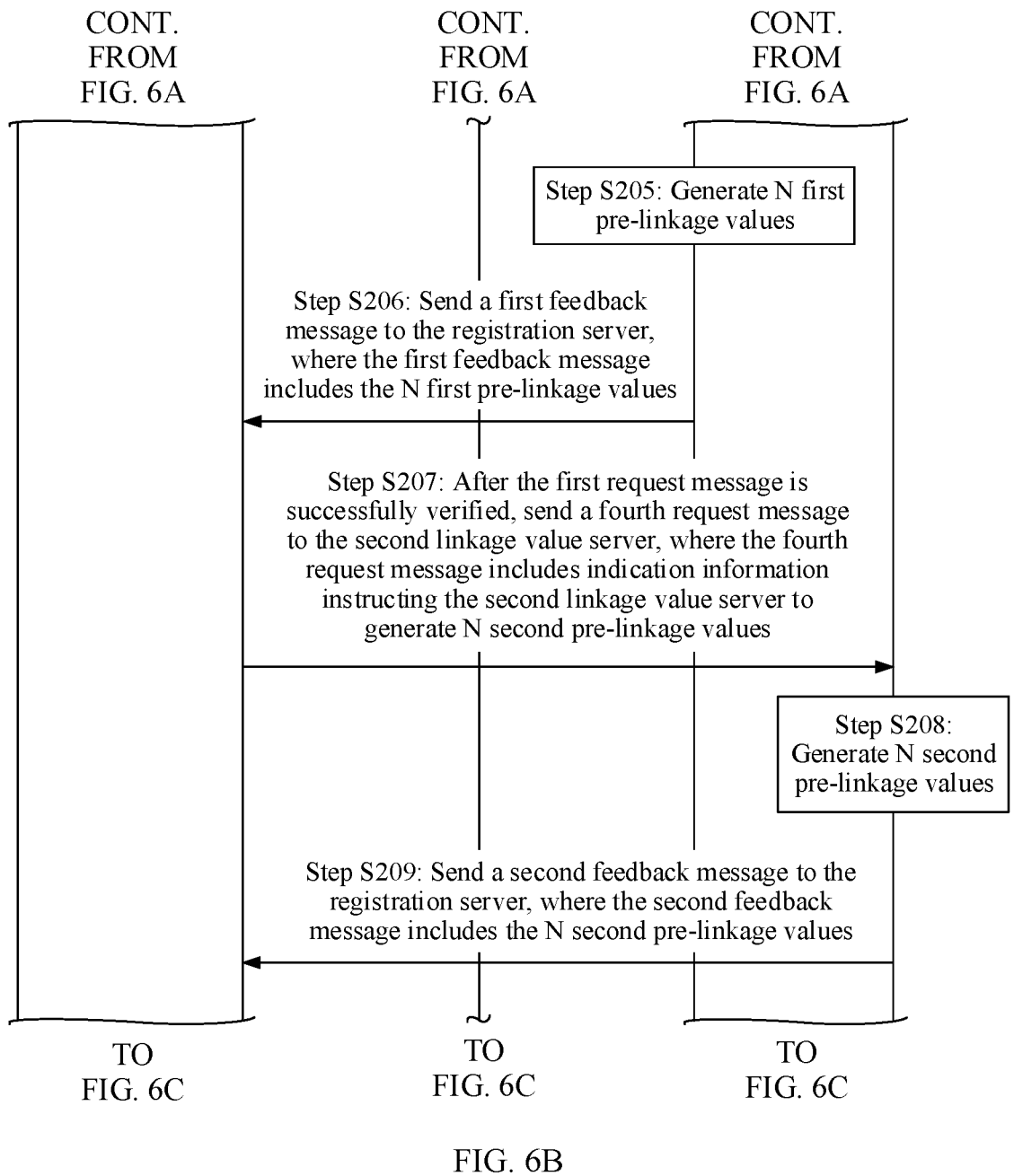
Figure 6C:
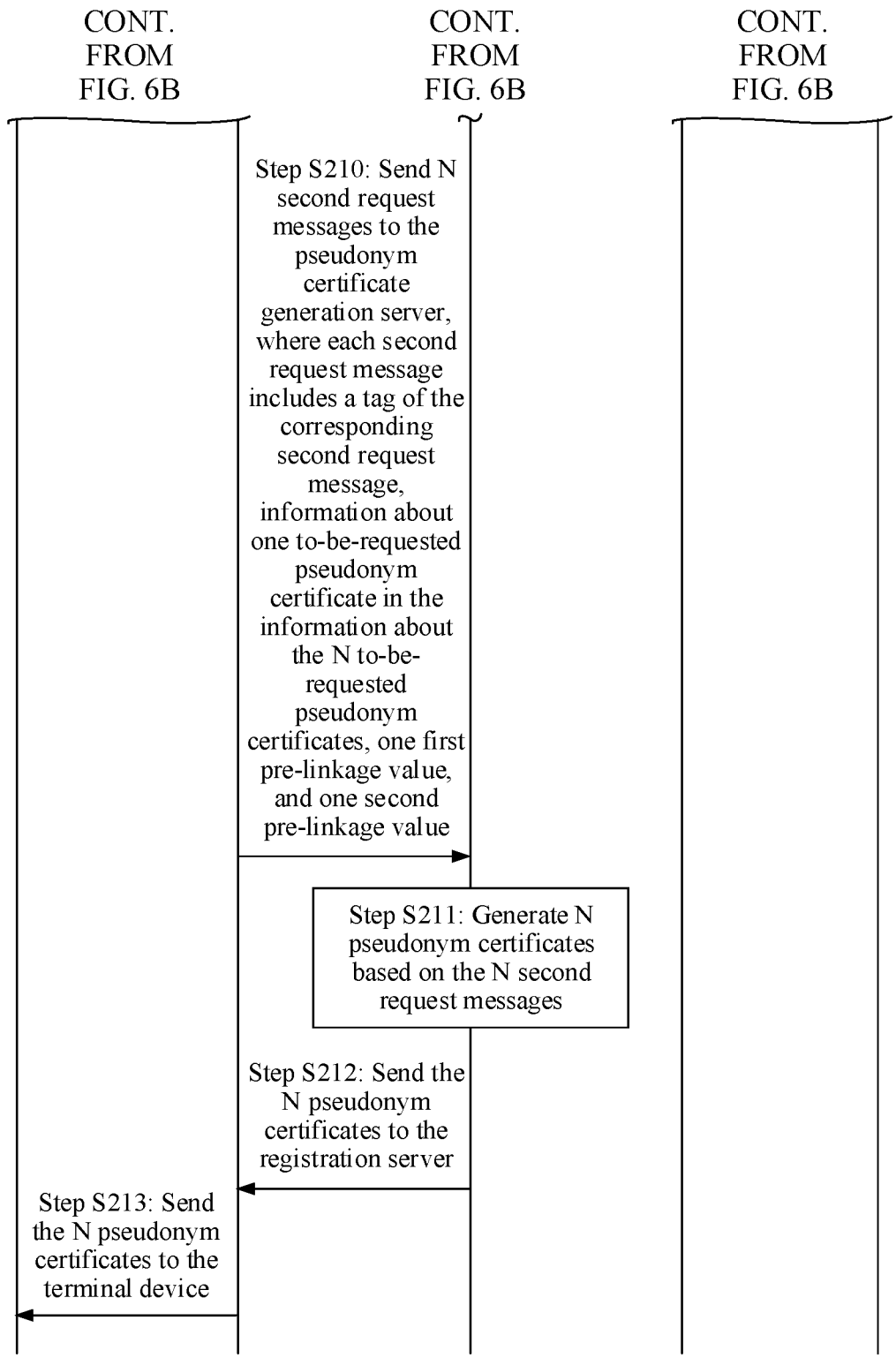

To quickly revoke a plurality of pseudonym certificates of a terminal device when the terminal device has an improper behavior, this embodiment makes further improvements based on the foregoing embodiment. FIG. 6A, FIG. 6B and FIG. 6C are a second signaling interaction diagram of a pseudonym credential configuration method according to an embodiment of this application. Referring to FIG. 6A, FIG. 6B and FIG. 6C, the method in this embodiment includes the following steps.

Step S201: A terminal device sends a first request message to a registration server, where the first request message includes an identifier of the terminal device and information about N to-be-requested pseudonym certificates.

For a specific implementation, refer to the description in the foregoing embodiment. Details are not described in this embodiment again.

Step S202: The registration server determines that a type of the first request message sent by the terminal device is a pseudonym certificate request message.

For a specific implementation, refer to the description in the foregoing embodiment. Details are not described in this embodiment again.

Step S203: The registration server verifies the received first request message.

For a specific implementation, refer to the description in the foregoing embodiment. Details are not described in this embodiment again.

Step S204: After the first request message is successfully verified, the registration server sends a third request message to a first linkage value server, where the third request message includes indication information instructing the first linkage value server to generate N first pre-linkage values.

Specifically, the third request message further includes a first hash value obtained after the registration server performs a hash operation on the identifier ID1 of the terminal device and a first random number. The first random number is a random number randomly generated by the registration server for the terminal device.

The first linkage value server is a first LA server.

The registration server stores the first hash value in association with the identifier ID1 of the terminal device, so that the registration server can obtain the identifier ID1 of the terminal device based on the first hash value, or obtain the first hash value based on the identifier ID1 of the terminal device.

Step S205: The first linkage value server generates N first pre-linkage values.

That the first linkage value server generates N first pre-linkage values includes: The first linkage value server generates N first seed values, where the N first seed values include one first native seed value. The first linkage value server generates N first pre-linkage values based on the N first seed values.

Specifically, the first linkage value server first generates a first native seed value $LS_1(0)$, a $k^{th}$ seed value is a hash value of a $(k-1)^{th}$ seed value, $k=2, 3, \ldots, N$, and a first seed value is the first native seed value $LS_1(0)$. For example, $LS_1(1)=\text{Hash}(LS_1(0))$, and $LS_1(2)=\text{Hash}(LS_1(1))$, that is, $LS_1(k)=\text{Hash}(LS_1(k-1))$.

An $m^{th}$ first pre-linkage value may be a part, for example, the first half or the last half of an $m^{th}$ first seed value; or an $m^{th}$ first pre-linkage value is a hash value of an $m^{th}$ first seed value, where $m=1, 2, 3, \ldots, N$.

Further, the first linkage value server stores the first hash value in association with the N first seed values, so that the first linkage value server can obtain the N first seed values based on the first hash value, or can obtain the first hash value based on the N first seed values.

Alternatively, the first linkage value server stores the first hash value in association with the first native seed value, so that the first linkage value server can obtain the first native seed value based on the first hash value, or can obtain the first hash value based on the first native seed value.

Alternatively, the first linkage value server stores the first hash value in association with the N first pre-linkage values, so that the first linkage value server can obtain the N first pre-linkage values based on the first hash value, or can obtain the first hash value based on the N first pre-linkage values.

Step S206: The first linkage value server sends a first feedback message to the registration server, where the first feedback message includes the N first pre-linkage values.

Specifically, the first feedback message may further include the first hash value, and the first hash value is a hash value corresponding to the identifier of the terminal device and the first random number.

To ensure that the registration server does not learn of the N first pre-linkage values, the N first pre-linkage values in the first feedback message may be N first pre-linkage values encrypted by using a public key PCA_PK of a pseudonym certificate generation server, and may be represented as EPLV1(0), EPLV1(2), EPLV1(i), . . . , and EPLV1(N−1). EPLV1(i)=En(PLV1(i), PCA_PK), indicating that an $(i+1)^{th}$ first pre-linkage value is encrypted by using the public key PCA_PK of the pseudonym certificate generation server.

Step S207: After the first request message is successfully verified, the registration server sends a fourth request message to a second linkage value server, where the fourth request message includes indication information instructing the second linkage value server to generate N second pre-linkage values.

Specifically, the fourth request message further includes a second hash value obtained by performing a hash operation on the identifier ID1 of the terminal device and a second random number. The second random number is a random number randomly generated by the registration server for the terminal device.

The second linkage value server is a second LA server.

The registration server stores the second hash value in association with the identifier ID1 of the terminal device, so that the registration server can obtain the identifier ID1 of the terminal device based on the second hash value, or obtain the second hash value based on the identifier ID1 of the terminal device.

Step S208: The second linkage value server generates N second pre-linkage values.

That the second linkage value server generates N second pre-linkage values includes: The second linkage value server generates N second seed values. The N first seed values include one second native seed value. The second linkage value server generates N second pre-linkage values based on the N second seed values.

Specifically, the second linkage value server first generates a second native seed value $LS_2(0)$, a $k^{th}$ seed value is a hash value of a $(k-1)^{th}$ seed value, and k is equal to 2, 3, . . . , N. For example, $LS_2(1)=\text{Hash}(LS_2(0))$, and $LS_2(2)=\text{Hash}(LS_2(2))$, that is, $LS_2(k)=\text{Hash}(LS_2(k-1))$.

An $m^{th}$ second pre-linkage value may be a part, for example, the first half or the last half of an $m^{th}$ second seed value; or an $m^{th}$ second pre-linkage value is a hash value of an $m^{th}$ second seed value, where $m=1, 2, 3, \ldots, N$.

Further, the second linkage value server stores the second hash value in association with the N second seed values, so that the second linkage value server can obtain the N second seed values based on the second hash value, or can obtain the second hash value based on the N second seed values.

Alternatively, the second linkage value server stores the second hash value in association with the second native seed value, so that the second linkage value server can obtain the second native seed value based on the second hash value, or can obtain the second hash value based on the second native seed value.

Alternatively, the second linkage value server stores the second hash value in association with the N second pre-linkage values, so that the second linkage value server can obtain the N second pre-linkage values based on the second hash value, or can obtain the second hash value based on the N second pre-linkage values.

Step S209: The second linkage value server sends a second feedback message to the registration server, where the second feedback message includes the N second pre-linkage values.

Specifically, the second feedback message may further include the second hash value, and the second hash value is a hash value corresponding to a combination of the identifier of the terminal device and the second random number.

To ensure that the registration server does not learn of the N second pre-linkage values, the N second pre-linkage values in the first feedback message may be N second pre-linkage values encrypted by using a public key PCA_PK of a pseudonym certificate generation server, and may be represented as EPLV2(1), EPLV2(2), ..., EPLV2(i), ..., and EPLV2(N). EPLV1(i)=En(PLV1(i), PCA_PK), indicating that an $(i+1)^{th}$ second pre-linkage value PLV1(i) is encrypted by using the public key PCA_PK of the pseudonym certificate generation server.

Step S210: The registration server sends N second request messages to the pseudonym certificate generation server, where each second request message includes a tag of the corresponding second request message, information about one to-be-requested pseudonym certificate in the information about the N to-be-requested pseudonym certificates, one first pre-linkage value, and one second pre-linkage value.

Specifically, an $i^{th}$ second request message may be represented as m=((C1_VPK(i−1), C1_EPK(i−1), PLV1(i−1), PLV2(i−1)), Code(m)$_{i-1}$), where Code(m)$_{i-1}$ is a tag of the $i^{th}$ second request message, and i=0, 1, ..., N−1.

Alternatively, an $i^{th}$ second request message may be represented as m=((En(C1_VPK(i−1), C1_EPK(i−1), PCA_PK), EPLV1(i−1), EPLV2(i−1)), Code(m)$_{i-1}$), where Code(m)$_{i-1}$ is a tag of the $i^{th}$ second request message, and i=0, 1, ..., N−1.

When the $i^{th}$ second request message is in the foregoing second form, it can be ensured that the registration server does not learn of a public key that needs to be written into a pseudonym certificate, a temporary public key, and a first pre-linkage value and a second pre-linkage value that are required for generating a linkage value of the pseudonym certificate.

Code(m)$_{i-1}$ may be a randomly generated code, or may be a hash value obtained based on "En(C1_VPK(i−1), C1_EPK(i−1), PCA_PK), EPLV1(i−1), and EPLV2(i−1)".

The tag of each second request message and the identifier of the terminal device are stored in association with each other in the registration server, or the tag of the second request message, the second request message, and the identifier of the terminal device are associated and stored in the registration server, so that the registration server can obtain, based on the tag of the second request message, the identifier that is of the terminal device and that is associated with the tag of the second request message.

It may be understood that, if the type of the first request message is a pseudonym certificate request message, the registration server sends the N second request messages to the pseudonym certificate generation server; or if the type of the first request message is a pseudonym identity request message, the registration server sends the N second request messages to the pseudonym identity generation server. Based on the system architecture in the embodiments of this application, in the method in this embodiment of this application, both a pseudonym identity and the pseudonym certificate can be generated.

Step S211: The pseudonym certificate generation server generates N pseudonym certificates based on the N second request messages.

Specifically, because the second request message does not include the identifier of the terminal device, the pseudonym certificate generation server does not learn of a terminal device to which the pseudonym certificate belongs, but learns of content of the pseudonym certificate. As described above, if the first request message includes ID1, En(C1_VPK(0), C1_EPK(0), PCA_PK), En(C1_VPK(1), C1_EPK(1), PCA_PK), ..., En(C1_VPK(i), C1_EPK(i), PCA_PK), ..., and En(C1_VPK(N−1), C1_EPK(N−1), PCA_PK), the first feedback message includes EPLV1(0), EPLV1(2), ..., EPLV1(i), ..., and EPLV1(N−1), and the second feedback message includes EPLV2(0), EPLV2(1), ..., EPLV2(i), ..., and EPLV2(N−1), it can be ensured that the registration server does not learn of content of the pseudonym certificate, but learns of an owner of the pseudonym certificate. In this way, confidentiality of the generated pseudonym certificate can be ensured, and the pseudonym certificate is not easily stolen by a single device.

If the information about the to-be-requested pseudonym certificate in the second request message is information obtained after actual information of the to-be-requested pseudonym certificate is encrypted by using the public key of the pseudonym certificate generation server, and the first pre-linkage value and the second pre-linkage value that are encrypted by using the public key of the pseudonym certificate generation server, that is, the $i^{th}$ second request message may be represented as m=((En(C1_VPK(i−1), C1_EPK(i−1), PCA_PK), EPLV1(i−1), EPLV2(i−1)), Code (m)$_{i-1}$), that the pseudonym certificate generation server generates a pseudonym certificate based on the second request message includes:

The pseudonym certificate generation server decrypts the information about the to-be-requested pseudonym certificate by using a private key of the pseudonym certificate generation server, to obtain actual information of the to-be-requested certificate.

The pseudonym certificate generation server decrypts, by using the private key of the pseudonym certificate generation server, the first pre-linkage value and the second pre-linkage value that are encrypted by using the public key of the pseudonym certificate generation server, to obtain the first pre-linkage value and the second pre-linkage value.

The pseudonym certificate generation server performs an exclusive OR operation on the first pre-linkage value and the second pre-linkage value to obtain a linkage value.

The pseudonym certificate generation server generates the pseudonym certificate based on the tag of the second request message, at least a part of the actual information of the to-be-requested pseudonym credential, and the linkage value.

Alternatively, that the pseudonym certificate generation server generates a pseudonym certificate based on the second request message includes:

The pseudonym certificate generation server decrypts the information about the to-be-requested pseudonym certificate by using a private key of the pseudonym certificate generation server, to obtain actual information of the to-be-requested certificate.

The pseudonym certificate generation server decrypts, by using the private key of the pseudonym certificate generation server, the first pre-linkage value and the second pre-linkage value that are encrypted by using the public key of the pseudonym certificate generation server, to obtain the first pre-linkage value and the second pre-linkage value.

The pseudonym certificate generation server performs an exclusive OR operation on the first pre-linkage value and the second pre-linkage value to obtain a linkage value.

The pseudonym certificate generation server encrypts the tag of the second request message by using a symmetric key of the pseudonym certificate generation server, to obtain an encrypted tag.

The pseudonym certificate generation server generates the pseudonym certificate based on the encrypted tag, at least a part of the actual information of the to-be-requested pseudonym certificate, and the linkage value.

The linkage value is obtained based on the first pre-linkage value generated by the first linkage value server and the second pre-linkage value generated by the second linkage value server, so that it can be ensured that the linkage value written into the pseudonym certificate is learned of by only the pseudonym certificate generation server, thereby further ensuring security of the pseudonym certificate.

Specifically, if the $i^{th}$ second request message may be represented as m=((En(C1_VPK(i-1), C1_EPK(i-1), PCA_PK), EPLV1(i-1), EPLV2(i-1)), Code(m)$_{i-1}$), the pseudonym certificate generation server decrypts En(C1_VPK(i-1), C1_EPK(i-1), PCA_PK) by using a private key corresponding to PCA_PK (that is, the private key of the pseudonym certificate generation server), to obtain C1_VPK(i-1) and C1_EPK(i-1) (C1_VPK(i-1) and C1_EPK(i-1) are the actual information of the to-be-requested pseudonym certificate), and writes C1_VPK(i-1) into an $i^{th}$ pseudonym certificate, that is, C1_VPK(i-1) is a public key included in the $i^{th}$ generated pseudonym certificate.

The pseudonym certificate generation server decrypts EPLV1(i-1) and EPLV2(i-1) by using the private key corresponding to PCA_PK to obtain PLV1(i-1) and PLV2(i-1), and then performs the exclusive OR operation on PLV1(i-1) and PLV2(i-1) to obtain LV1(i-1). LV1(i-1) indicates an $i^{th}$ linkage value generated after the exclusive OR operation is performed on an $i^{th}$ first pre-linkage value and an $i^{th}$ second pre-linkage value, and writes the $i^{th}$ linkage value into the $i^{th}$ pseudonym certificate.

The pseudonym certificate generation server encrypts Code(m)$_{i-1}$ by using a symmetric key (which may be a symmetric key of PCA) corresponding to the pseudonym certificate generation server, to obtain encrypted Code(m)$_{i-1}$, and writes the encrypted Code(m)$_{i-1}$ into the $i^{th}$ pseudonym certificate.

The pseudonym certificate generation server may further write an expiration time of the $i^{th}$ pseudonym certificate into the pseudonym certificate.

The pseudonym certificate generation server may perform a hash operation based C1_VPK(i-1), LV1(i-1), the encrypted Code(m)$_{i-1}$, and the expiration time of the $i^{th}$ pseudonym certificate, to obtain a hash value, and encrypt the hash value by using the private key corresponding to the pseudonym certificate generation server, to obtain a signature of the pseudonym certificate. Therefore, the $i^{th}$ pseudonym certificate may include C1_VPK(i-1), LV1(i-1), the encrypted Code(m)$_{i-1}$, the expiration time of the $i^{th}$ pseudonym certificate, and the signature of the pseudonym certificate.

After obtaining the $i^{th}$ pseudonym certificate, the pseudonym certificate generation server may encrypt the $i^{th}$ pseudonym certificate by using decrypted C1_EPK(i-1) (an $i^{th}$ temporary public key) and C1_EPK(i-1), to obtain an $i^{th}$ encrypted pseudonym certificate.

Encrypting each generated pseudonym certificate can ensure that in a subsequent step, after the pseudonym certificate generation server sends the N pseudonym certificates to the registration server, the registration server does not learn of content included in the pseudonym certificates.

In conclusion, the pseudonym certificate generation server generates one pseudonym certificate based on each second request message, or generates N encrypted pseudonym certificates of the terminal device based on the N second request messages.

Step S212: The pseudonym certificate generation server sends the N pseudonym certificates to the registration server.

For a specific implementation, refer to the description in the foregoing embodiment. Details are not described in this embodiment again.

Step S213: The registration server sends the N pseudonym certificates to the terminal device.

For a specific implementation, refer to the description in the foregoing embodiment. Details are not described in this embodiment again.

In the foregoing process, the terminal device obtains the N pseudonym certificates. Subsequently, the terminal device can perform communication by using the N pseudonym certificates. For example, when the $i^{th}$ pseudonym certificate is used for communication, a transmit end signs to-be-transmitted information by using a private key corresponding to the public key in the $i^{th}$ pseudonym certificate, and carries the $i^{th}$ pseudonym certificate. A receive end verifies the received information by using the public key in the $i^{th}$ pseudonym certificate, to ensure communication security.

In this embodiment, the generated pseudonym certificate includes the tag of the second request message and the linkage value. When the terminal device has an improper behavior, a real identifier ID1 of the terminal device can be quickly identified based on the tag of the second request message. In addition, the registration server stores the first hash value of the identifier ID1 of the terminal device and the first random number in association with the identifier ID1 of the terminal device, and stores the second hash value of the identifier ID1 of the terminal device and the second random number in association with the identifier ID1 of the terminal device. Therefore, the registration server can obtain the first hash value and the second hash value based on the identifier ID1 of the terminal device. In addition, the first hash value and the second hash value are stored in linkage with the native seed value or the seed value or the pre-linkage value related to the linkage value in the generated pseudonym certificate, so that linkage values in all pseudonym certificates of the terminal device can be obtained, and all the pseudonym certificates of the terminal device can be quickly revoked based on the obtained linkage values.

Then, an example in which the pseudonym credential is a pseudonym identity is used to describe the pseudonym credential configuration method provided in the embodiments of this application.

Figure 7:
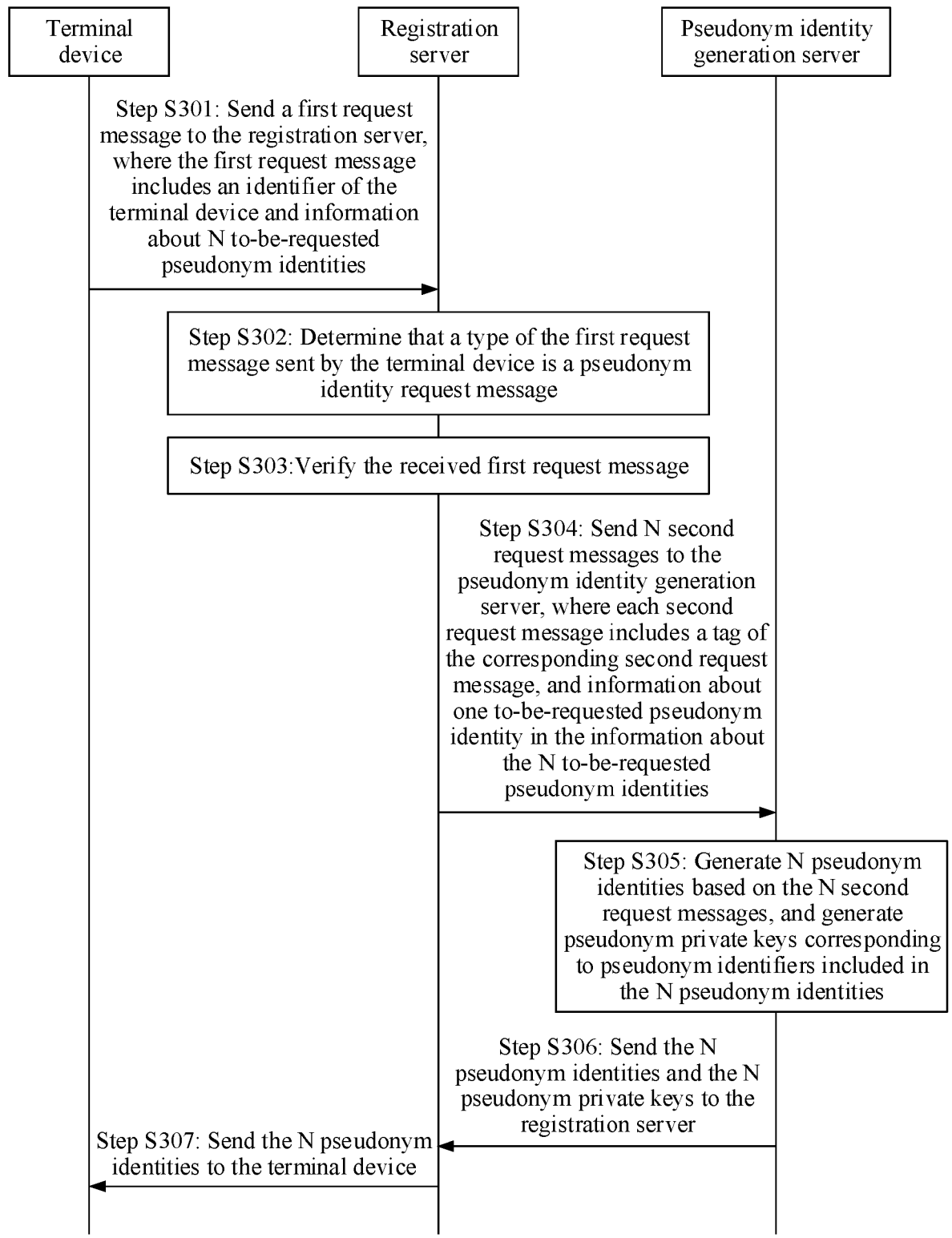
FIG. 7 is a third signaling interaction diagram of a pseudonym credential configuration method according to an embodiment of this application.

FIG. 7 is a third signaling interaction diagram of a pseudonym credential configuration method according to an embodiment of this application. Referring to FIG. 7, the method in this embodiment includes the following steps.

Step S301: A terminal device sends a first request message to a registration server, where the first request message includes an identifier of the terminal device and information about N to-be-requested pseudonym identities.

Specifically, in this embodiment, the terminal device may be a V2X device, and the registration server is an RA server.

When the terminal device needs to apply for a pseudonym identity, the terminal device sends a first request message to the registration server. The first request message includes an identifier ID1 of the terminal device and information about N to-be-requested pseudonym identities. The identifier ID1 herein is a real identifier of the terminal device.

Specifically, information about a to-be-requested pseudonym identity may include a temporary public key and a pseudonym identifier that needs to be included in the to-be-requested pseudonym identity. If the terminal device needs to apply for 20 pseudonym identities, the first request message includes information about 20 to-be-requested pseudonym identities. In this case, information about a first to-be-requested pseudonym identity may include a temporary public key 1 and a pseudonym identity 1 that needs to be included in a to-be-requested pseudonym identity 1; information about a second to-be-requested pseudonym identity may include a temporary public key 2 and a pseudonym identity 2 that is included in a to-be-requested pseudonym identity 2; information about a third to-be-requested pseudonym identity may include a temporary public key 3 and a pseudonym identity 3 that needs to be included in a to-be-requested pseudonym identity 3; and so on. Information about a twentieth to-be-requested pseudonym identity may include a temporary public key 20 and a pseudonym identity 20 that needs to be included in a to-be-requested pseudonym identity 20.

It may be understood that the pseudonym identifier that needs to be included in the pseudonym identity is not the real identifier ID1 of the terminal device.

To ensure that the registration server does not learn of each temporary public key and the pseudonym identity included in the to-be-requested pseudonym identity, information that is about each to-be-requested pseudonym identity and that is carried in the first request message may be information obtained after "a temporary public key and a pseudonym identity that needs to be included in the to-be-requested pseudonym identity" are encrypted by using a public key corresponding to a pseudonym identity generation server. In this case, the information about the N to-be-requested pseudonym identities may be represented as En(C1_SID(0), C1_EPK(0), KGC_PK), En(C1_SID(1), C1_EPK(1), KGC_PK), . . . , En(C1_SID(i), C1_EPK(i), KGC_PK), . . . , and En(C1_SID(N−1), C1_EPK(N−1), KGC_PK). C1_SID(i) indicates a pseudonym identifier that needs to be included in an $(i+1)^{th}$ to-be-requested pseudonym identity. C1_EPK(i) indicates an $(i+1)^{th}$ temporary public key. KGC_PK indicates the public key corresponding to the pseudonym identity generation server. En(C1_SID(i), C1_EPK(i), KGC_PK) indicates information obtained after "the $(i+1)^{th}$ temporary public key and the pseudonym identifier that needs to be included in the $(i+1)^{th}$ to-be-requested pseudonym identity" are encrypted by using the public key KGC_PK corresponding to the pseudonym identity generation server. i=0, 1, . . . , N−1.

The pseudonym identity generation server is a KGC server.

The identifier ID1 of the terminal device, En(C1_SID(0), C1_EPK(0), KGC_PK), En(C1_SID(1), C1_EPK(1), KGC_PK), . . . , En(C1_SID(i), C1_EPK(i), KGC_PK), . . . , and En(C1_SID(N−1), C1_EPK (N−1), KGC_PK) may be referred to as a transmission text. To ensure confidentiality in a transmission process, the transmission text needs to be signed, that is, hash calculation needs to be performed on "ID1, En(C1_SID(0), C1_EPK(0), KGC_PK), En(C1_SID(1), C1_EPK(1), KGC_PK), . . . , En(C1_SID(i), C1_EPK(i), KGC_PK), . . . , and En(C1_SID(N−1), C1_EPK(N−1), KGC_PK)", to obtain a digest of the transmission text. Then, the digest of the transmission text is encrypted by using a private key (C1_ESK) in a public-private key pair that is of the terminal device and that is based on a real identity, to obtain a signature of the transmission text. A public key in the public-private key pair herein is a real identifier of the terminal device, and the private key (C1_ESK) in the public-private key pair is generated by a private key generation center or a key generation center.

Therefore, the first request message may include the identifier ID1 of the terminal device, En(C1_SID(0), C1_EPK(0), KGC_PK), En(C1_SID(1), C1_EPK(1), KGC_PK), . . . , En(C1_SID(i), C1_EPK(i), KGC_PK), . . . , En(C1_SID(N−1), C1_EPK(N−1), KGC_PK), and the signature of the transmission text.

It can be learned that the first request message sent to the registration server when the terminal device requests the pseudonym identity does not include the pseudonym certificate.

Step S302: The registration server determines that a type of the first request message sent by the terminal device is a pseudonym identity request message.

Specifically, a method for determining, by the registration server, the type of the first request message sent by the terminal device may be implemented by using the following two implementations, but not limited to the following two implementations.

In an implementable implementation, if a received first request message carries an ECA certificate, the registration server determines that a type of the first request message is a pseudonym identity request message; or if a received first request message carries no ECA certificate, the registration server determines that a type of the first request message is a pseudonym identity request message. For example, in step S301, when the terminal device sends a first request message used to request a pseudonym identity to the registration server, if the first request message carries no ECA certificate, the registration server determines that a type of the first request message sent by the terminal device is a pseudonym identity request message.

In another implementable implementation, the first request message further includes indication information, and the indication information indicates the type of the first request message. The registration server determines the type of the first request message based on the indication information. For example, if the indication information is a first identifier, it is determined that the type of the first request message is a pseudonym identity request message; or if the indication information is a second identifier, it is determined that the type of the first request message is a pseudonym identity request message. For example, in step S301, if the terminal device requests a pseudonym identity, the sent first request message carries the second identifier.

Step S303: The registration server verifies the received first request message.

After determining that the type of the first request message sent by the terminal device is a pseudonym identity request message, the registration server decrypts the signature of the transmission text in the first request message by using the public key in the public-private key pair that is based on the real identity, that is, the real identifier ID1 of the terminal device, to obtain a digest 1 of the transmission text, and obtains a digest 2 of the transmission text included in the first request message by using a hash algorithm used when the terminal device obtains the signature of the transmission text. If the digest 1 of the transmission text is the same as the digest 2 of the transmission text, it indicates that the first request message received by the registration server is the first request message sent by the terminal device and is not tampered with, that is, the first request message is successfully verified.

Step S304: After the first request message is successfully verified, the registration server sends N second request messages to the pseudonym identity generation server, where each second request message includes a tag of the corresponding second request message, and information about one to-be-requested pseudonym identity in the information about the N to-be-requested pseudonym identities.

Specifically, a first form of the second request message is as follows: An $i^{th}$ second request message may be represented as m=(C1_SID(i−1), C1_EPK(i−1), Code(m)$_{i-1}$), where Code(m)$_{i-1}$ is a tag of the $i^{th}$ second request message, and i=0, 2, . . . , N−1.

It may be understood that information that is about each to-be-requested pseudonym identity and that is carried in the first request message corresponding to the second request message in this form is "a temporary public key and a pseudonym identifier that needs to be written into a pseudonym identity" that are not encrypted by using the public key corresponding to the pseudonym identity generation server.

A second form of the second request message is as follows: An $i^{th}$ second request message may be represented as m=En(C1_SID(i−1), C1_EPK(i−1), Code(m)$_{i-1}$), where Code(m)$_{i-1}$ is a tag of the $i^{th}$ second request message, and i=0, 2, . . . , N−1.

It may be understood that information that is about each to-be-requested pseudonym identity and that is carried in the first request message corresponding to the second request message in this form is information obtained after "a temporary public key and a pseudonym identifier that needs to be included in the to-be-requested pseudonym identity" are encrypted by using the public key corresponding to the pseudonym identity generation server.

When the second request message is in the foregoing second form, it can be ensured that the registration server does not learn of the temporary public key and the pseudonym identity that needs to be included in the to-be-requested pseudonym identity, thereby ensuring confidentiality of the generated pseudonym identity.

Code(m)$_{i-1}$ may be a randomly generated code, or may be a hash value obtained based on "En(C1_SID(i−1), C1_EPK (i−1), KGC_PK)".

The tag of each second request message and the identifier of the terminal device are stored in association with each other in the registration server, or the tag of the second request message, the second request message, and the identifier of the terminal device are associated and stored in the registration server, so that the registration server can obtain, based on the tag of the second request message, the identifier that is of the terminal device and that is associated with the tag of the second request message.

It may be understood that, if the type of the first request message is a pseudonym identity request message, the registration server sends the N second request messages to the pseudonym identity generation server; or if the type of the first request message is a pseudonym identity request message, the registration server sends the N second request messages to the pseudonym identity generation server. Based on the system architecture in the embodiments of this application, in the method in this embodiment of this application, both the pseudonym identity and a pseudonym certificate can be generated.

Step S305: The pseudonym identity generation server generates N pseudonym identities based on the N second request messages, and generates pseudonym private keys corresponding to pseudonym identifiers included in the N pseudonym identities.

Specifically, because the second request message does not include the identifier of the terminal device, the pseudonym identity generation server does not learn of a terminal device to which the pseudonym identity belongs, but learns of content of the pseudonym identity. As described above, if the first request message includes En(C1_SID(0), C1_EPK(0), KGC_PK), En(C1_SID(1), C1_EPK(1), KGC_PK), . . . , En(C1_SID(i), C1_EPK(i), KGC_PK), . . . , and En(C1_SID (N−1), C1_EPK(N−1), KGC_PK), it can be ensured that the registration server does not learn of content of the pseudonym identity, but learns of an owner of the pseudonym identity. In this way, confidentiality of the generated pseudonym identity can be ensured, and the pseudonym identity is not easily stolen by a single device.

If the information about the to-be-requested pseudonym identity in the second request message is information obtained after actual information of the to-be-requested pseudonym identity is encrypted by using the public key of the pseudonym identity generation server, that is, the $i^{th}$ second request message may be represented as m=((En (C1_SID(i−1), C1_EPK(i−1), KGC_PK)), Code(m)$_{i-1}$), that the pseudonym identity generation server generates a pseudonym identity based on the second request message includes:

The pseudonym identity generation server decrypts the information about the to-be-requested pseudonym identity by using a private key of the pseudonym identity generation server, to obtain actual information of the to-be-requested certificate.

The pseudonym identity generation server generates the pseudonym identity based on the tag of the second request message and at least a part of the actual information of the to-be-requested pseudonym credential.

Alternatively, that the pseudonym identity generation server generates a pseudonym identity based on the second request message includes:

The pseudonym identity generation server decrypts the information about the to-be-requested pseudonym identity by using a private key of the pseudonym identity generation server, to obtain actual information of the to-be-requested certificate.

The pseudonym identity generation server encrypts the tag of the second request message by using a symmetric key of the pseudonym identity generation server, to obtain an encrypted tag.

The pseudonym identity generation server generates the pseudonym identity based on the encrypted tag and at least a part of the actual information of the to-be-requested pseudonym identity.

Specifically, if the $i^{th}$ second request message may be represented as m=(En(C1_SID(i−1), C1_EPK(i−1), KGC_PK), Code(m)$_{i-1}$), the pseudonym identity generation server decrypts En(C1_SID(i−1), C1_EPK(i−1), KGC_PK) by using a private key corresponding to KGC_PK (that is, a private key of the pseudonym identity generation server), to obtain C1_SID(i−1) and C1_EPK(i−1) (C1_SID(i−1) and C1_EPK(i−1) are the actual information of the to-be-requested pseudonym identity), and writes C1_SID(i−1) into an $i^{th}$ pseudonym identity, that is, C1_SID(i−1) is a pseudonym identifier included in the $i^{th}$ generated pseudonym identity.

The pseudonym identity generation server encrypts Code $(m)_{i-1}$ by using a symmetric key (which may be a symmetric key KGC_key of KGC) of the pseudonym identity generation server, to obtain encrypted Code$(m)_{i-1}$, and the encrypted Code$(m)_{i-1}$ is represented as E(Code(m), KGC_key).

After obtaining the $i^{th}$ pseudonym identity, the pseudonym identity generation server may encrypt the $i^{th}$ pseudonym identity by using decrypted C1_EPK(i−1) (an $i^{th}$ temporary public key), to obtain an $i^{th}$ encrypted pseudonym identity.

Therefore, the $i^{th}$ pseudonym identity may include C1_SID(i−1) and the encrypted Code$(m)_{i-1}$. The $i^{th}$ encrypted pseudonym identity may be represented as (En (C1_SID(i−1)∥E(Code$(m)_{i-1}$, KGC_key)∥C1_EPK(i−1)).

Encrypting each generated pseudonym identity can ensure that in a subsequent step, after the pseudonym identity generation server sends the N pseudonym identities to the registration server, the registration server does not learn of content included in the pseudonym identities.

In addition, the pseudonym identity generation server may further set an expiration time of the $i^{th}$ pseudonym identity.

The pseudonym identity generation server may further perform a hash operation based on C1_SID(i−1), the encrypted Code$(m)_{i-1}$, and the expiration time of the $i^{th}$ pseudonym identity, to obtain a hash value, and encrypt the hash value by using the private key of the pseudonym identity generation server, to obtain a signature of the pseudonym identity.

Therefore, the $i^{th}$ pseudonym identity may further include the expiration time of the $i^{th}$ pseudonym identity and the signature of the $i^{th}$ pseudonym identity.

Further, the pseudonym identity generation server further generates a pseudonym private key corresponding to each pseudonym identifier. An $i^{th}$ pseudonym identifier and a pseudonym private key corresponding to the $i^{th}$ pseudonym identifier constitute a public-private key pair that is based on the $i^{th}$ pseudonym identity. The public-private key pair based on the $i^{th}$ pseudonym identity is used to verify a communication message when the terminal device subsequently performs communication by using the $i^{th}$ pseudonym identity.

After obtaining the $i^{th}$ pseudonym private key C1_SK(i−1) corresponding to the $i^{th}$ pseudonym identifier, the pseudonym identity generation server may encrypt the $i^{th}$ pseudonym private key by using the decrypted C1_EPK(i−1) (the $i^{th}$ temporary public key), to obtain an $i^{th}$ encrypted pseudonym private key that may be represented as En(C1_SK(i−1), C1_EPK(i−1)).

In conclusion, the pseudonym identity generation server generates one pseudonym identity based on each second request message, or generates N encrypted pseudonym identities of the terminal device based on the N second request messages, and generates N pseudonym private keys corresponding to pseudonym identifiers in the N pseudonym identities.

Step S306: The pseudonym identity generation server sends the N pseudonym identities and the N pseudonym private keys to the registration server.

It may be understood that, if the pseudonym identity generation server encrypts the generated pseudonym identity by using the temporary public key, the pseudonym identity generation server sends the N encrypted pseudonym identities to the registration server.

If the pseudonym identity generation server encrypts the generated pseudonym private key by using the temporary public key, the pseudonym identity generation server sends the N encrypted pseudonym private keys to the registration server.

Step S307: The registration server sends the N pseudonym identities and the N pseudonym private keys to the terminal device.

It may be understood that if the registration server receives N encrypted pseudonym identities, the registration server sends the N encrypted pseudonym identities to the terminal device; or if the registration server receives N encrypted pseudonym private keys, the registration server sends the N encrypted pseudonym private keys to the terminal device.

Because the pseudonym identity generation server encrypts the generated pseudonym identity by using the temporary public key carried in the first request message sent by the terminal device to the registration server, and the terminal device stores a private key corresponding to the temporary public key, after receiving the N pseudonym identities, the terminal device decrypts the N encrypted pseudonym identities by using the private key corresponding to the temporary public key, to obtain the N pseudonym identities, and decrypts the N encrypted pseudonym private keys by using the private key corresponding to the temporary public key, to obtain the N pseudonym private keys.

In the foregoing process, the terminal device obtains the N pseudonym identities. Subsequently, the terminal device may perform communication by using the N pseudonym identities. For example, when the $i^{th}$ pseudonym identity is used for communication, a transmit end signs to-be-transmitted information by using a pseudonym private key corresponding to the pseudonym identifier in the $i^{th}$ pseudonym identity. The to-be-transmitted information includes the $i^{th}$ pseudonym identity. A receive end verifies the received information by using the pseudonym identifier in the $i^{th}$ pseudonym identity, to ensure communication security.

In this embodiment, the generated pseudonym identity includes the tag of the second request message, and the tag of the second request message and the real identifier of the terminal device are stored in association with each other in the registration server. In this way, when the terminal device has an improper behavior, the registration server can obtain the real identifier of the terminal device based on the tag in the pseudonym identity, so that a real identity of the terminal device can be quickly determined based on the pseudonym identity.

To quickly revoke a plurality of pseudonym identities of a terminal device when the terminal device has an improper behavior, this embodiment makes further improvements based on the foregoing embodiment.

Figure 8A:
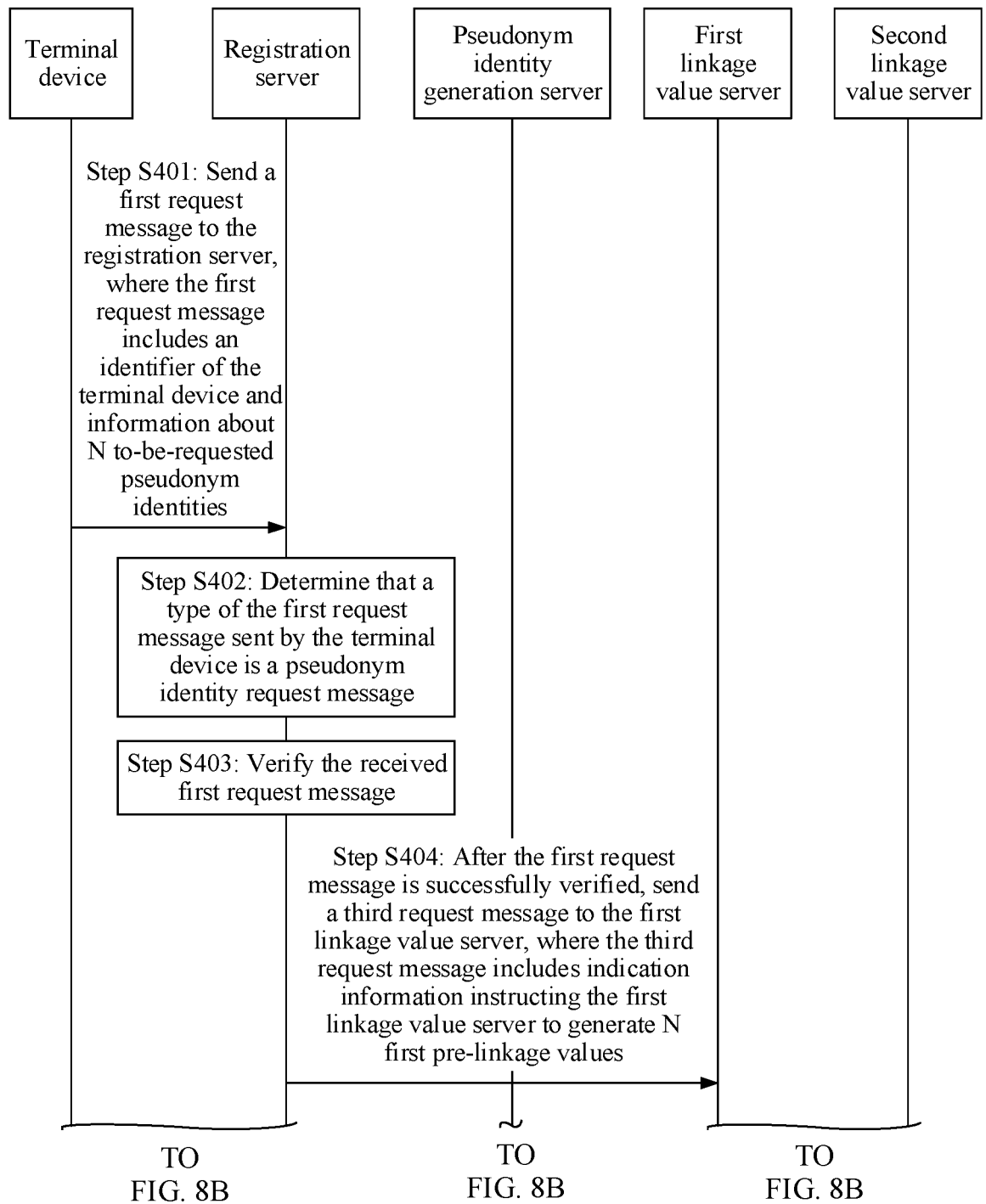
FIG. 8A, FIG. 8B and FIG. 8C are a fourth signaling interaction diagram of a pseudonym credential configuration method according to an embodiment of this application.
Figure 8B:
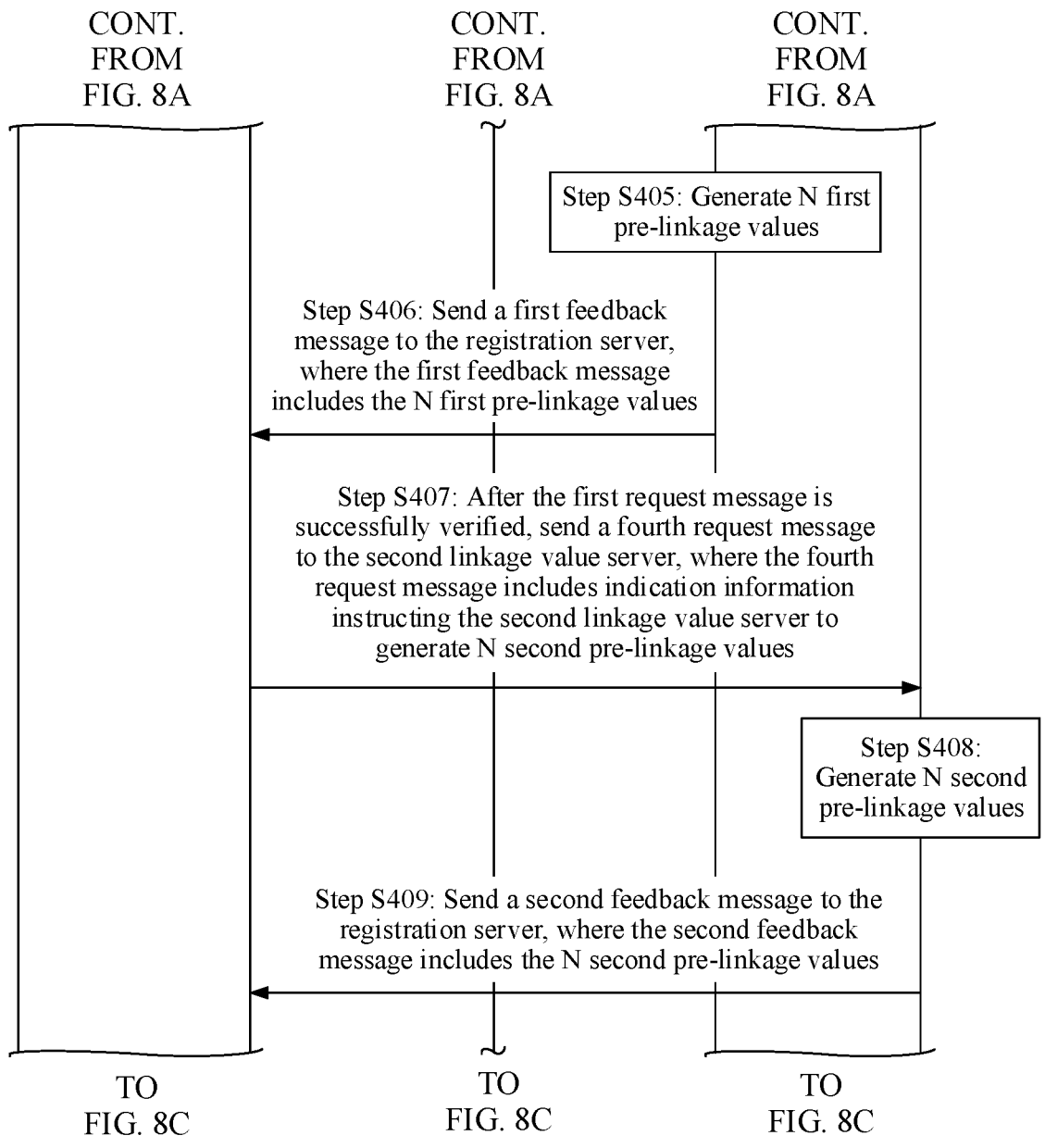
Figure 8C:
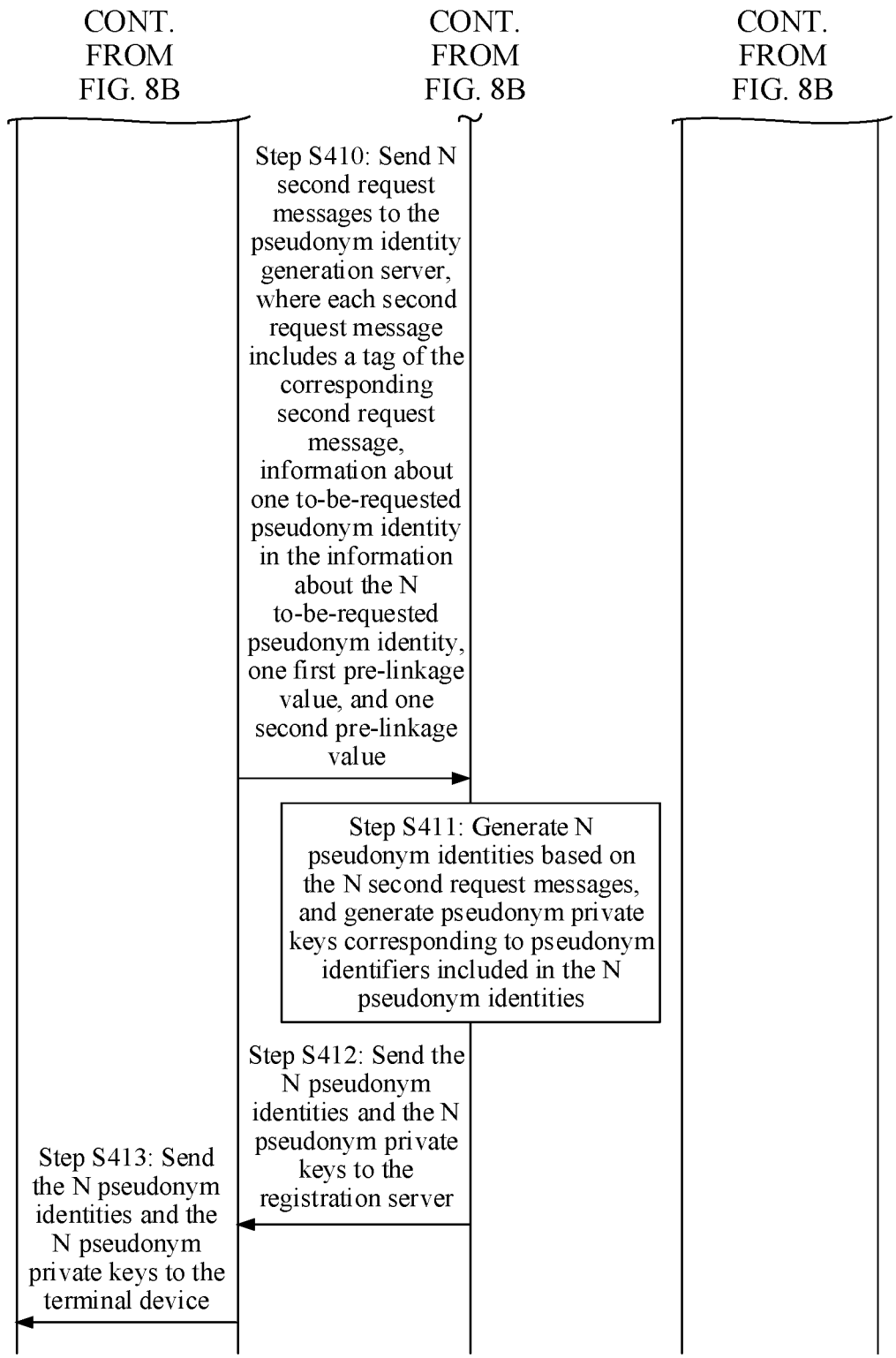

FIG. 8A, FIG. 8B and FIG. 8C are a fourth signaling interaction diagram of a pseudonym credential configuration method according to an embodiment of this application. Referring to FIG. 8A, FIG. 8B and FIG. 8C, the method in this embodiment includes the following steps.

Step S401: A terminal device sends a first request message to a registration server, where the first request message includes an identifier of the terminal device and information about N to-be-requested pseudonym identities.

For a specific implementation, refer to the description in the foregoing embodiment. Details are not described in this embodiment again.

Step S402: The registration server determines that a type of the first request message sent by the terminal device is a pseudonym identity request message.

For a specific implementation, refer to the description in the foregoing embodiment. Details are not described in this embodiment again.

Step S403: The registration server verifies the received first request message.

For a specific implementation, refer to the description in the foregoing embodiment. Details are not described in this embodiment again.

Step S404: After the first request message is successfully verified, the registration server sends a third request message to a first linkage value server, where the third request message includes indication information instructing the first linkage value server to generate N first pre-linkage values.

For a specific implementation, refer to the description in the embodiment shown in FIG. 4. Details are not described in this embodiment again.

Step S405: The first linkage value server generates N first pre-linkage values.

For a specific implementation, refer to the description in the embodiment shown in FIG. 4. Details are not described in this embodiment again.

Step S406: The first linkage value server sends a first feedback message to the registration server, where the first feedback message includes the N first pre-linkage values and a first hash value, and the first hash value is a hash value corresponding to the identifier of the terminal device and a first random number.

For a specific implementation, refer to the description in the embodiment shown in FIG. 4. Details are not described in this embodiment again.

Step S407: After the first request message is successfully verified, the registration server sends a fourth request message to the second linkage value server, where the fourth request message includes indication information instructing the second linkage value server to generate N second pre-linkage values.

For a specific implementation, refer to the description in the embodiment shown in FIG. 4. Details are not described in this embodiment again.

Step S408: The second linkage value server generates N second pre-linkage values.

For a specific implementation, refer to the description in the embodiment shown in FIG. 4. Details are not described in this embodiment again.

Step S409: The second linkage value sends a second feedback message to the registration server, where the second feedback message includes the N second pre-linkage values and a second hash value, and the second hash value is a hash value corresponding to a combination of the identifier of the terminal device and a second random number.

For a specific implementation, refer to the description in the embodiment shown in FIG. 4. Details are not described in this embodiment again.

Step S410: The registration server sends N second request messages to the pseudonym identity generation server, where each second request message includes a tag of the corresponding second request message, information about one to-be-requested pseudonym identity in the information about the N to-be-requested pseudonym identity, one first pre-linkage value, and one second pre-linkage value.

Specifically, an $i^{th}$ second request message may be represented as m=((C1_SID(i−1), C1_EPK(i−1), PLV1(i−1), PLV2(i−1)), Code(m)$_{i-1}$), where Code(m)$_{i-1}$ is a tag of the $i^{th}$ second request message, and i=0, 2, . . . , N−1.

Alternatively, an $i^{th}$ second request message may be represented as m=((En(C1_SID(i−1), C1_EPK(i−1), KGC_PK), EPLV1(i−1), EPLV2(i−1)), Code(m)$_{i-1}$), where Code(m)$_{i-1}$ is a tag of the $i^{th}$ second request message, and i=0, 2, . . . , N−1.

When the $i^{th}$ second request message is in the foregoing second form, it can be ensured that the registration server does not learn of the temporary public key, the first pre-linkage value and the second pre-linkage value that are required for generating the linkage value included in the pseudonym identity, and the pseudonym identifier that needs to be included in the pseudonym identity.

Code(m)$_{i-1}$ may be a randomly generated code, or may be a hash value obtained based on "En(C1_SID(i−1), C1_EPK(i−1), KGC_PK), EPLV1(i−1), and EPLV2(i−1)".

The tag of each second request message and the identifier of the terminal device are stored in association with each other in the registration server, or the tag of the second request message, the second request message, and the identifier of the terminal device are associated and stored in the registration server, so that the registration server can obtain, based on the tag of the second request message, the identifier that is of the terminal device and that is associated with the tag of the second request message.

It may be understood that, if the type of the first request message is a pseudonym identity request message, the registration server sends the N second request messages to the pseudonym identity generation server; or if the type of the first request message is a pseudonym identity request message, the registration server sends the N second request messages to the pseudonym identity generation server. Based on the system architecture in the embodiments of this application, in the method in this embodiment of this application, both the pseudonym identity and the pseudonym identity can be generated.

Step S411: The pseudonym identity generation server generates N pseudonym identities based on the N second request messages, and generates pseudonym private keys corresponding to pseudonym identifiers included in the N pseudonym identities.

Specifically, because the second request message does not include the identifier of the terminal device, the pseudonym identity generation server does not learn of a terminal device to which the pseudonym identity belongs, but learns of content of the pseudonym identity. As described above, if the first request message includes En(C1_SID(0), C1_EPK(0), KGC_PK), En(C1_SID(1), C1_EPK(1), KGC_PK), . . . , En(C1_SID(i), C1_EPK(i), KGC_PK), . . . , and En(C1_SID (N−1), C1_EPK(N−1), KGC_PK), the first feedback message includes EPLV1(0), EPLV1(2), EPLV1(i), . . . , and EPLV1(N−1), and the second feedback message includes EPLV2(0), EPLV2(1), . . . , EPLV2(i), . . . , and EPLV2(N−1), it can be ensured that the registration server does not learn of content of the pseudonym identity, but learns of an owner of the pseudonym identity. In this way, confidentiality of the generated pseudonym identity can be ensured, and the pseudonym identity is not easily stolen by a single device.

If the information about the to-be-requested pseudonym identity in the second request message is information obtained after actual information of the to-be-requested pseudonym identity is encrypted by using the public key of the pseudonym identity generation server, and the first pre-linkage value and the second pre-linkage value that are encrypted by using the public key of the pseudonym identity generation server, that is, the $i^{th}$ second request message may be represented as m=((En(C1_SID(i-1), C1_EPK(i-1), KGC_PK), EPLV1(i-1), EPLV2(i-1)), Code(m)$_{i-1}$), that the pseudonym identity generation server generates a pseudonym identity based on the second request message includes:

The pseudonym identity generation server decrypts the information about the to-be-requested pseudonym identity by using a private key of the pseudonym identity generation server, to obtain actual information of the to-be-requested certificate.

The pseudonym identity generation server decrypts, by using the private key of the pseudonym identity generation server, the first pre-linkage value and the second pre-linkage value that are encrypted by using the public key of the pseudonym identity generation server, to obtain the first pre-linkage value and the second pre-linkage value.

The pseudonym identity generation server performs an exclusive OR operation on the first pre-linkage value and the second pre-linkage value to obtain a linkage value.

The pseudonym identity generation server generates the pseudonym identity based on the tag of the second request message, at least a part of the actual information of the to-be-requested pseudonym credential, and the linkage value.

Alternatively, that the pseudonym identity generation server generates a pseudonym identity based on the second request message includes:

The pseudonym identity generation server decrypts the information about the to-be-requested pseudonym identity by using a private key of the pseudonym identity generation server, to obtain actual information of the to-be-requested certificate.

The pseudonym identity generation server decrypts, by using the private key of the pseudonym identity generation server, the first pre-linkage value and the second pre-linkage value that are encrypted by using the public key of the pseudonym identity generation server, to obtain the first pre-linkage value and the second pre-linkage value.

The pseudonym identity generation server performs an exclusive OR operation on the first pre-linkage value and the second pre-linkage value to obtain a linkage value.

The pseudonym identity generation server encrypts the tag of the second request message by using a symmetric key of the pseudonym identity generation server, to obtain an encrypted tag.

The pseudonym identity generation server generates the pseudonym identity based on the encrypted tag, at least a part of the actual information of the to-be-requested pseudonym identity, and the linkage value.

The linkage value is obtained based on the first pre-linkage value generated by the first linkage value server and the second pre-linkage value generated by the second linkage value server, so that it can be ensured that the linkage value in the pseudonym identity is learned of by only the pseudonym identity generation server, thereby further ensuring security of the pseudonym identity.

Specifically, if the $i^{th}$ second request message may be represented as m=((En(C1_SID(i-1), C1_EPK(i-1), KGC_PK), EPLV1(i-1), EPLV2(i-1)), Code(m)$_{i-1}$), the pseudonym identity generation server decrypts En(C1_SID (i-1), C1_EPK(i-1), KGC_PK) by using a private key corresponding to KGC_PK (that is, the private key of the pseudonym identity generation server), to obtain C1_SID (i-1) and C1_EPK(i-1) (C1_SID(i-1) and C1_EPK(i-1) are the actual information of the to-be-requested pseudonym identity), and writes C1_SID(i-1) into an $i^{th}$ pseudonym identity, that is, C1_SID(i-1) is a pseudonym identifier included in the $i^{th}$ generated pseudonym identity.

The pseudonym identity generation server decrypts EPLV1(i-1) and EPLV2(i-1) by using the private key corresponding to KGC_PK to obtain PLV1(i-1) and PLV2 (i-1), and then performs the exclusive OR operation on PLV1(i-1) and PLV2(i-1) to obtain LV1(i-1). LV1(i-1) indicates an $i^{th}$ linkage value generated after the exclusive OR operation is performed on an $i^{th}$ first pre-linkage value and an $i^{th}$ second pre-linkage value.

The pseudonym identity generation server encrypts Code (m)$_{i-1}$ by using a symmetric key (which may be a symmetric key KGC_key of KGC) corresponding to the pseudonym identity generation server, to obtain encrypted Code(m)$_{i-1}$, and the encrypted Code(m)$_{i-1}$ is represented as E(Code(m), KGC_key).

Therefore, the $i^{th}$ pseudonym identity may include C1_SID(i-1), the $i^{th}$ linkage value LV1(i-1), and the encrypted Code(m)$_{i-1}$. An $i^{th}$ encrypted pseudonym identity may be represented as (En(C1_SID (i-1)||LV(i-1)||E(Code (m)$_{i-1}$, KGC_key||C1 EPK(i-1)).

After obtaining the $i^{th}$ pseudonym identity, the pseudonym identity generation server may encrypt the $i^{th}$ pseudonym identity by using decrypted C1_EPK(i-1) (an $i^{th}$ temporary public key), to obtain the $i^{th}$ encrypted pseudonym identity.

Encrypting each generated pseudonym identity can ensure that in a subsequent step, after the pseudonym identity generation server sends the N pseudonym identities to the registration server, the registration server does not learn of content included in the pseudonym identities.

In addition, the pseudonym identity generation server may further set an expiration time of the $i^{th}$ pseudonym identity.

The pseudonym identity generation server may further perform a hash operation based on C1_SID(i-1), the encrypted Code(m)$_{i-1}$, and the expiration time of the $i^{th}$ pseudonym identity, to obtain a hash value, and encrypt the hash value by using the private key corresponding to the pseudonym identity generation server, to obtain a signature of the pseudonym identity.

Therefore, the $i^{th}$ pseudonym identity may further include the expiration time of the $i^{th}$ pseudonym identity and the signature of the $i^{th}$ pseudonym identity.

Further, the pseudonym identity generation server further generates a pseudonym private key corresponding to each pseudonym identifier. An $i^{th}$ pseudonym identifier and a pseudonym private key corresponding to the $i^{th}$ pseudonym identifier constitute a public-private key pair that is based on the $i^{th}$ pseudonym identity. The public-private key pair based on the $i^{th}$ pseudonym identity is used to verify a communication message when the terminal device subsequently performs communication by using the $i^{th}$ pseudonym identity.

After obtaining the $i^{th}$ pseudonym private key C1_SK(i-1) corresponding to the $i^{th}$ pseudonym identifier, the pseudonym identity generation server may encrypt the $i^{th}$ pseudonym private key by using the decrypted C1_EPK(i-1) (the $i^{th}$ temporary public key), to obtain an $i^{th}$ encrypted pseudonym private key that may be represented as En(C1_SK(i-1), C1_EPK(i-1)).

In conclusion, the pseudonym identity generation server generates one pseudonym identity based on each second request message, or generates N encrypted pseudonym identities of the terminal device based on the N second request messages, and generates N pseudonym private keys corresponding to pseudonym identifiers in the N pseudonym identities.

Step S412: The pseudonym identity generation server sends the N pseudonym identities and the N pseudonym private keys to the registration server.

For a specific implementation, refer to the description in the foregoing embodiment. Details are not described in this embodiment again.

Step S413: The registration server sends the N pseudonym identities and the N pseudonym private keys to the terminal device.

For a specific implementation, refer to the description in the foregoing embodiment. Details are not described in this embodiment again.

In this embodiment, the generated pseudonym identity includes the tag of the second request message and the linkage value. When the terminal device has an improper behavior, a real identifier ID1 of the terminal device can be quickly identified based on the tag of the second request message. In addition, the registration server stores the first hash value of the identifier ID1 of the terminal device and the first random number in association with the identifier ID1 of the terminal device, and stores the second hash value of the identifier ID1 of the terminal device and the second random number in association with the identifier ID1 of the terminal device. Therefore, the registration server can obtain the first hash value and the second hash value based on the identifier ID1 of the terminal device. In addition, the first hash value and the second hash value are stored in linkage with the native seed value or the seed value or the pre-linkage value related to the linkage value in the generated pseudonym certificate, so that linkage values in all pseudonym identities of the terminal device can be obtained, and all the pseudonym identities of the terminal device can be quickly revoked based on the obtained linkage values.

An example in which the pseudonym credential is a pseudonym certificate is used below to describe a process in which a pseudonym certificate of a terminal device is revoked if the terminal device performs an improper behavior after obtaining the pseudonym certificate.

Figure 9A:
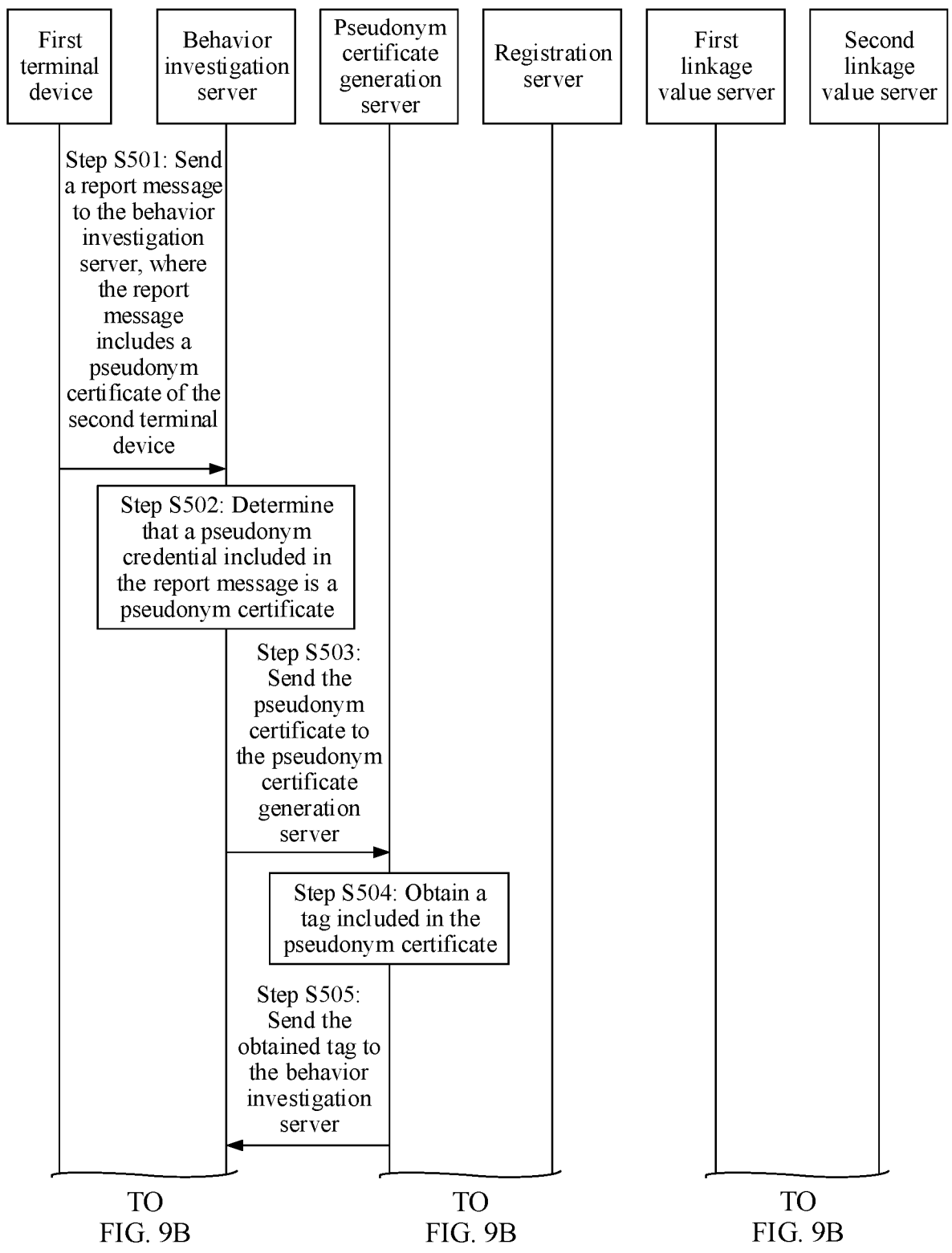
FIG. 9A, FIG. 9B and FIG. 9C are a fifth signaling interaction diagram of a pseudonym credential configuration method according to an embodiment of this application.
Figure 9B:
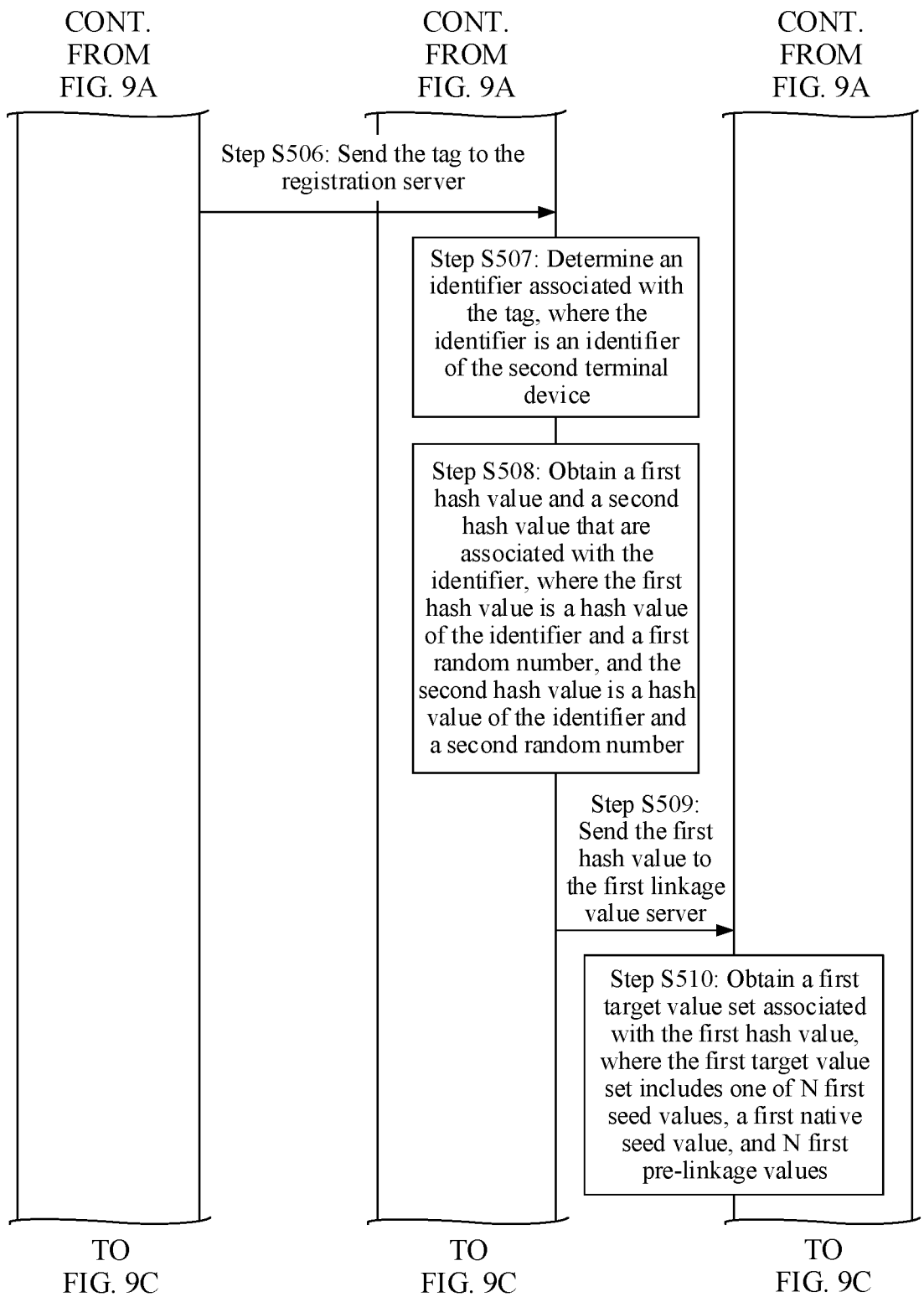
Figure 9C:
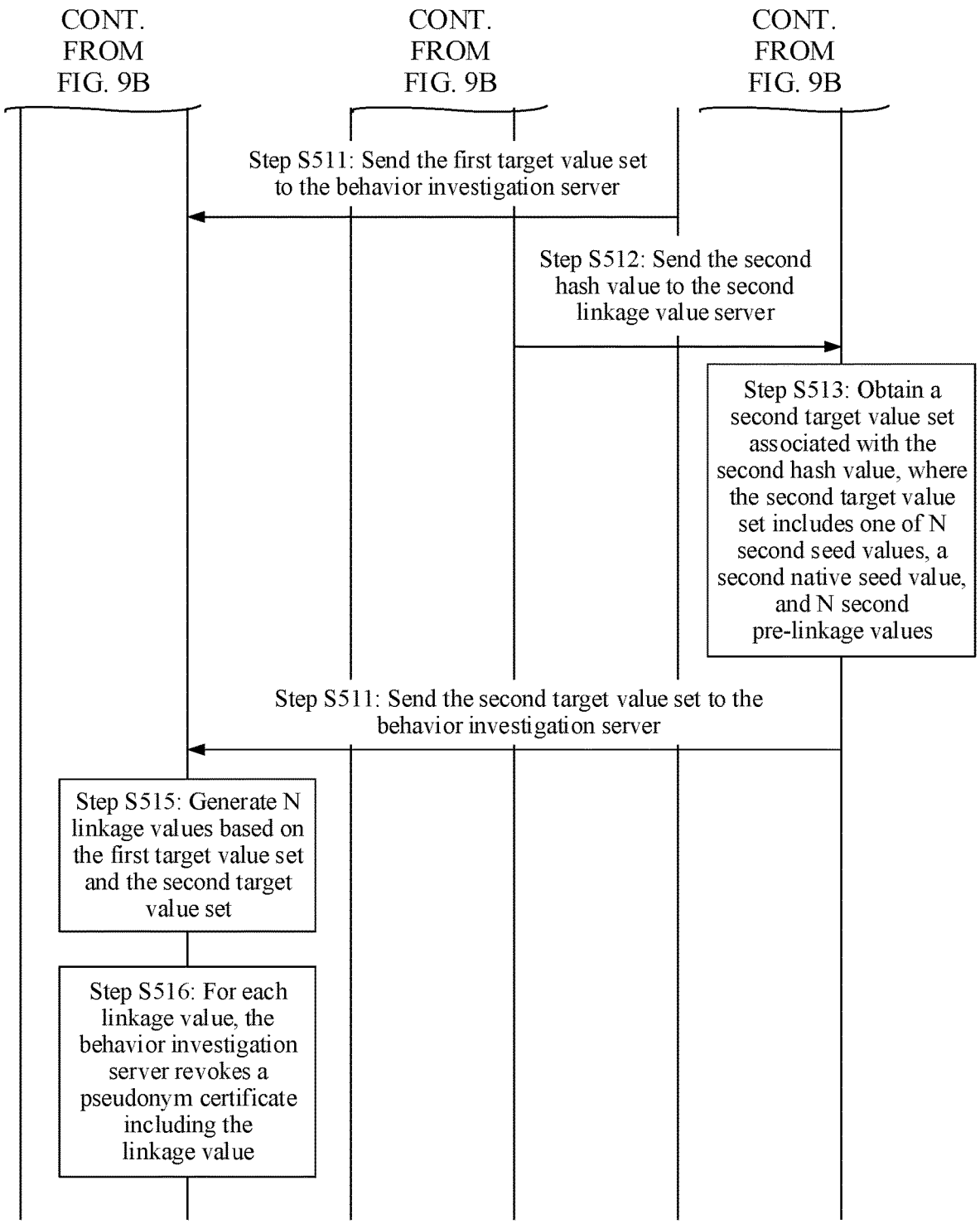

FIG. 9A, FIG. 9B and FIG. 9C are a fifth interaction flowchart of a pseudonym credential configuration method according to an embodiment of this application. Referring to FIG. 9A, FIG. 9B and FIG. 9C, the method in this embodiment includes the following steps.

Step S501: A first terminal device sends a report message to a behavior investigation server, where the report message includes a pseudonym certificate of a second terminal device.

Specifically, during communication between the first terminal device and the second terminal device, if the first terminal device finds that the second terminal is performing an improper behavior, the first terminal device sends, to the behavior investigation server, a pseudonym certificate currently used by the second terminal device during communication.

The behavior investigation server may be an MA server.

Step S502: The behavior investigation server determines that a pseudonym credential included in the report message is a pseudonym certificate.

Specifically, a method for determining, by the behavior investigation server after receiving the report information, a type of a pseudonym credential sent by the first terminal device may be implemented by using the following two implementations, but not limited to the following two implementations.

One implementable implementation is based on different forms of the pseudonym certificate and a pseudonym identity. As described above, the pseudonym certificate is in a form of a certificate, and the pseudonym identity is in a form of a character string. For example, if the report message sent by the first terminal device in step S501 includes the pseudonym certificate, and the behavior investigation server determines that the pseudonym credential included in the report message is in a form of a certificate, the behavior investigation server determines that a pseudonym credential sent by the first terminal device is a pseudonym certificate.

In another implementable implementation, the report message includes indication information, where the indication information indicates a type of the pseudonym credential; and the behavior investigation server determines, based on the indication information, the type of the pseudonym credential included in the report message. For example, if the indication information is a first identifier, it is determined that the type of the pseudonym credential included in the report message is a pseudonym certificate; or if the indication information is a second identifier, it is determined that the type of the pseudonym credential included in the report message is a pseudonym identity. For example, in step S501, when the first terminal device sends the pseudonym certificate of the second terminal, the report message carries the first identifier.

Step S503: The behavior investigation server sends the pseudonym certificate to a pseudonym certificate generation server.

Specifically, after determining that the pseudonym credential included in the report information is a pseudonym certificate, the behavior investigation server sends the pseudonym certificate to the pseudonym certificate generation server.

Step S504: The pseudonym certificate generation server obtains a tag included in the pseudonym certificate.

Specifically, after the pseudonym certificate generation server receives the pseudonym certificate, as described in the foregoing embodiment, if the tag included in the pseudonym certificate has been encrypted by using a symmetric key of the pseudonym certificate generation server, decryption is performed by using the symmetric key of the pseudonym certificate generation server, to obtain the tag included in the pseudonym certificate.

It may be understood that the tag herein is the tag of the second request message sent by the registration server to the pseudonym certificate generation server in the foregoing embodiment.

Step S505: The pseudonym certificate generation server sends the obtained tag to the behavior investigation server.

Step S506: The behavior investigation server sends the tag to a registration server.

Step S507: The registration server determines an identifier associated with the tag, where the identifier is an identifier of the second terminal device.

Specifically, as described in the foregoing embodiment, the registration server stores the identifier (the real identifier) of the terminal device in association with the tag included in the pseudonym certificate. Therefore, after receiving the tag sent by the behavior investigation server, the registration server may obtain the identifier associated with the tag. It may be understood that, in this embodiment, the identifier that is obtained by the registration server and that is associated with the tag is a real identifier of the second terminal device.

After obtaining the real identifier of the second terminal device, the registration server can learn of a real identity of the second terminal device, so that a real identity of a terminal device having an improper behavior can be quickly determined.

After the real identity of the terminal device having the improper behavior is determined, if the registration server receives again a request message that is sent by the terminal device for requesting a pseudonym certificate, the registration server may reject the request for generating a pseudonym certificate, that is, the registration server may not send a request message (that is, the second request message in the foregoing embodiment) for requesting to generate a pseudonym certificate to the pseudonym certificate generation server.

Step S508: The registration server obtains a first hash value and a second hash value that are associated with the identifier, where the first hash value is a hash value of the identifier and a first random number, and the second hash value is a hash value of the identifier and a second random number.

After determining the real identity of the second terminal device, to revoke all pseudonym certificates of the second terminal device, the registration server needs to obtain the first hash value and the second hash value that are associated with the identifier of the second terminal device.

For example, in the foregoing embodiment, after receiving the first request message sent by the terminal device, the registration server stores the hash value obtained based on the identifier of the terminal device and the random number in association with the identifier of the terminal device. In this case, after the second terminal device sends the first request message to the registration server, the registration server also obtains the first hash value based on the identifier of the second terminal device and the first random number that is generated by the registration server for the second terminal device, obtains the second hash value based on the identifier of the second terminal device and the second random number that is generated by the registration server for the second terminal device, and stores both the first hash value and the first hash value in linkage with the identifier of the second terminal device. Therefore, the registration server can obtain the first hash value and the second hash value that are associated with the identifier of the second terminal device.

Step S509: The registration server sends the first hash value to a first linkage value server.

Step S510: The first linkage value server obtains a first target value set associated with the first hash value, where the first target value set includes one of N first seed values, a first native seed value, and N first pre-linkage values.

Specifically, as described in the foregoing embodiment, the third request message carries the hash value corresponding to the identifier of the terminal device and the random number, and the first linkage value server stores the hash value corresponding to the identifier of the terminal device and the random number in association with the first target value.

It may be understood that, if the first linkage value server in the foregoing embodiment stores the N first seed values in association with the first hash value, the first target value set includes the N first seed values, and the first linkage value server obtains the N first seed values associated with the first hash value.

If the first linkage value server in the foregoing embodiment stores the first native seed value in association with the first hash value, the first target value set includes the first native seed value, and the first linkage value server obtains the first native seed value associated with the first hash value.

If the first linkage value server in the foregoing embodiment stores the N first pre-linkage values in association with the first hash value, the first target value set includes the N first pre-linkage values, and the first linkage value server obtains the N first pre-linkage values associated with the first hash value.

Step S511: The first linkage value server sends the first target value set to the behavior investigation server.

Specifically, if the first target value set includes the N first seed values, the first linkage value server sends the N first seed values to the behavior investigation server.

If the first target value set includes the first native seed value, the first linkage value server sends the first native seed value to the behavior investigation server.

If the first target value set includes the N first pre-linkage values, the first linkage value server sends the N first pre-linkage values to the behavior investigation server.

Step S512: The registration server sends the second hash value to a second linkage value server.

Step S513: The second linkage value server obtains a second target value set associated with the second hash value, where the second target value set includes one of N second seed values, a second native seed value, and N second pre-linkage values.

Specifically, as described in the foregoing embodiment, the third request message carries the hash value corresponding to the identifier of the terminal device and the random number, and the second linkage value server stores the hash value corresponding to the identifier of the terminal device and the random number in association with the second target value.

It may be understood that, if the first linkage value server in the foregoing embodiment stores the N second seed values in association with the second hash value, the second target value set includes the N second seed values, and the second linkage value server obtains the N second seed values associated with the first hash value.

If the second linkage value server in the foregoing embodiment stores the second native seed value in association with the second hash value, the first target value set includes the second native seed value, and the second linkage value server obtains the second native seed value associated with the second hash value.

If the second linkage value server in the foregoing embodiment stores the N second pre-linkage values in association with the second hash value, the second target value set includes the N second pre-linkage values, and the second linkage value server obtains the N second pre-linkage values associated with the second hash value.

Step S514: The second linkage value server sends the second target value set to the behavior investigation server.

Specifically, if the second target value set includes the N second seed values, the second linkage value server sends the N second seed values to the behavior investigation server.

If the second target value set includes the second native seed value, the second linkage value server sends the second native seed value to the behavior investigation server.

If the second target value set includes the N second pre-linkage values, the second linkage value server sends the N second pre-linkage values to the behavior investigation server.

Step S515: The behavior investigation server generates N linkage values based on the first target value set and the second target value set.

If the first target value set includes the first native seed value, and the second target value set includes the second native seed value, that the behavior investigation server generates N linkage values based on the first target value set and the second target value set includes:

The behavior investigation server generates N−1 first seed values based on the first native seed value, and generates N first pre-linkage values based on the first native seed value and the N−1 first seed values.

The behavior investigation server generates N−1 second seed values based on the second native seed value, and generates N second pre-linkage values based on the second native seed value and the N−1 second seed values.

For each of N groups of pre-linkage values, the behavior investigation server performs an exclusive OR operation on a first pre-linkage value and a second pre-linkage value that are included in the group to obtain a linkage value. Each group of pre-linkage values includes one first pre-linkage value and one second pre-linkage value.

For a specific implementation of the foregoing description, refer to step S208 and step S211 in the embodiment shown in FIG. 4.

If the first target value set includes the N first pre-linkage values, and the second target value set includes the N second pre-linkage values, that the behavior investigation server generates N linkage values based on the first target value set and the second target value set includes:

For each of N groups of pre-linkage values, the behavior investigation server performs an exclusive OR operation on a first pre-linkage value and a second pre-linkage value in the group to obtain a linkage value.

If the first target value set includes the N first seed values, and the second target value set includes the N second seed values, that the behavior investigation server generates N linkage values based on the first target value set and the second target value set includes:

The behavior investigation server generates N first pre-linkage values based on the N first seed values.

The behavior investigation server generates N second pre-linkage values based on the N second seed values.

For each of N groups of pre-linkage values, the behavior investigation server performs an exclusive OR operation on a first pre-linkage value and a second pre-linkage value that are included in the group to obtain a linkage value. Each group of pre-linkage values includes one first pre-linkage value and one second pre-linkage value.

Step S516: For each linkage value, the behavior investigation server revokes a pseudonym certificate including the linkage value.

Specifically, in step S515, the N linkage values are obtained, and the behavior investigation server revokes a pseudonym certificate including any one of the N linkage values, that is, revokes the pseudonym certificate of the second terminal device.

According to the method in this embodiment, a real identity of a terminal device having an improper behavior can be identified, and all pseudonym certificates of the terminal device having the improper behavior can be quickly revoked.

An example in which the pseudonym credential is a pseudonym identity is used below to describe a process in which a pseudonym identity of a terminal device is revoked if the terminal device performs an improper behavior after obtaining the pseudonym certificate.

Figure 10:
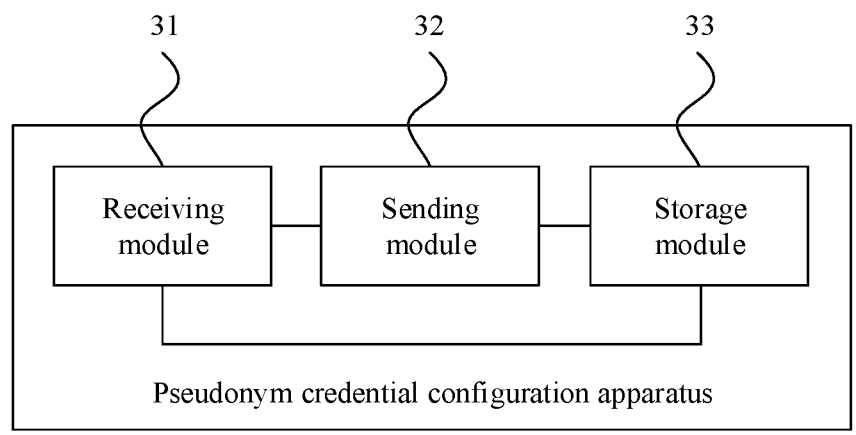
FIG. 10 is a first schematic structural diagram of a pseudonym credential configuration apparatus according to an embodiment of this application.

FIG. 10 is a fifth interaction flowchart of a pseudonym credential configuration method according to an embodiment of this application. Referring to FIG. 8, the method in this embodiment includes the following steps.

Step S601: A first terminal device sends a report message to a behavior investigation server, where the report message includes a pseudonym identity of a second terminal device.

Step S602: The behavior investigation server determines that a pseudonym credential included in the report message is a pseudonym identity.

Step S603: The behavior investigation server sends the pseudonym identity to a pseudonym identity generation server.

Step S604: The pseudonym identity generation server obtains a tag included in the pseudonym identity.

Step S605: The pseudonym identity generation server sends the tag obtained through decryption to the behavior investigation server.

Step S606: The behavior investigation server sends the tag to a registration server.

Step S607: The registration server determines an identifier associated with the tag, where the identifier is an identifier of the second terminal device.

Step S608: The registration server obtains a first hash value and a second hash value that are associated with the identifier, where the first hash value is a hash value of the identifier and a first random number, and the second hash value is a hash value of the identifier and a second random number.

Step S609: The registration server sends the first hash value to a first linkage value server.

Step S610: The first linkage value server obtains a first target value set associated with the first hash value, where the first target value set includes one of N first seed values, a first native seed value, and N first pre-linkage values.

Step S611: The first linkage value server sends the first target value set to the behavior investigation server.

Step S612: The registration server sends the second hash value to a second linkage value server.

Step S613: The second linkage value server obtains a second target value set associated with the second hash value, where the second target value set includes one of N second seed values, a second native seed value, and N second pre-linkage values.

Step S614: The second linkage value server sends the second target value set to the behavior investigation server.

Step S615: The behavior investigation server generates N linkage values based on the first target value set and the second target value set.

Step S616: For each linkage value, the behavior investigation server revokes a pseudonym identity including the linkage value.

According to the method in this embodiment, a real identity of a terminal device having an improper behavior can be identified, and all pseudonym certificates of the terminal device having the improper behavior can be quickly revoked.

In conclusion, it can be learned from the embodiments shown in FIG. 3 to FIG. 8A, FIG. 8B and FIG. 8C that, when a pseudonym credential is generated for a terminal device, a tag included in the pseudonym credential is used to identify a real identity of a terminal device with an improper behavior, and linkage values included in pseudonym credentials are used to quickly revoke all pseudonym credentials of the terminal device having the improper behavior.

It should be understood that, sequence numbers of the foregoing processes do not mean execution sequences. The execution sequences of the processes should be determined according to functions and internal logic of the processes, and should not be construed as any limitation on the implementation processes of the embodiments of this application.

In the embodiments of this application, function modules of a mobile device may be divided based on the foregoing method example. For example, each function module may be obtained through division based on each corresponding function, or two or more functions may be integrated into one processing module. The foregoing integrated unit may be implemented in a form of hardware, or may be implemented in a form of a software functional module. It should be noted that module division in the embodiments of this application is an example, and is merely logical function division and may be other division in actual implementation. For example, a plurality of units or components may be combined or integrated into another system, or some features may be ignored, or no execution is performed. In addition, the displayed or discussed mutual couplings or direct couplings or communication connections may be implemented by using some interfaces. The indirect couplings or communication connections between the apparatuses or units may be implemented in electronic, mechanical, or other forms.

FIG. 10 is a first schematic structural diagram of a pseudonym credential configuration apparatus according to an embodiment of this application. Referring to FIG. 10, the apparatus in this embodiment includes a receiving module 31, a sending module 32, and a storage module 33.

The receiving module 31 is configured to receive a first request message from a terminal device. The first request message includes an identifier of the terminal device and information about N to-be-requested pseudonym credentials, and N is a positive integer.

The sending module 32 is configured to send N second request messages to a pseudonym credential generation server. The second request message is used to instruct the pseudonym credential generation server to generate a pseudonym credential. The pseudonym credential includes a tag of the corresponding second request message and at least a part of information about one to-be-requested pseudonym credential included in the corresponding second request message.

The storage module 33 is configured to store a tag of each second request message in association with the identifier of the terminal device in the pseudonym credential configuration apparatus, so that the pseudonym credential configuration apparatus can obtain, based on the tag, the identifier that is of the first terminal device and that is associated with the tag.

The receiving module 31 is further configured to receive N pseudonym credentials from the pseudonym credential generation server.

The sending module 32 is configured to send the N pseudonym credentials to the terminal device.

The pseudonym credential configuration apparatus in this embodiment may be used to execute the technical solutions corresponding to the registration server of the foregoing method embodiment. The implementation principles and technical effects are similar, and are not further described herein.

Figure 11:
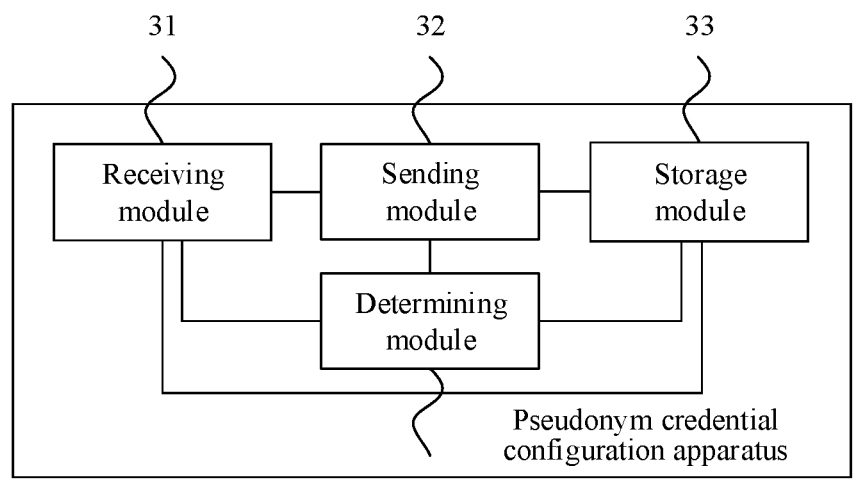
FIG. 11 is a second schematic structural diagram of a pseudonym credential configuration apparatus according to an embodiment of this application.

FIG. 11 is a second schematic structural diagram of a pseudonym credential configuration apparatus according to an embodiment of this application. Referring to FIG. 10, based on FIG. 10, the pseudonym credential configuration apparatus further includes a determining module 34.

The determining module 34 is configured to determine a type of the first request message before the sending module 32 sends the N second request messages to the pseudonym credential generation server. The type is a pseudonym certificate request message or a pseudonym identity request message.

If the type is a pseudonym certificate request message, the sending module 32 sends the N second request messages to a pseudonym certificate generation server.

If the type is a pseudonym identity request message, the sending module 32 sends the N second request messages to the pseudonym identity generation server.

The pseudonym credential configuration apparatus in this embodiment may be used to execute the technical solutions corresponding to the registration server of the foregoing method embodiment. The implementation principles and technical effects are similar, and are not further described herein.

In a possible design, the first request message further includes first indication information indicating the type of the first request message. The determining module 34 is specifically configured to determine the type of the first request message based on the first indication information.

In a possible design, the sending module 32 is further configured to: before sending the N second request messages to the pseudonym credential generation server, send a third request message to a first linkage value server, and send a fourth request message to a second linkage value server. The third request message includes indication information instructing the first linkage value server to generate N first pre-linkage values. The fourth request message includes indication information instructing the second linkage value server to generate N second pre-linkage values.

The receiving module 31 is further configured to receive the N first pre-linkage values from the first linkage value server, and receive the N second pre-linkage values from the second linkage value server.

In this case, each pseudonym credential further includes a linkage value. The linkage value is obtained by the pseudonym credential generation server based on a first pre-linkage value and a second pre-linkage value included in a corresponding second request message.

In a possible design, the third request message further includes a first hash value. The first hash value is a hash value corresponding to the identifier of the terminal device and a first random number. The fourth request message further includes a second hash value. The second hash value is a hash value corresponding to the identifier of the terminal device and a second random number.

The storage module 33 is further configured to store the identifier of the terminal device in association with the first hash value and the second hash value, so that the pseudonym credential configuration apparatus can obtain the first hash value and the second hash value based on the identifier of the terminal device.

In a possible design, the first pre-linkage value is a linkage value encrypted by using a public key of the pseudonym credential generation server, and the second pre-linkage value is a linkage value encrypted by using the public key of the pseudonym credential generation server.

In a possible design, the information about the to-be-requested pseudonym credential is information obtained after actual information of the to-be-requested pseudonym credential is encrypted by using a public key of the pseudonym credential generation server.

In this case, the at least a part of the information about the to-be-requested pseudonym credential that is included in the pseudonym credential is at least a part of the actual information of the to-be-requested pseudonym credential.

If the pseudonym credential is a pseudonym certificate, the at least a part of the actual information of the to-be-requested pseudonym credential includes a pseudonym certificate public key.

If the pseudonym credential is a pseudonym identity, the at least a part of the actual information of the to-be-requested pseudonym credential includes a pseudonym identifier.

In a possible design, if the pseudonym credential is a pseudonym identity, the receiving module 31 is further configured to receive, from the pseudonym credential generation server, N pseudonym private keys corresponding to N pseudonym identifiers in N pseudonym identities.

In a possible design, the pseudonym credential configuration apparatus further includes the receiving module 31, further configured to receive a target tag from a behavior investigation server.

The determining module 34 is configured to determine a target identifier associated with the target tag. The target identifier is used to indicate a target terminal device.

In a possible design, the sending module 32 is further configured to send a first target hash value and a second target hash value that are associated with the target identifier to the behavior investigation server. The first target hash value is a hash value corresponding to the target identifier and a third random number. The second target hash value is a hash value corresponding to the target identifier and a fourth random number.

The pseudonym credential configuration apparatus in this embodiment may be used to execute the technical solutions corresponding to the registration server of the foregoing method embodiment. The implementation principles and technical effects are similar, and are not further described herein.

Figure 12:
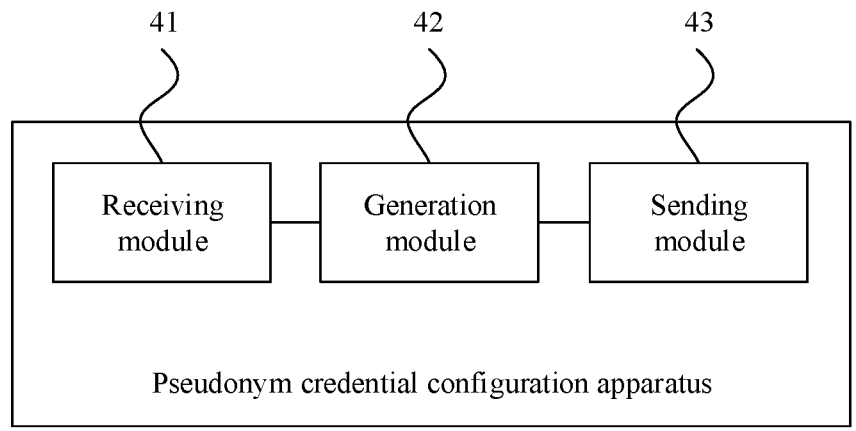
FIG. 12 is a third schematic structural diagram of a pseudonym credential configuration apparatus according to an embodiment of this application.

FIG. 12 is a third schematic structural diagram of a pseudonym credential configuration apparatus according to an embodiment of this application. Referring to FIG. 12, the apparatus in this embodiment includes a receiving module 41, a generation module 42, and a sending module 43.

The receiving module 41 is configured to receive a request message from a registration server. The request message includes a tag of the request message and information about a to-be-requested pseudonym credential of a terminal device. The tag of the request message and the identifier of the terminal device are stored in association with each other in the registration server, so that the registration server can obtain, based on the tag, the identifier that is of the terminal device and that is associated with the tag.

The generation module 42 is configured to generate a pseudonym credential. The pseudonym credential includes the tag and at least a part of the information about the to-be-requested pseudonym credential.

The sending module 43 is configured to send the pseudonym credential to the registration server.

The pseudonym credential configuration apparatus in this embodiment may be used to execute the technical solutions corresponding to the pseudonym credential generation server of the foregoing method embodiment. The implementation principles and technical effects are similar, and are not further described herein.

In a possible design, the information about the to-be-requested pseudonym credential is information obtained after actual information of the to-be-requested pseudonym credential is encrypted by using a public key of the pseudonym credential configuration apparatus.

The generation module 42 is specifically configured to decrypt the information about the to-be-requested pseudonym credential by using a private key of the pseudonym credential configuration apparatus, to obtain the actual information of the to-be-requested pseudonym credential; and generate the pseudonym credential based on the tag and the at least a part of the actual information of the to-be-requested pseudonym credential.

In a possible design, the request message further includes a first pre-linkage value and a second pre-linkage value that are encrypted by using a public key of the pseudonym credential configuration apparatus.

The generation module 42 is specifically configured to decrypt, by the pseudonym credential configuration apparatus by using a private key of the pseudonym credential configuration apparatus, the first pre-linkage value and the second pre-linkage value that are encrypted by using the public key of the pseudonym credential configuration apparatus, to obtain the first pre-linkage value and the second pre-linkage value.

The pseudonym credential configuration apparatus performs an exclusive OR operation on the first pre-linkage value and the second pre-linkage value to obtain a linkage value.

The generation module 42 is specifically configured to generate the pseudonym credential based on the tag and the at least a part of the actual information of the to-be-requested pseudonym credential.

In a possible design, the generation module 42 is specifically configured to:

encrypt the tag by using a symmetric key of the pseudonym credential configuration apparatus to obtain an encrypted tag; and generate the pseudonym credential based on the encrypted tag, the at least a part of the actual information of the to-be-requested pseudonym credential, and the linkage value.

In a possible design, if the pseudonym credential is a pseudonym certificate, the actual information of the to-be-requested pseudonym credential includes a pseudonym certificate public key, and the pseudonym credential configuration apparatus is a pseudonym certificate generation server.

The generation module 42 is specifically configured to generate the pseudonym certificate based on the encrypted tag, the pseudonym certificate public key, and the linkage value.

In a possible design, if the pseudonym credential is a pseudonym identity, the actual information of the to-be-requested pseudonym credential includes a pseudonym identifier, and the pseudonym credential configuration apparatus is a pseudonym identity generation server.

The generation module 42 is specifically configured to:

generate the pseudonym identity based on the encrypted tag, the pseudonym identifier, and the linkage value.

In a possible design, the actual information of the to-be-requested pseudonym credential further includes a temporary public key. The generation module 42 is further configured to:

encrypting the pseudonym certificate by using the temporary public key, to obtain an encrypted pseudonym certificate.

The sending module 43 is further configured to send the encrypted pseudonym certificate to the registration server.

In a possible design, the actual information of the to-be-requested pseudonym credential further includes a temporary public key. The generation module 42 is further configured to encrypt the pseudonym identity by using the temporary public key, to obtain an encrypted pseudonym identity.

The sending module 43 is further configured to send the encrypted pseudonym identity to the registration server.

In a possible design, the generation module 42 is further configured to generate a pseudonym private key corresponding to the pseudonym identifier; and encrypt the pseudonym private key by using the temporary public key, to obtain an encrypted pseudonym private key.

The sending module 43 is further configured to send the encrypted pseudonym private key to the registration server.

The pseudonym credential configuration apparatus in this embodiment may be used to execute the technical solutions corresponding to the pseudonym credential generation server of the foregoing method embodiment. The implementation principles and technical effects are similar, and are not further described herein.

Figure 13:
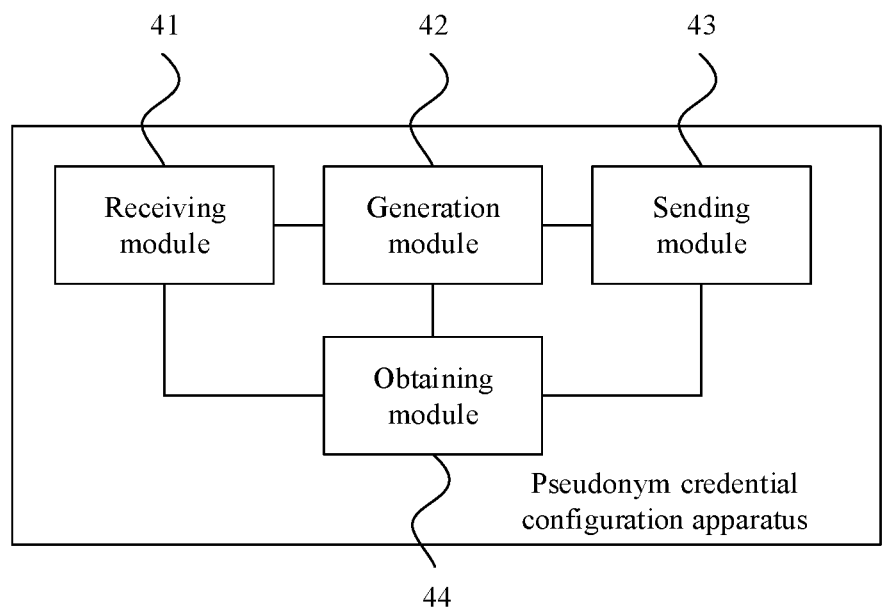
FIG. 13 is a fourth schematic structural diagram of a pseudonym credential configuration apparatus according to an embodiment of this application.

FIG. 13 is a fourth schematic structural diagram of a pseudonym credential configuration apparatus according to an embodiment of this application. Referring to FIG. 13, based on FIG. 12, the pseudonym credential configuration apparatus further includes an obtaining module 44.

The receiving module 41 is further configured to receive a target pseudonym credential sent by a behavior investigation server.

The obtaining module 44 is configured to obtain a target tag in the target pseudonym credential.

The sending module 43 is further configured to send the target tag to the behavior investigation server.

The pseudonym credential configuration apparatus in this embodiment may be used to execute the technical solutions corresponding to the pseudonym credential generation server of the foregoing method embodiment. The implementation principles and technical effects are similar, and are not further described herein.

Figure 14:
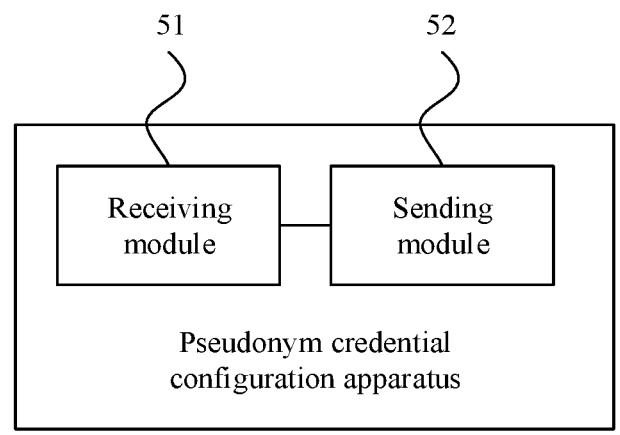
FIG. 14 is a fifth schematic structural diagram of a pseudonym credential configuration apparatus according to an embodiment of this application.

FIG. 14 is a fifth schematic structural diagram of a pseudonym credential configuration apparatus according to an embodiment of this application. Referring to FIG. 14, the apparatus in this embodiment includes a receiving module 51 and a sending module 52.

The receiving module 51 is configured to receive a report message from a first terminal device. The report message includes a pseudonym credential of a second terminal device.

The sending module 52 is configured to send the pseudonym credential to a pseudonym credential generation server, so that the pseudonym credential generation server obtains a target tag included in the pseudonym credential. The target tag is a tag corresponding to a request message sent by a registration server to the pseudonym credential generation server. The request message instructs the pseudonym credential generation server to generate the pseudonym credential.

The receiving module 51 is further configured to receive the target tag from the pseudonym credential generation server.

The sending module 52 is further configured to send the target tag to the registration server, so that the registration server obtains an identifier that is of the second terminal device and that is associated with the target tag.

The pseudonym credential configuration apparatus in this embodiment may be used to execute the technical solutions corresponding to the pseudonym credential generation server of the foregoing method embodiment. The implementation principles and technical effects are similar, and are not further described herein.

Figure 15:
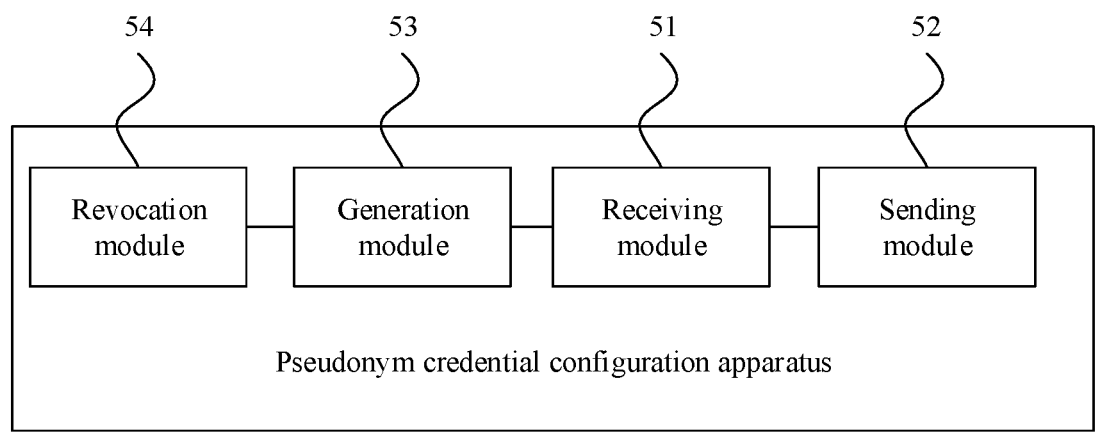
FIG. 15 is a sixth schematic structural diagram of a pseudonym credential configuration apparatus according to an embodiment of this application.

FIG. 15 is a sixth schematic structural diagram of a pseudonym credential configuration apparatus according to an embodiment of this application. Referring to FIG. 15, based on FIG. 14, the apparatus in this embodiment further includes a generation module 53 and a revocation module 54.

The receiving module 51 is further configured to receive, from the registration server, a first target hash value corresponding to the identifier of the second terminal device and a first random number, and a second target hash value corresponding to the identifier of the second terminal device and a second random number.

The sending module 52 is further configured to send the first target hash value to a first linkage value server, and send the second target hash value to a second linkage value server.

The receiving module 51 is further configured to receive a first target value set associated with the first target hash value from the first linkage value server, and receive a second target value set associated with a target hash value from the second linkage value server. The first target value set includes one of N first seed values, a first native seed value, and N first pre-linkage values. The second target value set includes one of N second seed values, a second native seed value, and N second pre-linkage values.

The generation module 53 is configured to generate N linkage values based on the first target value set and the second target value set.

For each linkage value, the revocation module 54 is configured to revoke a pseudonym credential that includes the linkage value.

The pseudonym credential configuration apparatus in this embodiment may be used to execute the technical solutions corresponding to the behavior investigation server of the foregoing method embodiment. The implementation principles and technical effects are similar, and are not further described herein.

In a possible design, if the first target value set includes a first native seed value, the second target value set includes a second native seed value. The generation module 53 is specifically configured to:

generate N−1 first seed values based on the first native seed value, and generate N first pre-linkage values based on the first native seed value and the N−1 first seed values;

generate N−1 second seed values based on the second native seed value, and generate N second pre-linkage values based on the second native seed value and the N−1 second seed values; and for each of N groups of pre-linkage values, perform an exclusive OR operation on a first pre-linkage value and a second pre-linkage value that are included in the group to obtain a linkage value. Each group of pre-linkage values includes one first pre-linkage value and one second pre-linkage value.

In a possible design, the first target value set includes N first pre-linkage values, and the second target value set includes N second pre-linkage values. The generation module 53 is specifically configured to:

for each of N groups of pre-linkage values, perform an exclusive OR operation on a first pre-linkage value and a second pre-linkage value in the group to obtain a linkage value.

In a possible design, the first target value set includes N first seed values, and the second target value set includes N second seed values. The generation module 53 is specifically configured to:

generate N first pre-linkage values based on the N first seed values;

generate N second pre-linkage values based on the N second seed values; and for each of N groups of pre-linkage values, perform an exclusive OR operation on a first pre-linkage value and a second pre-linkage value that are included in the group to obtain a linkage value. Each group of pre-linkage values includes one first pre-linkage value and one second pre-linkage value.

The pseudonym credential configuration apparatus in this embodiment may be used to execute the technical solutions corresponding to the behavior investigation server of the foregoing method embodiment. The implementation principles and technical effects are similar, and are not further described herein.

Figure 16:
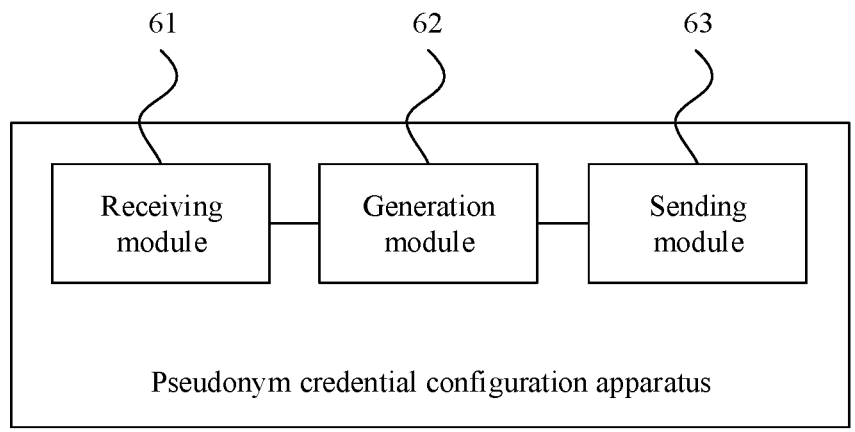
FIG. 16 is a seventh schematic structural diagram of a pseudonym credential configuration apparatus according to an embodiment of this application.

FIG. 16 is a seventh schematic structural diagram of a pseudonym credential configuration apparatus according to an embodiment of this application. Referring to FIG. 16, the apparatus in this embodiment includes a receiving module 61, a generation module 62, and a sending module 63.

The receiving module 61 is configured to receive a request message from the registration server. The request message includes indication information instructing the pseudonym credential configuration apparatus to generate N pre-linkage values.

The generation module 62 is configured to generate N pre-linkage values.

The sending module 63 is configured to send a feedback message to the registration server. The feedback message includes the N pre-linkage values.

The pseudonym credential configuration apparatus in this embodiment may be used to execute the technical solutions corresponding to the pseudonym credential configuration apparatus of the foregoing method embodiment. The implementation principles and technical effects are similar, and are not further described herein.

In a possible design, the generation module 62 is specifically configured to:

generate N seed values, where the N seed values include one native seed value; and generate N pre-linkage values based on the N seed values.

In a possible design, the $i^{th}$ seed value is a hash value of an $(i-1)^{th}$ seed value, $i=2, 3, \ldots, N$, and the native seed value is a first seed value.

In a possible design, the $m^{th}$ pre-linkage value is a part of the $m^{th}$ seed value.

Alternatively, the $m^{th}$ pre-linkage value is a hash value of the $m^{th}$ seed value.

$m=1, 2, \ldots, N$.

The pseudonym credential configuration apparatus in this embodiment may be used to execute the technical solutions corresponding to the linkage value server of the foregoing method embodiment. The implementation principles and technical effects are similar, and are not further described herein.

Figure 17:
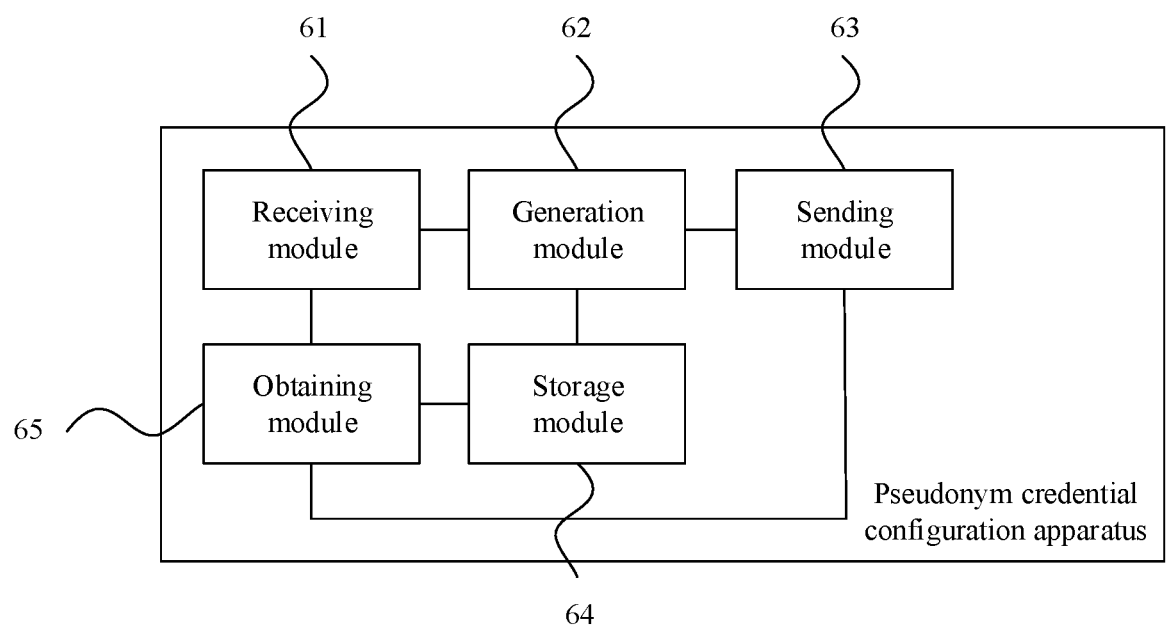
FIG. 17 is a eighth schematic structural diagram of a pseudonym credential configuration apparatus according to an embodiment of this application.

FIG. 17 is an eighth schematic structural diagram of a pseudonym credential configuration apparatus according to an embodiment of this application. Referring to FIG. 17, based on FIG. 16, the apparatus in this embodiment further includes a storage module 64 and an obtaining module 65.

The request message further includes a hash value. The hash value is a hash value corresponding to an identifier of a terminal device that requests a pseudonym credential and a random number. The storage module 64 is configured to store a first target value set in association with the hash value, so that the pseudonym credential configuration apparatus can obtain the first target value based on the hash value. The first target value set is one of the native seed value, the N pre-linkage values, and the N seed values.

The receiving module 61 is further configured to receive a target hash value from a behavior investigation server. The target hash value is a hash value corresponding to a target identifier of a target terminal device and a target random number.

The obtaining module 65 is configured to obtain a second target value set associated with the target hash value. The second target value set includes one of the N seed values, the native seed value, and the N pre-linkage values.

The sending module 63 is further configured to send the second target value set to the behavior investigation server.

The pseudonym credential configuration apparatus in this embodiment may be used to execute the technical solutions corresponding to the linkage value server of the foregoing method embodiment. The implementation principles and technical effects are similar, and are not further described herein.

An embodiment of this application provides a computer readable storage medium. The computer readable storage medium stores a computer program. When the computer program is executed by a processor, the method corresponding to the registration server in the foregoing method embodiments is performed.

An embodiment of this application provides a registration server, including a processor and a memory.

The memory is configured to store a program.

The processor is configured to execute the program stored in the memory. When the program is executed, the processor is configured to perform the method corresponding to the registration server in the foregoing method embodiments.

An embodiment of this application provides a computer readable storage medium. The computer readable storage medium stores a computer program. When the computer program is executed by a processor, the method corresponding to the pseudonym credential generation server in the foregoing method embodiments is performed.

An embodiment of this application provides a pseudonym credential generation server, including a processor and a memory.

The memory is configured to store a program.

The processor is configured to execute the program stored in the memory. When the program is executed, the processor is configured to perform the method corresponding to the pseudonym credential generation server in the foregoing method embodiments.

An embodiment of this application provides a computer readable storage medium. The computer readable storage medium stores a computer program. When the computer program is executed by a processor, the method corresponding to the pseudonym credential generation server in the foregoing method embodiment is performed.

An embodiment of this application provides a behavior linkage value server, including a processor and a memory.

The memory is configured to store a program.

The processor is configured to execute the program stored in the memory. When the program is executed, the processor is configured to perform the method corresponding to the linkage value server in the foregoing method embodiments.

An embodiment of this application provides a computer readable storage medium. The computer readable storage medium stores a computer program. When the computer program is executed by a processor, the method corresponding to the behavior investigation server in the foregoing method embodiment is performed.

An embodiment of this application provides a behavior investigation server, including a processor and a memory.

The memory is configured to store a program.

The processor is configured to execute the program stored in the memory. When the program is executed, the processor is configured to perform the method corresponding to the behavior investigation server in the foregoing method embodiments.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A pseudonym credential configuration method comprising:
   receiving, by a registration server, a first request message from a terminal device, wherein the first request message comprises an identifier of the terminal device and information about N to-be-requested pseudonym credentials, and N is a positive integer;
   sending, by the registration server, N second request messages to a pseudonym credential generation server, wherein each second request message instructs the pseudonym credential generation server to generate a pseudonym credential, and the pseudonym credential comprises a tag of the corresponding second request message and at least a part of information about one to-be-requested pseudonym credential comprised in the corresponding second request message;
   storing, by the registration server, the tag of each second request message in association with the identifier of the terminal device in the registration server, so that the registration server is enabled to obtain, based on the tag, the identifier that is of the terminal device and that is associated with the tag; and
   receiving, by the registration server, N pseudonym credentials from the pseudonym credential generation server, and sending the N pseudonym credentials to the terminal device,
   wherein before sending the N second request messages to the pseudonym credential generation server, the method further comprises:
      determining, by the registration server, a type of the first request message, wherein the type is a pseudonym certificate request message or a pseudonym identity request message; and
      in response to the type being a pseudonym certificate request message, the sending the N second request messages to the pseudonym credential generation server further comprises sending, by the registration server, the N second request messages to a pseudonym certificate generation server; or
      in response to the type being a pseudonym identity request message, the sending the N second request messages to the pseudonym credential generation server comprises sending, by the registration server, the N second request messages to a pseudonym identity generation server.

2. The method according to claim 1, wherein the first request message further comprises first indication information indicating a type of the first request message; and wherein the determining the type of the first request message comprises:
   determining, by the registration server, the type of the first request message based on the first indication information.

3. The method according to claim 1, wherein before sending the N second request messages to the pseudonym credential generation server, the method further comprises:
   sending, by the registration server, a third request message to a first linkage value server, and sending a fourth request message to a second linkage value server, wherein the third request message comprises indication information instructing the first linkage value server to generate N first pre-linkage values, and the fourth request message comprises indication information instructing the second linkage value server to generate N second pre-linkage values; and
   receiving, by the registration server, N first pre-linkage values from the first linkage value server, and receiving the N second pre-linkage values from the second linkage value server,
   wherein each pseudonym credential further comprises a linkage value, wherein the linkage value is obtained by the pseudonym credential generation server based on a first pre-linkage value and a second pre-linkage value comprised in a corresponding second request message.

4. The method according to claim 3, wherein the third request message further comprises a first hash value, wherein the first hash value is a hash value corresponding to the identifier of the terminal device and a first random number; the fourth request message further comprises a second hash value, wherein the second hash value is a hash value corresponding to the identifier of the terminal device and a second random number; and the method further comprises:
   storing, by the registration server, the identifier of the terminal device in association with the first hash value and the second hash value, so that the registration server is enabled to obtain the first hash value and the second hash value based on the identifier of the terminal device.

5. The method according to claim 3, wherein the first pre-linkage value is a linkage value encrypted by using a public key of the pseudonym credential generation server, and the second pre-linkage value is a linkage value encrypted by using the public key of the pseudonym credential generation server.

6. The method according to claim 1, wherein the information about the one to-be-requested pseudonym credential is information obtained after actual information of the one to-be-requested pseudonym credential is encrypted by using a public key of the pseudonym credential generation server; and
   the at least the part of the information about the one to-be-requested pseudonym credential comprised in the pseudonym credential is at least a part of the actual information of the one to-be-requested pseudonym credential, wherein:
      in response to the pseudonym credential being a pseudonym certificate, the at least the part of the actual information of the one to-be-requested pseudonym credential comprises a pseudonym certificate public key; or
      in response to the pseudonym credential being a pseudonym identity, the at least the part of the actual information of the one to-be-requested pseudonym credential comprises a pseudonym identifier.

7. The method according to claim 6, wherein in response to the pseudonym credential being a pseudonym identity, the method further comprises:
receiving, by the registration server from the pseudonym credential generation server, N pseudonym private keys corresponding to N pseudonym identifiers in N pseudonym identities.

8. The method according to claim 4, further comprising:
receiving, by the registration server, a target tag from a behavior investigation server; and
determining, by the registration server, a target identifier associated with the target tag, wherein the target identifier indicates a target terminal device.

9. The method according to claim 8, wherein after receiving the target tag from the behavior investigation server, the method further comprises:
sending a first target hash value and a second target hash value that are associated with the target identifier to the behavior investigation server, wherein the first target hash value is a hash value corresponding to the target identifier and a third random number, and the second target hash value is a hash value corresponding to the target identifier and a fourth random number.

10. A pseudonym credential configuration apparatus comprising:
a receiver, configured to cooperate with a processor to receive a first request message from a terminal device, wherein the first request message comprises an identifier of the terminal device and information about N to-be-requested pseudonym credentials, and N is a positive integer;
a transmitter, configured to cooperate with the processor to send N second request messages to a pseudonym credential generation server, wherein each second request message instructs the pseudonym credential generation server to generate a pseudonym credential, and the pseudonym credential comprises a tag of the corresponding second request message and at least a part of information about one to-be-requested pseudonym credential comprised in the corresponding second request message; and
a memory coupled to the processor, configured to store the tag of each second request message in association with the identifier of the terminal device in a registration server, so that the registration server is enabled to obtain, based on the tag, the identifier that is of the terminal device and that is associated with the tag,
wherein the receiver is further configured to cooperate with the processor to receive N pseudonym credentials from the pseudonym credential generation server, and send the N pseudonym credentials to the terminal device,
wherein the processor is configured to determine a type of the first request message before the transmitter sends the N second request messages to the pseudonym credential generation server, wherein the type is a pseudonym certificate request message or a pseudonym identity request message; and
in response to the type being a pseudonym certificate request message, the transmitter sends the N second request messages to a pseudonym certificate generation server, or
in response to the type being a pseudonym identity request message, the transmitter sends the N second request messages to a pseudonym identity generation server.

11. The apparatus according to claim 10, wherein the transmitter is further configured to cooperate with the processor to:
before sending the N second request messages to the pseudonym credential generation server, send a third request message to a first linkage value server, and send a fourth request message to a second linkage value server, wherein the third request message comprises indication information instructing the first linkage value server to generate N first pre-linkage values, and the fourth request message comprises indication information instructing the second linkage value server to generate N second pre-linkage values; and
the receiver is further configured to cooperate with the processor to: receive N first pre-linkage values from the first linkage value server, and receive the N second pre-linkage values from the second linkage value server,
wherein each pseudonym credential further comprises a linkage value, wherein the linkage value is obtained by the pseudonym credential generation server based on a first pre-linkage value and a second pre-linkage value comprised in a corresponding second request message.

12. The apparatus according to claim 11, wherein the third request message further comprises a first hash value, wherein the first hash value is a hash value corresponding to the identifier of the terminal device and a first random number; and the fourth request message further comprises a second hash value, wherein the second hash value is a hash value corresponding to the identifier of the terminal device and a second random number; and the pseudonym credential configuration apparatus further comprises:
the memory is further configured to store the identifier of the terminal device in association with the first hash value and the second hash value, so that the registration server is enabled to obtain the first hash value and the second hash value based on the identifier of the terminal device.

13. The apparatus according to claim 12, wherein:
the receiver is configured to receive a target tag from a behavior investigation server;
the processor is configured to determine a target identifier associated with the target tag, wherein the target identifier indicates a target terminal device; and
the transmitter is further configured to send a first target hash value and a second target hash value that are associated with the target identifier to the behavior investigation server, wherein the first target hash value is a hash value corresponding to the target identifier and a third random number, and the second target hash value is a hash value corresponding to the target identifier and a fourth random number.

14. A non-transitory computer readable storage medium storing a computer program, which when executed by a processor, cause the processor to perform operations including:
receiving a first request message from a terminal device, wherein the first request message comprises an identifier of the terminal device and information about N to-be-requested pseudonym credentials, and N is a positive integer;
sending N second request messages to a pseudonym credential generation server, wherein each second request message instructs the pseudonym credential generation server to generate a pseudonym credential, and the pseudonym credential comprises a tag of the corresponding second request message and at least a part of information about one to-be-requested pseudonym credential comprised in the corresponding second request message;

storing the tag of each second request message in association with the identifier of the terminal device in a registration server, so that the registration server is enabled to obtain, based on the tag, the identifier that is of the first terminal device and that is associated with the tag; and receiving N pseudonym credentials from the pseudonym credential generation server, and sending the N pseudonym credentials to the terminal device, wherein before sending the N second request messages to the pseudonym credential generation server:

determining a type of the first request message, wherein the type is a pseudonym certificate request message or a pseudonym identity request message; and in response to the type being a pseudonym certificate request message, the sending the N second request messages to the pseudonym credential generation server further comprises sending the N second request messages to a pseudonym certificate generation server; or in response to the type being a pseudonym identity request message, the sending, the N second request messages to the pseudonym credential generation server comprises sending the N second request messages to a pseudonym identity generation server.

15. A registration server comprising a processor and a memory, wherein:

the memory is configured to store a program; and the processor which is coupled to the memory is configured to execute the program stored in the memory, and when the program is executed, the processor is configured to perform:

receiving a first request message from a terminal device, wherein the first request message comprises an identifier of the terminal device and information about N to-be-requested pseudonym credentials, and N is a positive integer;

sending N second request messages to a pseudonym credential generation server, wherein each second request message instructs the pseudonym credential generation server to generate a pseudonym credential, and the pseudonym credential comprises a tag of the corresponding second request message and at least a part of information about one to-be-requested pseudonym credential comprised in the corresponding second request message;

storing the tag of each second request message in association with the identifier of the terminal device in the registration server, so that the registration server is enabled to obtain, based on the tag, the identifier that is of the terminal device and that is associated with the tag; and receiving N pseudonym credentials from the pseudonym credential generation server, and sending the N pseudonym credentials to the terminal device, wherein before sending the N second request messages to the pseudonym credential generation server, the processor is configured to perform:

determining, by the registration server, a type of the first request message, wherein the type is a pseudonym certificate request message or a pseudonym identity request message; and in response to the type being a pseudonym certificate request message, the sending the N second request messages to the pseudonym credential generation server further comprises sending, by the registration server, the N second request messages to a pseudonym certificate generation server; or in response to the type being a pseudonym identity request message, the sending, the N second request messages to the pseudonym credential generation server comprises sending, by the registration server, the N second request messages to a pseudonym identity generation server.

16. The registration server according to claim 15, wherein the first request message further comprises first indication information indicating a type of the first request message; and wherein the processor determining the type of the first request message comprises:

the processor determining the type of the first request message based on the first indication information.

* * * * *

UNITED STATES PATENT AND TRADEMARK OFFICE
CERTIFICATE OF CORRECTION

| | | |
|---|---|---|
| PATENT NO. | : 11,570,008 B2 | |
| APPLICATION NO. | : 17/129428 | |
| DATED | : January 31, 2023 | |
| INVENTOR(S) | : Kang et al. | |

It is certified that error appears in the above-identified patent and that said Letters Patent is hereby corrected as shown below:

In the Claims

Claim 14: Column 61, Line 8: "of the first terminal device and that is associated with" should read -- of the terminal device and that is associated with --.

Signed and Sealed this
Sixth Day of June, 2023

Katherine Kelly Vidal
*Director of the United States Patent and Trademark Office*